(12) United States Patent
Sirpal et al.

(10) Patent No.: US 12,309,463 B2
(45) Date of Patent: May 20, 2025

(54) REMOTE CONTROL HAVING HOTKEYS WITH DYNAMICALLY ASSIGNED FUNCTIONS

(71) Applicant: Hisense Visual Technology Co., Ltd., Shandong (CN)

(72) Inventors: Sanjiv Sirpal, Oakville (CA); Mohammed Selim, Oakville (CA); Salvador Soto, Toronto (CA); Alexander de Paz, Burlington (CA); Saulo Correia Dourado, Oakville (CA); Ron Cassar, Burlington (CA)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 18/763,673

(22) Filed: Jul. 3, 2024

(65) Prior Publication Data

US 2024/0397163 A1   Nov. 28, 2024

Related U.S. Application Data

(63) Continuation of application No. 18/490,423, filed on Oct. 19, 2023, which is a continuation of application
(Continued)

(51) Int. Cl.
*H04N 21/488* (2011.01)
*G06F 3/01* (2006.01)
(Continued)

(52) U.S. Cl.
CPC ......... *H04N 21/4882* (2013.01); *G06F 3/017* (2013.01); *G06F 3/0481* (2013.01);
(Continued)

(58) Field of Classification Search
CPC .. H04N 21/4882; H04N 1/00448; H04N 5/44; H04N 5/445; H04N 5/45;
(Continued)

(56) References Cited

U.S. PATENT DOCUMENTS 539,479 A   5/1895   S
1,198,263 A   9/1916   Pajeau
(Continued)

FOREIGN PATENT DOCUMENTS

JP   2007-129332 A   5/2007
KR   300411090   4/2006
(Continued)

OTHER PUBLICATIONS

U.S. Appl. No. 29/452,457, filed Apr. 2013, Sirpal et al.
(Continued)

*Primary Examiner* — Michael E Teitelbaum
(74) *Attorney, Agent, or Firm* — Crowell & Moring LLP

(57) ABSTRACT

An intelligent television system provides an operating system and an application framework for controlling a user interface to handle user input events from a handheld remote control. The remote control includes color keys that are configured for triggering different functions in different application panels displayed on the television.

20 Claims, 76 Drawing Sheets

Related U.S. Application Data

No. 17/678,737, filed on Feb. 23, 2022, now Pat. No. 11,974,022, which is a continuation of application No. 15/931,141, filed on May 13, 2020, now Pat. No. 11,294,471, which is a continuation of application No. 15/722,790, filed on Oct. 2, 2017, now abandoned, which is a continuation of application No. 14/739,955, filed on Jun. 15, 2015, now Pat. No. 9,807,446, which is a continuation of application No. 13/863,814, filed on Apr. 16, 2013, now Pat. No. 9,060,152.

(60) Provisional application No. 61/805,042, filed on Mar. 25, 2013, provisional application No. 61/804,971, filed on Mar. 25, 2013, provisional application No. 61/805,003, filed on Mar. 25, 2013, provisional application No. 61/805,027, filed on Mar. 25, 2013, provisional application No. 61/804,998, filed on Mar. 25, 2013, provisional application No. 61/805,038, filed on Mar. 25, 2013, provisional application No. 61/805,053, filed on Mar. 25, 2013, provisional application No. 61/804,990, filed on Mar. 25, 2013, provisional application No. 61/804,942, filed on Mar. 25, 2013, provisional application No. 61/805,030, filed on Mar. 25, 2013, provisional application No. 61/798,821, filed on Mar. 15, 2013, provisional application No. 61/736,692, filed on Dec. 13, 2012, provisional application No. 61/702,650, filed on Sep. 18, 2012, provisional application No. 61/700,182, filed on Sep. 12, 2012, provisional application No. 61/697,710, filed on Sep. 6, 2012, provisional application No. 61/684,672, filed on Aug. 17, 2012, provisional application No. 61/659,626, filed on Jun. 14, 2012.

(51) Int. Cl.

| | | |
|---|---|---|
| *G06F 3/0481* | (2022.01) | |
| *G06F 3/04817* | (2022.01) | |
| *G06F 3/0482* | (2013.01) | |
| *G06F 3/04842* | (2022.01) | |
| *G06F 3/04883* | (2022.01) | |
| *H04N 1/00* | (2006.01) | |
| *H04N 5/44* | (2011.01) | |
| *H04N 5/445* | (2011.01) | |
| *H04N 5/45* | (2011.01) | |
| *H04N 5/50* | (2006.01) | |
| *H04N 5/64* | (2006.01) | |
| *H04N 17/04* | (2006.01) | |
| *H04N 21/2187* | (2011.01) | |
| *H04N 21/231* | (2011.01) | |
| *H04N 21/235* | (2011.01) | |
| *H04N 21/24* | (2011.01) | |
| *H04N 21/25* | (2011.01) | |
| *H04N 21/2543* | (2011.01) | |
| *H04N 21/258* | (2011.01) | |
| *H04N 21/262* | (2011.01) | |
| *H04N 21/40* | (2011.01) | |
| *H04N 21/41* | (2011.01) | |
| *H04N 21/414* | (2011.01) | |
| *H04N 21/422* | (2011.01) | |
| *H04N 21/426* | (2011.01) | |
| *H04N 21/43* | (2011.01) | |
| *H04N 21/431* | (2011.01) | |
| *H04N 21/432* | (2011.01) | |
| *H04N 21/433* | (2011.01) | |
| *H04N 21/435* | (2011.01) | |
| *H04N 21/437* | (2011.01) | |
| *H04N 21/439* | (2011.01) | |
| *H04N 21/441* | (2011.01) | |
| *H04N 21/4415* | (2011.01) | |
| *H04N 21/442* | (2011.01) | |
| *H04N 21/45* | (2011.01) | |
| *H04N 21/462* | (2011.01) | |
| *H04N 21/47* | (2011.01) | |
| *H04N 21/472* | (2011.01) | |
| *H04N 21/4725* | (2011.01) | |
| *H04N 21/475* | (2011.01) | |
| *H04N 21/478* | (2011.01) | |
| *H04N 21/4782* | (2011.01) | |
| *H04N 21/4788* | (2011.01) | |
| *H04N 21/482* | (2011.01) | |
| *H04N 21/485* | (2011.01) | |
| *H04N 21/61* | (2011.01) | |
| *H04N 21/658* | (2011.01) | |
| *H04N 21/81* | (2011.01) | |
| *H04N 21/8358* | (2011.01) | |
| *H04N 21/84* | (2011.01) | |
| *H04N 21/85* | (2011.01) | |
| *H04N 21/8545* | (2011.01) | |
| *H04L 51/52* | (2022.01) | |

(52) U.S. Cl.
CPC ........ *G06F 3/04817* (2013.01); *G06F 3/0482* (2013.01); *G06F 3/04842* (2013.01); *G06F 3/04883* (2013.01); *H04N 1/00448* (2013.01); *H04N 5/44* (2013.01); *H04N 5/445* (2013.01); *H04N 5/45* (2013.01); *H04N 5/50* (2013.01); *H04N 5/64* (2013.01); *H04N 17/04* (2013.01); *H04N 21/2187* (2013.01); *H04N 21/23109* (2013.01); *H04N 21/235* (2013.01); *H04N 21/24* (2013.01); *H04N 21/25* (2013.01); *H04N 21/251* (2013.01); *H04N 21/2543* (2013.01); *H04N 21/258* (2013.01); *H04N 21/25808* (2013.01); *H04N 21/25883* (2013.01); *H04N 21/25891* (2013.01); *H04N 21/26291* (2013.01); *H04N 21/40* (2013.01); *H04N 21/41265* (2020.08); *H04N 21/414* (2013.01); *H04N 21/422* (2013.01); *H04N 21/42203* (2013.01); *H04N 21/42204* (2013.01); *H04N 21/4221* (2013.01); *H04N 21/42222* (2013.01); *H04N 21/42225* (2013.01); *H04N 21/426* (2013.01); *H04N 21/42684* (2013.01); *H04N 21/43* (2013.01); *H04N 21/4302* (2013.01); *H04N 21/4307* (2013.01); *H04N 21/43072* (2020.08); *H04N 21/43074* (2020.08); *H04N 21/43079* (2020.08); *H04N 21/431* (2013.01); *H04N 21/4312* (2013.01); *H04N 21/4314* (2013.01); *H04N 21/4316* (2013.01); *H04N 21/432* (2013.01); *H04N 21/433* (2013.01); *H04N 21/4332* (2013.01); *H04N 21/435* (2013.01); *H04N 21/437* (2013.01); *H04N 21/4396* (2013.01); *H04N 21/441* (2013.01); *H04N 21/4415* (2013.01); *H04N 21/442* (2013.01); *H04N 21/44204* (2013.01); *H04N 21/44213* (2013.01); *H04N 21/44222* (2013.01); *H04N 21/44226* (2020.08); *H04N 21/4532* (2013.01); *H04N 21/462* (2013.01); *H04N 21/4622* (2013.01); *H04N 21/47* (2013.01); *H04N 21/472* (2013.01); *H04N 21/47202* (2013.01); *H04N 21/47205* (2013.01); *H04N 21/4725*

(2013.01); *H04N 21/475* (2013.01); *H04N 21/4753* (2013.01); *H04N 21/4755* (2013.01); *H04N 21/4756* (2013.01); *H04N 21/478* (2013.01); *H04N 21/4782* (2013.01); *H04N 21/4788* (2013.01); *H04N 21/482* (2013.01); *H04N 21/4821* (2013.01); *H04N 21/4823* (2013.01); *H04N 21/4826* (2013.01); *H04N 21/4828* (2013.01); *H04N 21/485* (2013.01); *H04N 21/4858* (2013.01); *H04N 21/488* (2013.01); *H04N 21/6125* (2013.01); *H04N 21/6175* (2013.01); *H04N 21/6582* (2013.01); *H04N 21/8126* (2013.01); *H04N 21/8133* (2013.01); *H04N 21/8166* (2013.01); *H04N 21/8173* (2013.01); *H04N 21/8358* (2013.01); *H04N 21/84* (2013.01); *H04N 21/85* (2013.01); *H04N 21/8545* (2013.01); *G06F 2203/04804* (2013.01); *H04L 51/52* (2022.05); *H04N 21/42206* (2013.01)

(58) Field of Classification Search
CPC .......... H04N 5/50; H04N 5/64; H04N 17/04; H04N 21/2187; H04N 21/23109; H04N 21/235; H04N 21/24; H04N 21/25; H04N 21/251; H04N 21/2543; H04N 21/258; H04N 21/25808; H04N 21/25883; H04N 21/25891; H04N 21/26291; H04N 21/40; H04N 21/41265; H04N 21/414; H04N 21/422; H04N 21/42203; H04N 21/42204; H04N 21/4221; H04N 21/42222; H04N 21/42225; H04N 21/426; H04N 21/42684; H04N 21/43; H04N 21/4302; H04N 21/4307; H04N 21/43072; H04N 21/43074; H04N 21/43079; H04N 21/431; H04N 21/4312; H04N 21/4314; H04N 21/4316; H04N 21/432; H04N 21/433; H04N 21/4332; H04N 21/435; H04N 21/437; H04N 21/4396; H04N 21/441; H04N 21/4415; H04N 21/442; H04N 21/44204; H04N 21/44213; H04N 21/44222; H04N 21/44226; H04N 21/4532; H04N 21/462; H04N 21/4622; H04N 21/47; H04N 21/472; H04N 21/47202; H04N 21/47205; H04N 21/4725; H04N 21/475; H04N 21/4753; H04N 21/4755; H04N 21/4756; H04N 21/478; H04N 21/4782; H04N 21/4788; H04N 21/482; H04N 21/4821; H04N 21/4823; H04N 21/4826; H04N 21/4828; H04N 21/485; H04N 21/4858; H04N 21/488; H04N 21/6125; H04N 21/6175; H04N 21/6582; H04N 21/8126; H04N 21/8133; H04N 21/8166; H04N 21/8173; H04N 21/8358; H04N 21/84; H04N 21/85; H04N 21/8545; H04N 21/42206; G06F 3/017; G06F 3/0481; G06F 3/04817; G06F 3/0482; G06F 3/04842; G06F 3/04883; G06F 2203/04804; H04L 51/52; H04L 51/18
See application file for complete search history.

(56) References Cited

U.S. PATENT DOCUMENTS

| | | |
|---|---|---|
| 4,284,849 A | 8/1981 | Anderson et al. |
| 4,943,932 A | 7/1990 | Lark |
| D322,244 S | 12/1991 | Bishai |
| D354,489 S | 1/1995 | Patton et al. |
| D366,043 S | 1/1996 | Hara et al. |
| 5,481,251 A | 1/1996 | Buys et al. |
| 5,539,479 A | 7/1996 | Bertram |
| D385,541 S | 10/1997 | Taylor |
| 5,724,106 A | 3/1998 | Autry et al. |
| 5,734,853 A | 3/1998 | Hendricks |
| 5,805,256 A | 9/1998 | Miller |
| 5,822,123 A | 10/1998 | Davis et al. |
| 5,894,276 A | 4/1999 | Altidor |
| D435,257 S | 12/2000 | Woods |
| 6,195,033 B1 | 2/2001 | Darbee et al. |
| 6,292,172 B1 | 9/2001 | Makhlouf |
| 6,373,484 B1 | 4/2002 | Orell et al. |
| 6,400,303 B2 | 6/2002 | Armstrong |
| D471,478 S | 3/2003 | Waldman |
| D471,834 S | 3/2003 | Waldman |
| D471,835 S | 3/2003 | Waldman |
| D485,546 S | 1/2004 | Olson et al. |
| D496,634 S | 9/2004 | Tseng et al. |
| D498,472 S | 11/2004 | Borsboom |
| 6,833,878 B2 | 12/2004 | Takagi |
| 6,859,937 B1 | 2/2005 | Narayan et al. |
| 7,020,845 B1 | 3/2006 | Gottfurcht |
| D528,103 S | 9/2006 | Mabry et al. |
| D532,113 S | 11/2006 | Huang |
| 7,152,236 B1 | 12/2006 | Wugofski et al. |
| 7,170,420 B2 | 1/2007 | Phifer |
| D543,971 S | 6/2007 | d'Hoore |
| D545,324 S | 6/2007 | Decombe |
| 7,373,652 B1 | 5/2008 | Bayrakeri et al. |
| 7,432,990 B2 | 10/2008 | Borden, IV |
| 7,506,350 B2 | 3/2009 | Johnson |
| D600,707 S | 9/2009 | LaManna et al. |
| D602,942 S | 10/2009 | Bennett et al. |
| D605,179 S | 12/2009 | Rudolph et al. |
| D608,793 S | 1/2010 | Chanu-Chiesa |
| D613,272 S | 4/2010 | Painter |
| 7,821,419 B2 | 10/2010 | Hayes et al. |
| D626,535 S | 11/2010 | Kim et al. |
| 7,831,930 B2 | 11/2010 | Dresti et al. |
| D628,584 S | 12/2010 | Umezawa |
| D633,478 S | 3/2011 | Bolton |
| 8,089,455 B1 | 1/2012 | Wieder |
| 8,146,128 B2 | 3/2012 | Tanaka et al. |
| D658,204 S | 4/2012 | Jones |
| 8,220,021 B1 | 7/2012 | Look et al. |
| D669,486 S | 10/2012 | Garn et al. |
| D679,726 S | 4/2013 | Kobayashi |
| D681,663 S | 5/2013 | Phelan et al. |
| 8,471,734 B2 | 6/2013 | Black |
| 8,473,865 B2 | 6/2013 | Huang et al. |
| 8,521,926 B2 | 8/2013 | Hsueh et al. |
| D693,829 S | 11/2013 | Edwards et al. |
| D693,831 S | 11/2013 | Edwards et al. |
| D696,266 S | 12/2013 | d'Amore et al. |
| D697,500 S | 1/2014 | Tsai et al. |
| D701,513 S | 3/2014 | Park et al. |
| D704,733 S | 5/2014 | Jewitt |
| D708,193 S | 7/2014 | Agnew et al. |
| D713,820 S | 9/2014 | O'Neil |
| 8,938,760 B1 | 1/2015 | Yang |
| 9,008,190 B2 | 4/2015 | Lee et al. |
| 9,071,418 B2 | 9/2015 | Rajapakse |
| 9,398,339 B2 | 7/2016 | Lee et al. |
| 2001/0056577 A1 | 12/2001 | Gordon et al. |
| 2002/0060750 A1 | 5/2002 | Istvan et al. |
| 2002/0072395 A1 | 6/2002 | Miramontes |
| 2002/0130803 A1 | 9/2002 | Conway |
| 2002/0152267 A1 | 10/2002 | Lennon |
| 2002/0188958 A1 | 12/2002 | Miller |
| 2003/0014752 A1 | 1/2003 | Zaslavsky et al. |
| 2003/0038825 A1 | 2/2003 | Wen |
| 2003/0061431 A1 | 3/2003 | Mears |
| 2003/0070171 A1 | 4/2003 | Jeon et al. |
| 2003/0071855 A1 | 4/2003 | Kim |
| 2003/0095048 A1 | 5/2003 | Choi |
| 2003/0103088 A1 | 6/2003 | Dresti et al. |
| 2004/0075602 A1 | 4/2004 | Griesau |

(56) References Cited

U.S. PATENT DOCUMENTS

| | | |
|---|---|---|
| 2004/0078807 A1 | 4/2004 | Fries et al. |
| 2004/0103120 A1 | 5/2004 | Fickle et al. |
| 2004/0123625 A1 | 7/2004 | Waldman et al. |
| 2004/0125080 A1 | 7/2004 | Ha |
| 2004/0186775 A1 | 9/2004 | Margiloff et al. |
| 2004/0195309 A1 | 10/2004 | Wagner |
| 2004/0216156 A1 | 10/2004 | Wagner |
| 2004/0247139 A1 | 12/2004 | Wang |
| 2005/0022237 A1 | 1/2005 | Nomura |
| 2005/0024545 A1 | 2/2005 | Borden, IV |
| 2005/0052415 A1 | 3/2005 | Braun |
| 2005/0097622 A1 | 5/2005 | Zigmond et al. |
| 2005/0120306 A1 | 6/2005 | Klassen |
| 2005/0138668 A1 | 6/2005 | Gray et al. |
| 2005/0149971 A1 | 7/2005 | Hallberg |
| 2005/0149990 A1* | 7/2005 | Fairhurst ............ H04N 21/8545 725/135 |
| 2005/0185102 A1 | 8/2005 | Fairhurst |
| 2005/0232210 A1 | 10/2005 | Karaoguz et al. |
| 2005/0253808 A1 | 11/2005 | Yoshida |
| 2005/0288064 A1 | 12/2005 | Lin et al. |
| 2006/0022948 A1 | 2/2006 | Mori et al. |
| 2006/0041923 A1 | 2/2006 | McQuaide |
| 2006/0090183 A1 | 4/2006 | Zito et al. |
| 2006/0117343 A1 | 6/2006 | Novak et al. |
| 2006/0136125 A1 | 6/2006 | Chua |
| 2006/0170569 A1 | 8/2006 | Kubo |
| 2006/0192753 A1 | 8/2006 | Fukuhara |
| 2006/0248557 A1 | 11/2006 | Stark et al. |
| 2006/0279430 A1 | 12/2006 | Arai |
| 2007/0011702 A1 | 1/2007 | Vaysman |
| 2007/0047920 A1 | 3/2007 | Machida et al. |
| 2007/0097273 A1 | 5/2007 | Pfiffer |
| 2007/0097274 A1 | 5/2007 | Pfiffer |
| 2007/0143809 A1 | 6/2007 | Chen et al. |
| 2007/0154163 A1 | 7/2007 | Cordray |
| 2007/0192807 A1 | 8/2007 | Howcroft |
| 2007/0199022 A1 | 8/2007 | Moshiri et al. |
| 2007/0261090 A1 | 11/2007 | Miller et al. |
| 2008/0060010 A1 | 3/2008 | Kelts |
| 2008/0086745 A1 | 4/2008 | Knudson et al. |
| 2008/0120635 A1 | 5/2008 | Trimper et al. |
| 2008/0133525 A1 | 6/2008 | Ott |
| 2008/0307108 A1 | 12/2008 | Yan |
| 2009/0013350 A1 | 1/2009 | Ohlfs et al. |
| 2009/0094661 A1 | 4/2009 | Boger |
| 2009/0133048 A1 | 5/2009 | Gibbs |
| 2009/0138805 A1 | 5/2009 | Hildreth |
| 2009/0165045 A1 | 6/2009 | Stallings et al. |
| 2009/0204915 A1 | 8/2009 | Yamagami |
| 2009/0271159 A1 | 10/2009 | Sherman et al. |
| 2009/0271823 A1 | 10/2009 | Jung et al. |
| 2009/0293079 A1 | 11/2009 | Mickee et al. |
| 2009/0307721 A1 | 12/2009 | Afram |
| 2009/0313232 A1 | 12/2009 | Tinsley et al. |
| 2009/0328097 A1 | 12/2009 | McCarthy |
| 2010/0031286 A1 | 2/2010 | Gupta et al. |
| 2010/0035578 A1 | 2/2010 | Ahmed |
| 2010/0037267 A1 | 2/2010 | Bennett |
| 2010/0050219 A1 | 2/2010 | Angiolillo et al. |
| 2010/0079681 A1 | 4/2010 | Coburn et al. |
| 2010/0128183 A1 | 5/2010 | Ishii |
| 2010/0262938 A1 | 10/2010 | Woods et al. |
| 2010/0281499 A1 | 11/2010 | Harville |
| 2010/0313169 A1 | 12/2010 | Huang et al. |
| 2010/0321201 A1 | 12/2010 | Huang et al. |
| 2011/0018901 A1 | 1/2011 | Boorman |
| 2011/0023063 A1 | 1/2011 | McDonough |
| 2011/0035774 A1 | 2/2011 | Parker |
| 2011/0055873 A1 | 3/2011 | Heo |
| 2011/0067066 A1 | 3/2011 | Barton et al. |
| 2011/0085077 A1 | 4/2011 | Yamashita |
| 2011/0085082 A1* | 4/2011 | Jing ...................... H04L 12/282 709/201 |
| 2011/0090152 A1 | 4/2011 | Shih et al. |
| 2011/0092187 A1 | 4/2011 | Miller |
| 2011/0093890 A1 | 4/2011 | Araki |
| 2011/0107382 A1 | 5/2011 | Morris et al. |
| 2011/0145860 A1 | 6/2011 | Wei |
| 2011/0162007 A1 | 6/2011 | Karaoguz et al. |
| 2011/0164187 A1 | 7/2011 | Lin |
| 2011/0219395 A1 | 9/2011 | Moshiri et al. |
| 2011/0219419 A1 | 9/2011 | Reisman |
| 2011/0246908 A1 | 10/2011 | Akram |
| 2011/0296506 A1 | 12/2011 | Caspi |
| 2011/0314386 A1 | 12/2011 | Jeong |
| 2012/0007807 A1 | 1/2012 | Zheng |
| 2012/0054794 A1 | 3/2012 | Kim et al. |
| 2012/0110458 A1 | 5/2012 | Brown |
| 2012/0143972 A1 | 6/2012 | Malik et al. |
| 2012/0144416 A1 | 6/2012 | Wetzer |
| 2012/0147270 A1 | 6/2012 | Kim et al. |
| 2012/0174039 A1 | 7/2012 | Roads et al. |
| 2012/0200574 A1 | 8/2012 | Hill et al. |
| 2012/0212678 A1 | 8/2012 | Wang |
| 2012/0260284 A1 | 10/2012 | Young et al. |
| 2012/0274863 A1 | 11/2012 | Chardon |
| 2012/0287350 A1 | 11/2012 | Song et al. |
| 2012/0295661 A1 | 11/2012 | Kim |
| 2012/0317476 A1 | 12/2012 | Goldman |
| 2012/0322480 A1 | 12/2012 | Hoover |
| 2013/0042280 A1 | 2/2013 | Chen |
| 2013/0044056 A1 | 2/2013 | Kamentser |
| 2013/0057764 A1 | 3/2013 | Choi et al. |
| 2013/0069875 A1 | 3/2013 | Phan Le |
| 2013/0070163 A1 | 3/2013 | Connors |
| 2013/0148023 A1 | 6/2013 | Sullivan et al. |
| 2013/0152135 A1 | 6/2013 | Hong et al. |
| 2013/0155172 A1 | 6/2013 | Mock |
| 2013/0176415 A1 | 7/2013 | Kim et al. |
| 2013/0291015 A1 | 10/2013 | Pan |
| 2013/0318550 A1* | 11/2013 | Geyzel ............... H04N 21/4627 725/25 |
| 2013/0332856 A1 | 12/2013 | Sanders et al. |
| 2014/0049651 A1 | 2/2014 | Voth |
| 2014/0229994 A1 | 8/2014 | Fel |

FOREIGN PATENT DOCUMENTS

| | | |
|---|---|---|
| KR | 300488742 | 4/2006 |
| KR | 300560014 | 5/2010 |
| KR | 300569378 | 8/2010 |
| KR | 2010-0134423 A | 12/2010 |
| KR | 300628046 | 1/2012 |
| KR | 300649790 | 6/2012 |
| RU | 00078456 | 5/2011 |
| RU | 00078466 | 5/2011 |
| RU | 00080485 | 12/2011 |
| WO | WO D057832-004 | 12/2001 |
| WO | WO 2013/133915 A | 9/2013 |

OTHER PUBLICATIONS

U.S. Appl. No. 29/460,631, filed Jul. 2013, Sirpal et al.
U.S. Appl. No. 29/460,632, filed Jul. 2013, Sirpal et al.
U.S. Appl. No. 29/460,634, filed Jul. 2013, Sirpal et al.
U.S. Appl. No. 29/460,636, filed Jul. 2013, Sirpal et al.
U.S. Appl. No. 29/460,640, filed Jul. 2013, Sirpal et al.
U.S. Appl. No. 29/460,641, filed Jul. 2013, Sirpal et al.
U.S. Appl. No. 29/460,642, filed Jul. 2013, Sirpal et al.
U.S. Appl. No. 29/461,173, filed Jul. 2013, Sirpal et al.
"Molecule icons—Stock Illustration," depositphotos website, published Oct. 27, 2011, retrieved from http://depositphotos.com/7185518/stock-illustration-molecule-icons.html?sst=0&sqc=4&sqm=26145&sq=2u0ue3, 2 pages.
"Molymod" homepage with Molymod logo, Nov. 11, 1998, retrieved from htpp://web.archive.org/web/19981111190329/http://www.molymod.com/, 2 pages.
"Ozone molecule—Stock Image," deposit photos website, published Mar. 5, 2010, retrieved from http://depositphotos.com/2423035/stock-poto-ozone-molecule.html?sq=47w9sf&sst=60, 2 pages.

(56) References Cited

OTHER PUBLICATIONS

Sumiyoshi, Hideki, et al. "CurioView: TV recommendations related to content being viewed." 2010 IEEE International Symposium on Broadband Multimedia Systems and Broadcasting (BMSB). IEEE, Mar. 2010, 6 pages.
Official Action for U.S. Appl. No. 29/452,457, mailed Nov. 5, 2014, 8 pages.
Official Action for U.S. Appl. No. 29/461,173, mailed Nov. 5, 2014, 6 pages.
Official Action for U.S. Appl. No. 29/452,457, mailed Mar. 26, 2015, 4 pages.
Notice of Allowance for U.S. Appl. No. 29/461,173, mailed Mar. 31, 2015, 7 pages.
International Preliminary Report on Patentability for International (PCT) Patent Application No. PCT/US13/55548, mailed Feb. 26, 2015, 8 pages.
International Search Report and Written Opinion for International (PCT) Patent Application No. PCT/US13/55548 mailed Dec. 2, 2013, 8 pages.
Notice of Allowance (with English translation) for Chinese Patent Application No. 201330387118.0 dated Dec. 24, 2013, 5 pages.

\* cited by examiner

REMOTE CONTROL HAVING HOTKEYS WITH DYNAMICALLY ASSIGNED FUNCTIONS

CROSS REFERENCE TO RELATED APPLICATION

The present application is a continuation of U.S. patent application Ser. No. 18/490,423, filed on Oct. 19, 2023, which is a continuation of and claims the benefit of priority to U.S. patent application Ser. No. 17/678,737, filed on Feb. 23, 2022 and issued as U.S. Pat. No. 11,974,022 on Apr. 30, 2024, which is a continuation of U.S. patent application Ser. No. 15/931,141, filed on May 13, 2020, which is a continuation of U.S. patent application Ser. No. 15/722,790, filed Oct. 2, 2017, which is a continuation of U.S. patent application Ser. No. 14/739,955, filed Jun. 15, 2015, and issued as U.S. Pat. No. 9,807,446 on Oct. 31, 2017, which is a continuation of U.S. patent application Ser. No. 13/863,814, filed Apr. 16, 2013, and issued as U.S. Pat. No. 9,060,152 on Jun. 16, 2015, which claims the benefits of and priorities, under 35 U.S.C. § 119(e), to U.S. Provisional Application Ser. No. 61/659,626 filed Jun. 14, 2012, "Method and System for Customizing Televised Content"; 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; 61/805,038 filed Mar. 25, 2013, "SmartTV," which are incorporated herein by reference in their entireties.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

The Intelligent TV can receive a designation for a silo, wherein a silo is a logical representation of a content source for the Intelligent television. A silo can include a content application (e.g., Live TV, VOD, media center, application center, etc.) and/or an input source. Based on the designation, the Intelligent TV can determine the silo desired by the user. Then, the Intelligent TV can transition to the desired silo and provide content from the silo.

In accordance with the disclosure, a remote control for a television can include one or more hotkeys having an assigned function that depends on one or more of a currently selected silo and panel displayed by the television.

The panel can be a function of the currently selected silo.

A currently assigned function(s) of the hotkey(s) can be displayed by the television.

The remote control can include one or more silo button(s). The silo button(s) can correspond to one or more of Live TV, video on demand, a media center and a software application center.

The remote control can include one or more of (a) a global panel button to provide a user with access to one or more of silos, notifications, a web browser, and/or a system setting and (b) an application panel button to display an application panel comprising information relating to one or more software applications.

A first function of a hotkey can be activated by the hotkey in a first state of the television while a different second function can be activated by the hotkey in a different second state of the television.

A first function of the hotkey can be activated by the hotkey when a user focus is at a first screen position while a different second function can be activated by the hotkey when the user focus is at a different second screen position.

The remote control can include a moveable joystick that, when manipulated, causes a window on a screen of the television to be displaced a proportional amount. The window can include, for example, one or more of information related to a currently displayed image and/or content, a browse request, and a search request.

The remote control can include a social network button to select automatically and publish, by a social network service, content displayed by the television, the content being published to a social network and/or online community.

The remote control can include a social network button to turn up and/or turn down a social volume visualization rendered by the television. Typically, the social volume visualization is in the form of one or more displayed images containing information about a social network-linked contact of the viewer or user.

The present disclosure can provide a number of advantages depending on the particular aspect, embodiment, and/or configuration. The use of hotkeys can provide a more versatile remote control. The dynamically assigned functions can effectively provide a more capable remote control while substantially minimizing the number of required buttons and remote control size. The silo arrangement provides a contextual model for the user's interaction with the Intelligent TV. The silos are organized and provided in a manner to make changes between content sources more seamless and efficient. The user can understand the movements between silos and understand the icons and other visual indicia that are associated with the silos. Upon using the Intelligent TV, the user becomes accustom to and comforted by the ease at which the Intelligent TV presents content. The systems and methods herein provide new user interfaces for providing VOD with the Intelligent TV. The user interfaces have an intuitive layout, structure, organization, and methodology. Thus, the user can more easily learn and navigate the options associated with VOD with the Intelligent TV.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p-1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777, 600 pixels (approximately 0.8 megapixels) per field or 1,555,200 pixels (approximately 1.6 megapixels) per frame), or 720p—1280×720p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTE Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content, (e.g., a media center, a file system, etc.). An application can be a software service that provides a particular type of function (e.g., Live TV, Video on Demand, User Applications, Photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

A "smart TV", sometimes referred to as connected TV or hybrid TV, (not to be confused with IPTV, Internet TV, or with Web TV), describes a trend of integration of the Internet and Web 2.0 features into television sets and set-top boxes, as well as the technological convergence between computers and these television sets/set-top boxes. The devices have a higher focus on online interactive media, Internet TV, over-the-top content, as well as on-demand streaming media, and less focus on traditional broadcast media than traditional television sets and set-top boxes.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modem implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System (';GPS") (US), GLONASS (Russia), Galileo positioning system (EU), Compass navigation system (China), and Regional Navigational Satellite System (India). The term "display," as used herein, refers to at least a portion of a screen used to display the output of the television to a user. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The term "display" refers to a portion of one or more screens used to display the output of a computer to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chat rooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellite and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

It shall be understood that the term "means," as used herein, shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
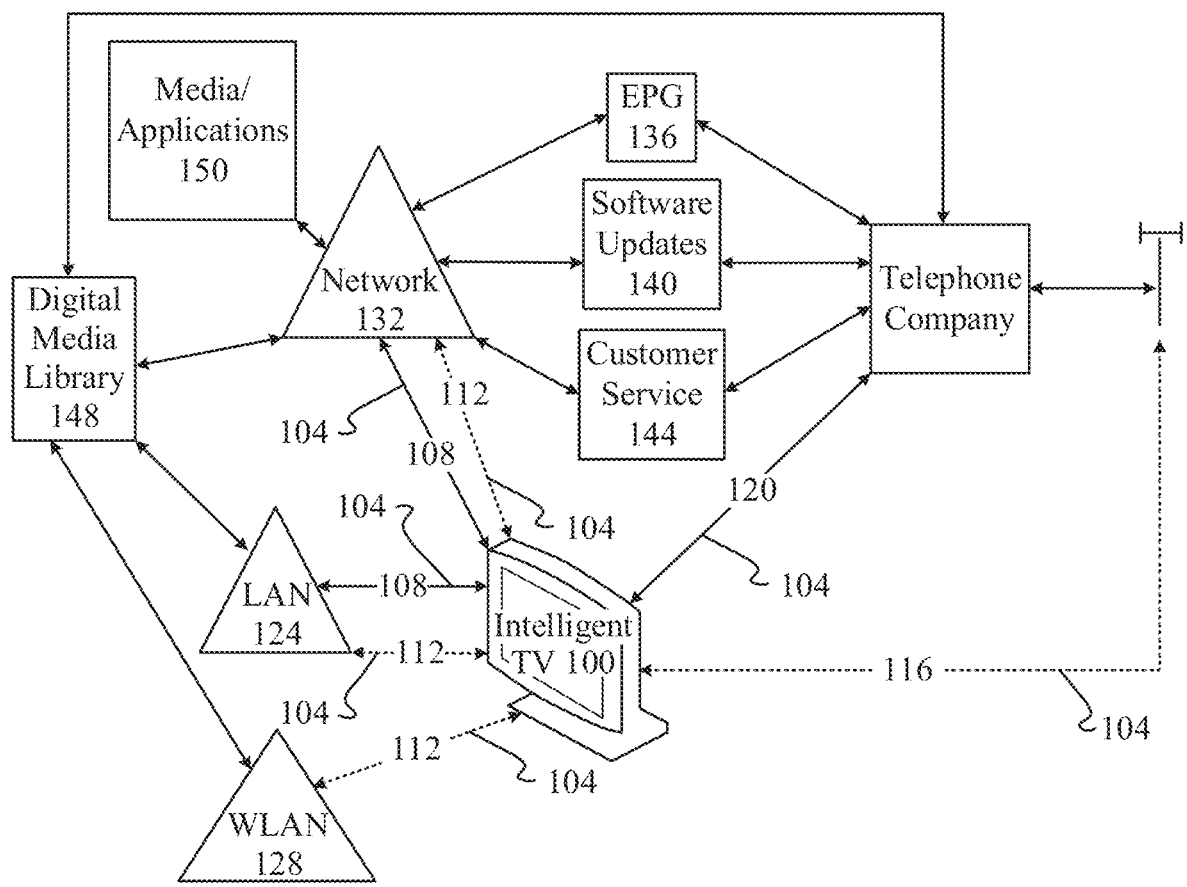
FIG. 1A includes a first view of an embodiment of an environment or an intelligent television.
Figure 1B:
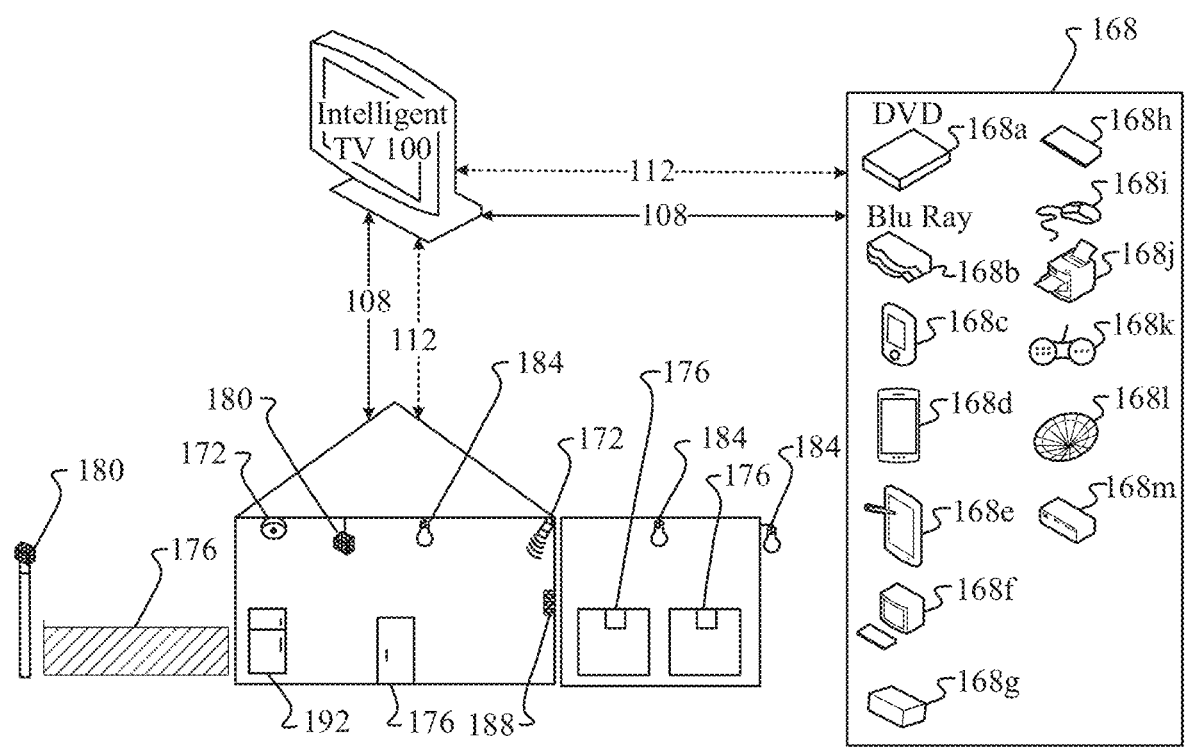
FIG. 1B includes a second view of an embodiment of an environment or an intelligent television.

Intelligent Television (IV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, notebooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116, and by using a telephone line 120 to connect to telephone networks operated by telephone companies. These connections 104 enable the Intelligent TV 100 to access one or more communication networks. The communication networks may comprise any type of known communication medium or collection of communication media and may use any type of protocols to transport messages or signals between endpoints. The communication networks may include wired and/or wireless communication technologies. The Internet is an example of the communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks may be connected in a redundant manner to ensure network access. In other words, if one connection is interrupted, the intelligent TV 100 can use an alternate communications path to reestablish and/or maintain the network connection 104. Among other things, the intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or online community (e.g., Facebook, Twitter, LinkedIn, Pinterest, GooglePlus, MySpace, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture; and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168a, BluRay players 168b, portable digital media devices 168c, smart phones 168d, tablet devices 168e, personal computers 168f, external cable boxes 168g, keyboards 168h, pointing devices 168i, printers 168j, game controllers and/or game pads 168k, satellite dishes 168l, external display devices 168m, and other universal serial bus (USB), local area network (LAN), Bluetooth™, high-definition multimedia interface (HDMI) compliant devices, and/or wireless devices. When connected to an external cable box 168g or satellite dish 168l, the Intelligent TV 100 can access additional media content. Also, as further described below, the intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The intelligent TV 100 may also be used to control the operation of, and may interface with, other smart components such as security systems 172, door/gate controllers 176, remote video cameras 180, lighting systems 184, thermostats 188, refrigerators 192, and other appliances.

Intelligent TV

Figure 2A:
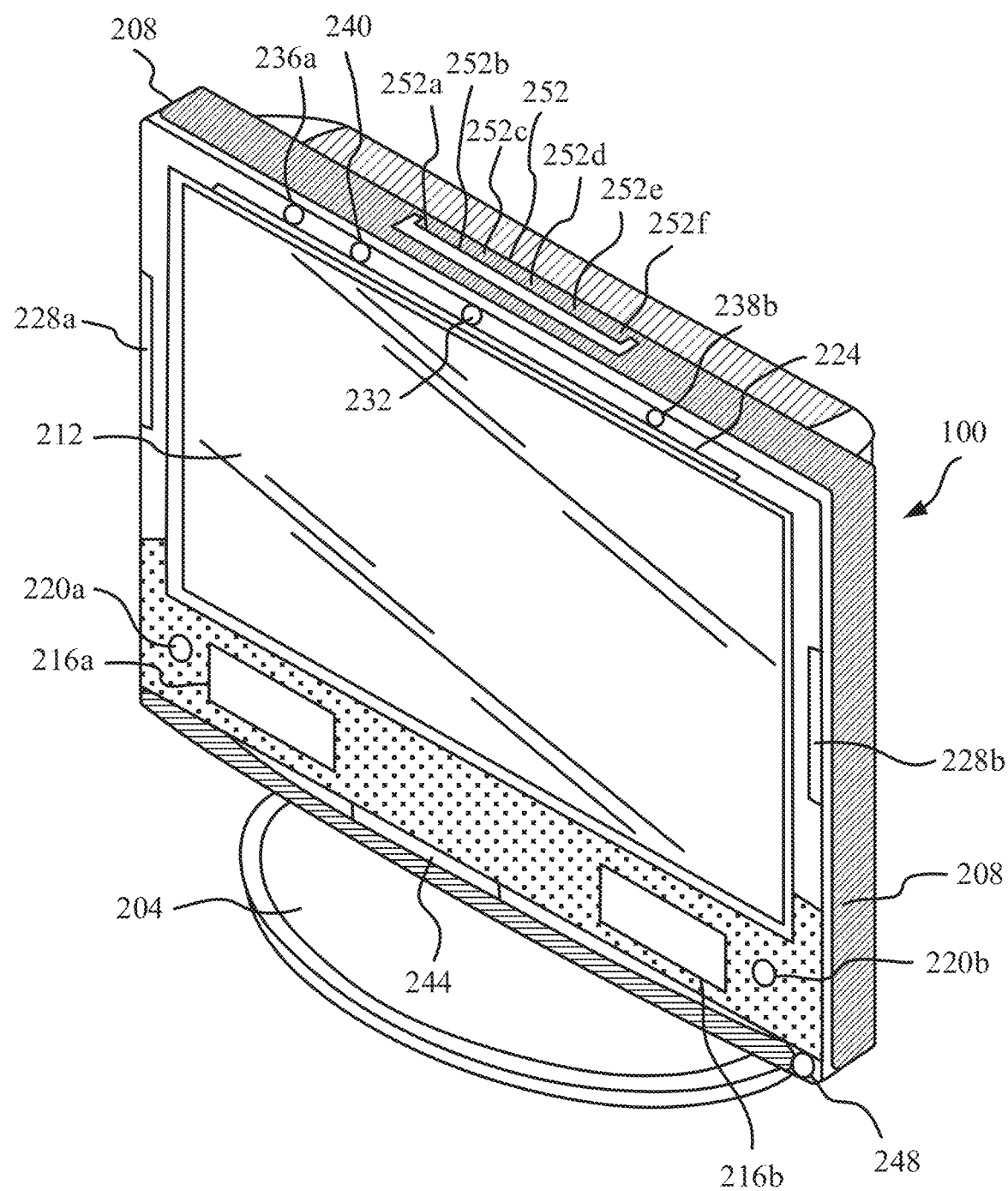
FIG. 2A includes a first view of an embodiment of an intelligent television.

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224,228 may comprise areas or regions that are capable of receiving input by recognizing gestures made by the user, and in some examples, without the need for the user to actually touch the screen 212 surface of the Intelligent TV 100. However, the gesture capture regions 224,228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user. An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
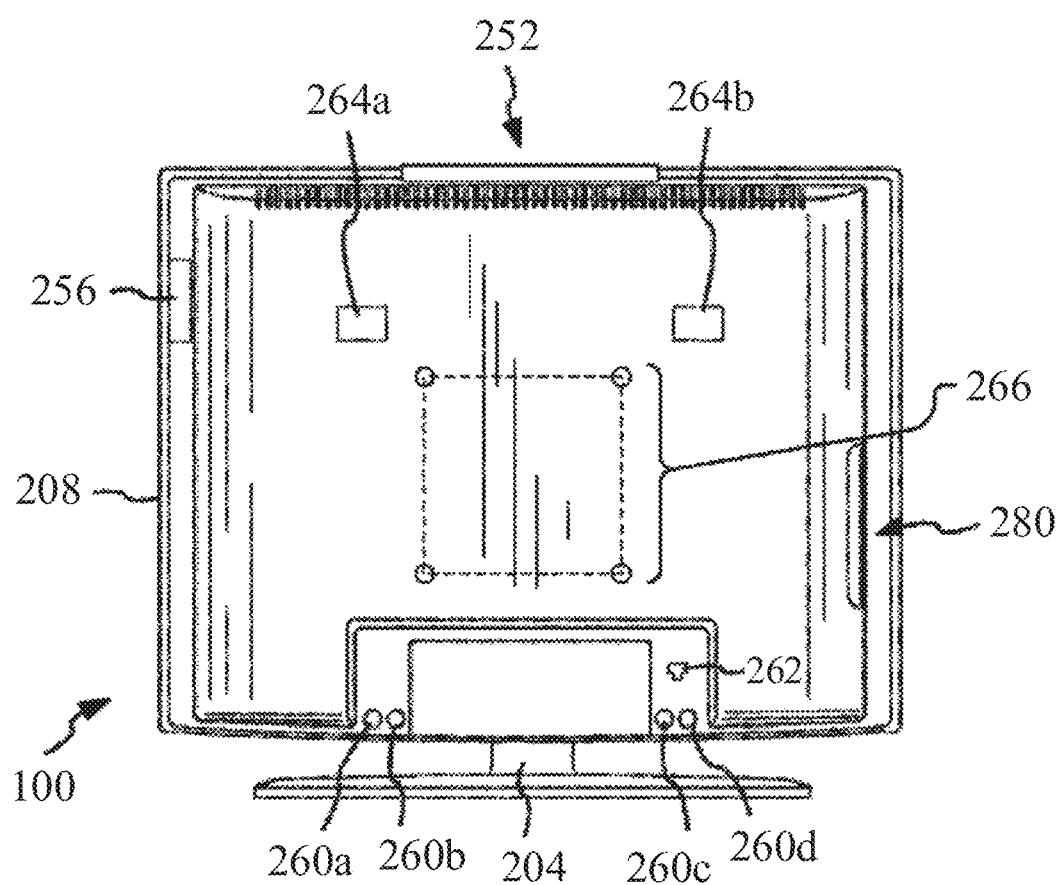
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces.

The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
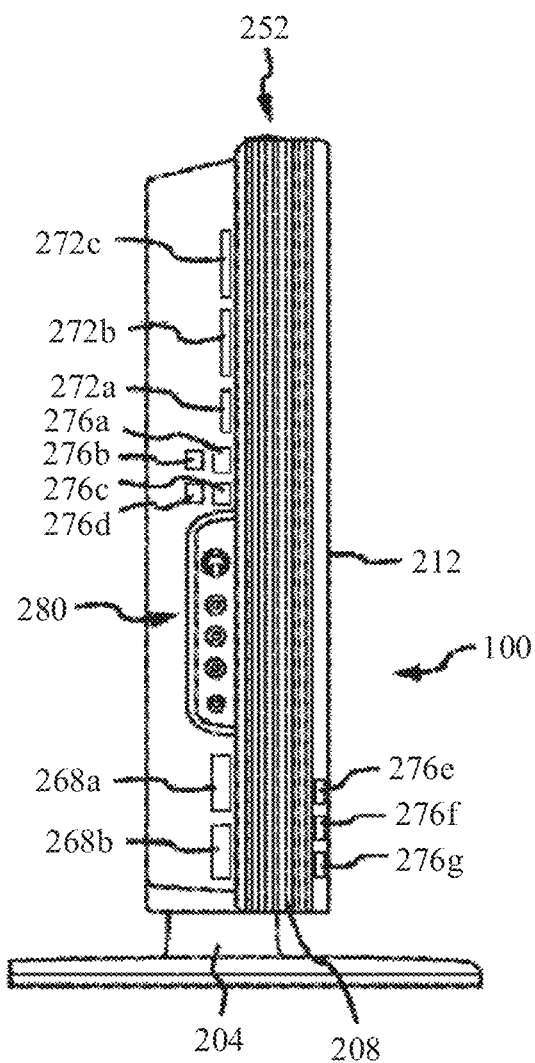
FIG. 2C includes a third view of an embodiment of an intelligent television.
Figure 2D:
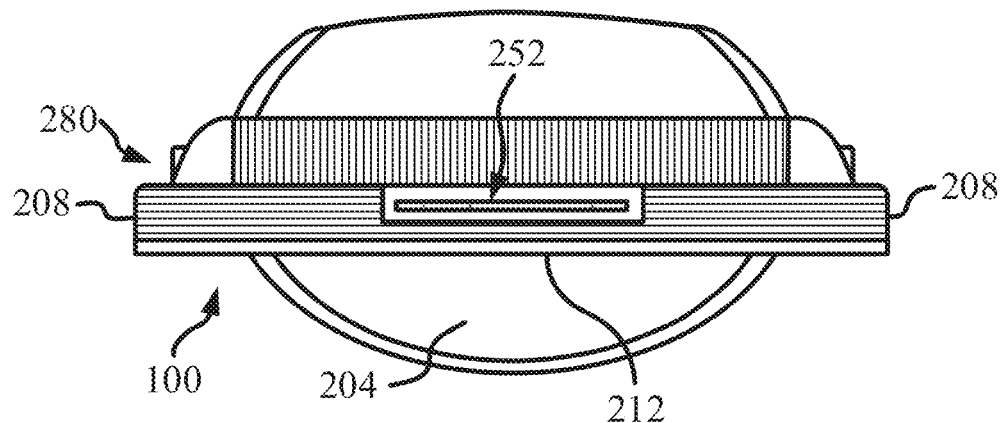
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

Figure 2E:
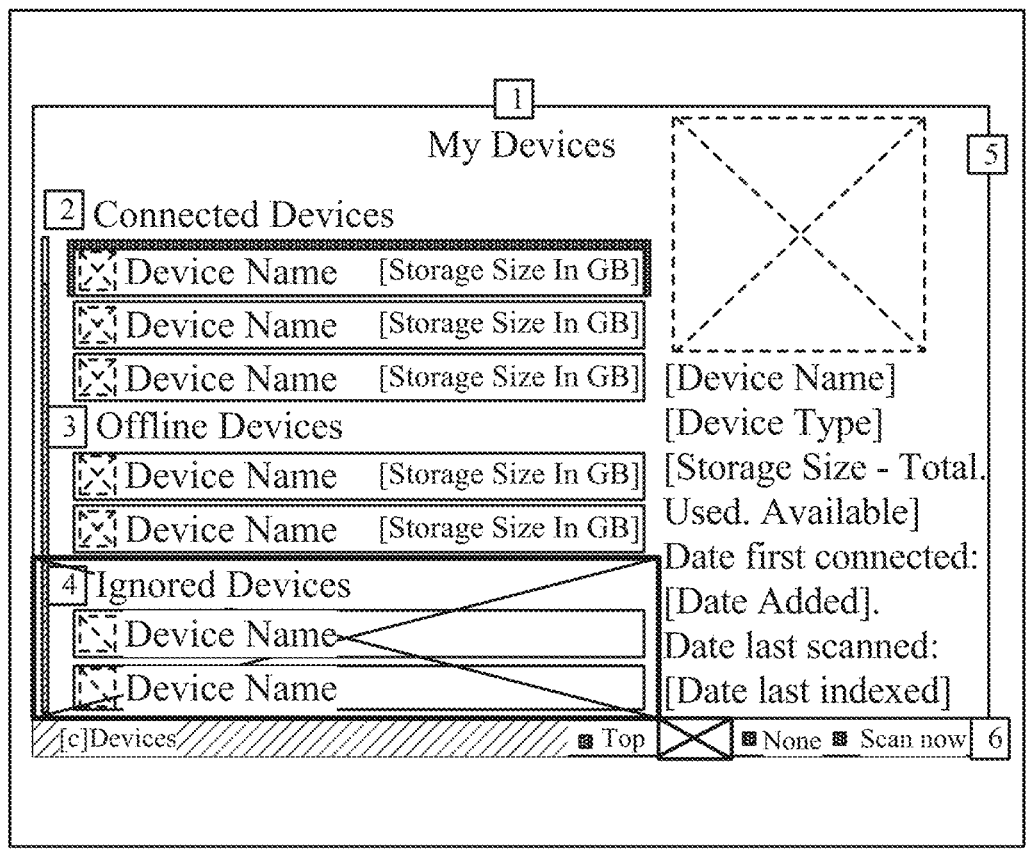
FIG. 2E shows an example interface for viewing all devices according to an embodiment of the present disclosure.

FIG. 2E shows an all-device view according to an embodiment of the present disclosure. The interface as shown can include a title bar (1), connected devices (2), offline devices (3), ignored devices (4), selected device information (5) and a hot key legend (6). Connected devices can include any device connected to the intelligent television via an input port. This is a view of the contents of a directory when navigated to via the Devices tab. Only folders and recognized media files are shown in this view. In this interface, the red hot key can return the user to the top of the collection; the yellow hot key can toggle the visibility of the ignored category of devices, where the default value for ignored devices are hidden; the green hot key indicates a none state; and the blue hot key forces a scan of whatever item is currently selected, and any actively running scan is suspended while the new scan runs.

Figure 2F:
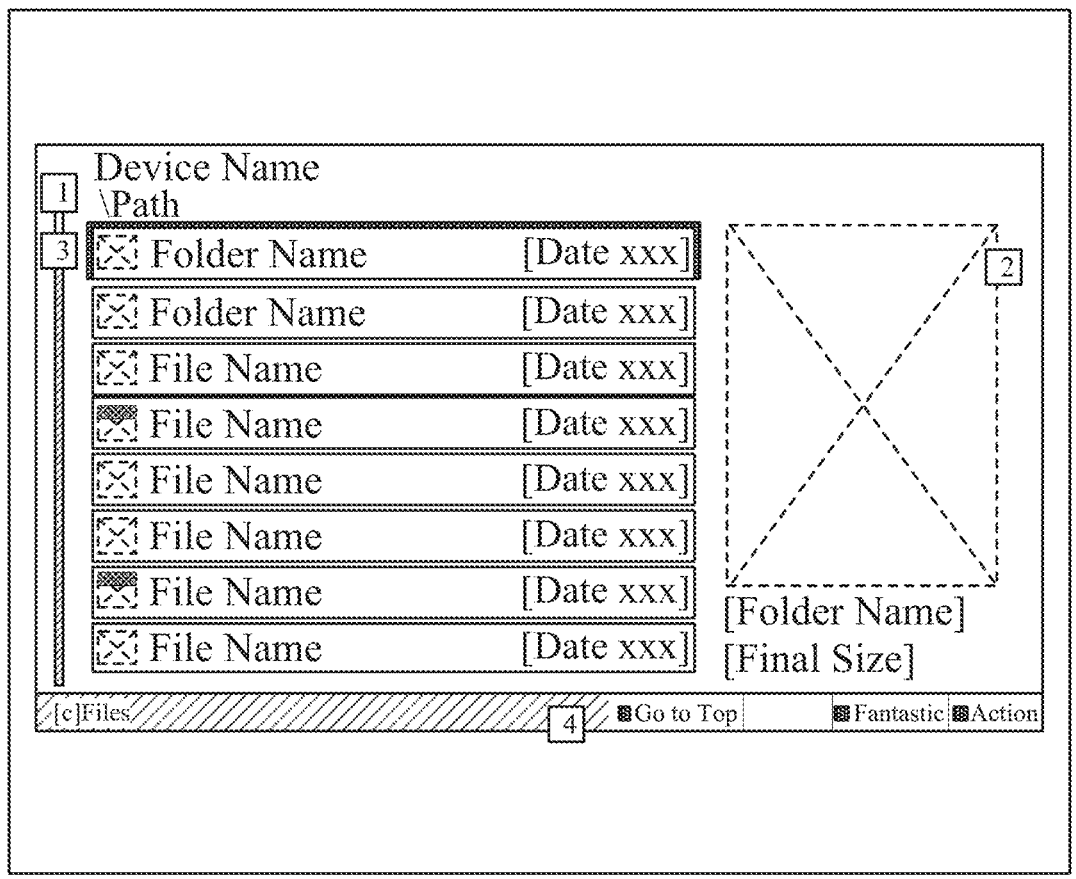
FIG. 2F shows a sub directory view of devices according to an embodiment of the present disclosure.

FIG. 2F shows a sub directory view of the devices according to an embodiment of the present disclosure. The interface as shown can include a device name and path (1), a preview of selected item (2), folder contents (3) and a file count and hot key legend (4). This is a view of the contents of a directory when navigated to via the devices tab. Only viewable media files and folders containing viewable media files are shown in this view. In this interface, the red hot key can return the user to the top of the collection; the yellow hot key rearranges the sort order in the collection to cycle between data (descending)-alphabetic (ascending); the green hot key indicates a none state and the blue hot key marks any media item or folder in focus as a favorite, and if the item is already a favorite, this key is pressed to remove it from favorites.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog to digital converter.

Figure 3:
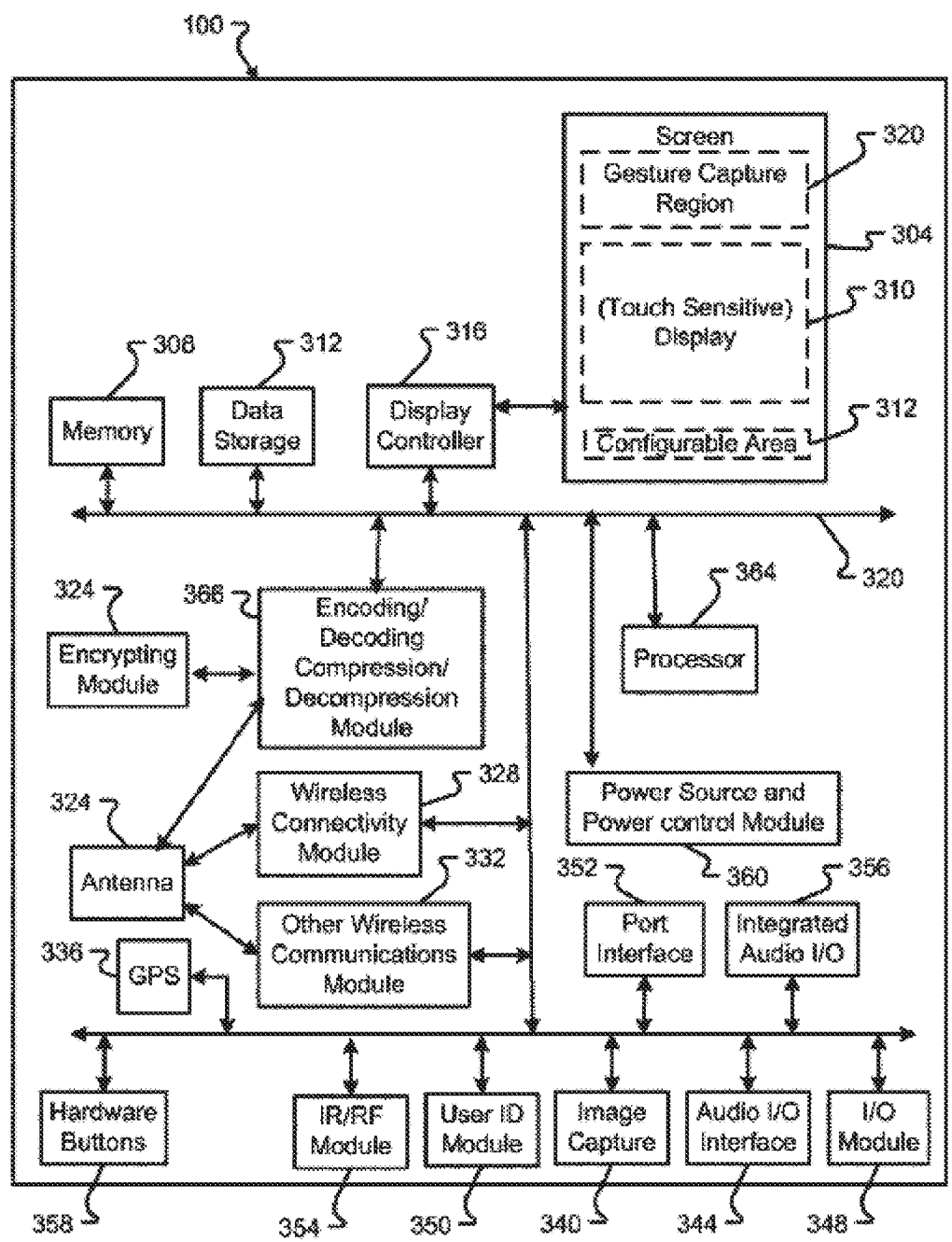
FIG. 3 is a block diagram of an embodiment of the hardware of the intelligent television.

Hardware Features:

FIG. 3 illustrates components of an Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/ decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 324 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 312 may be provided. Like the memory 308, the data storage 312 may comprise a solid state memory device or devices. Alternatively or in addition, the data storage 312 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC to DC converter, power control logic, and/or ports for interconnecting the Intelligent TV 100 to an external source of power.

Figure 4:
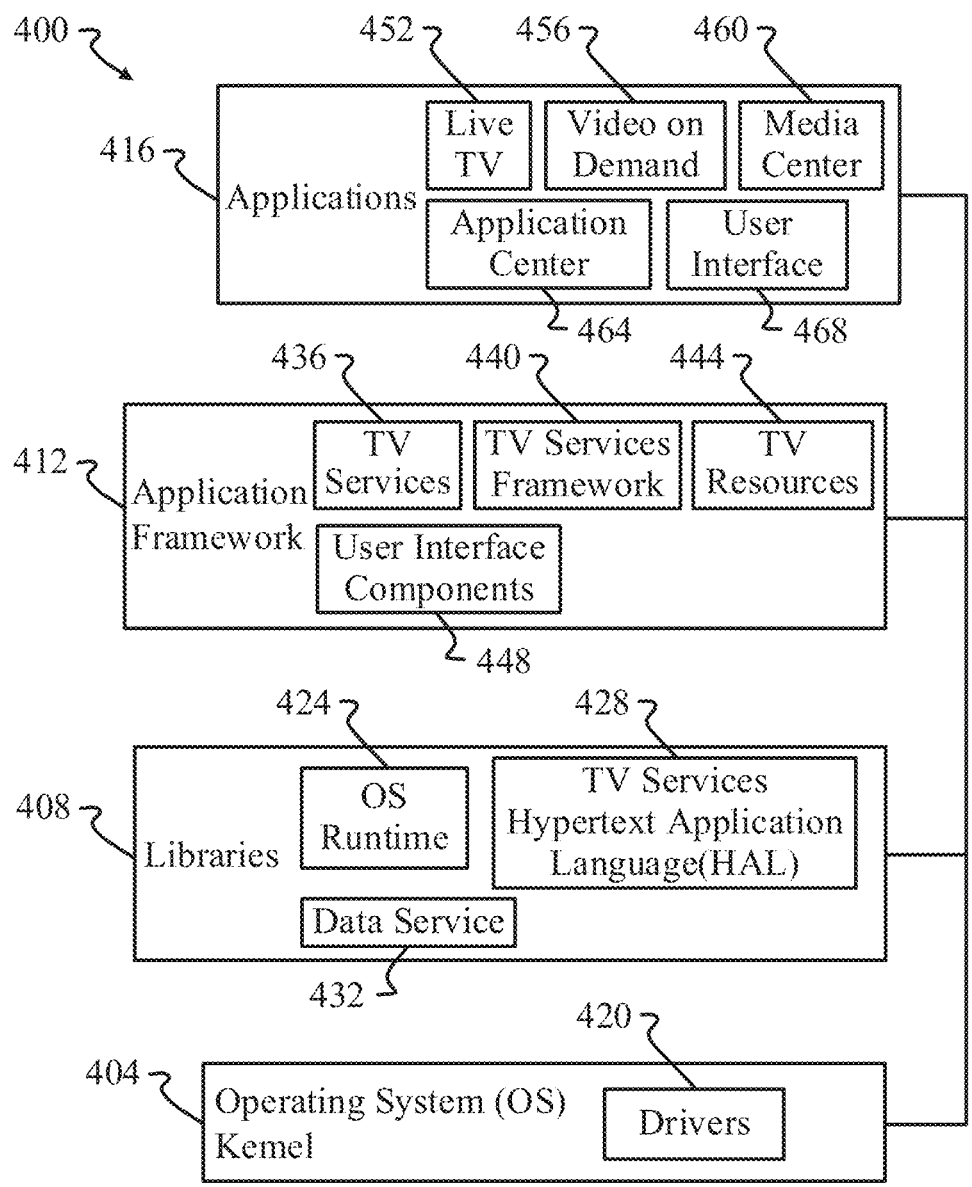
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hypertext application language (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hypertext application language 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hypertext application language.

Figure 6:
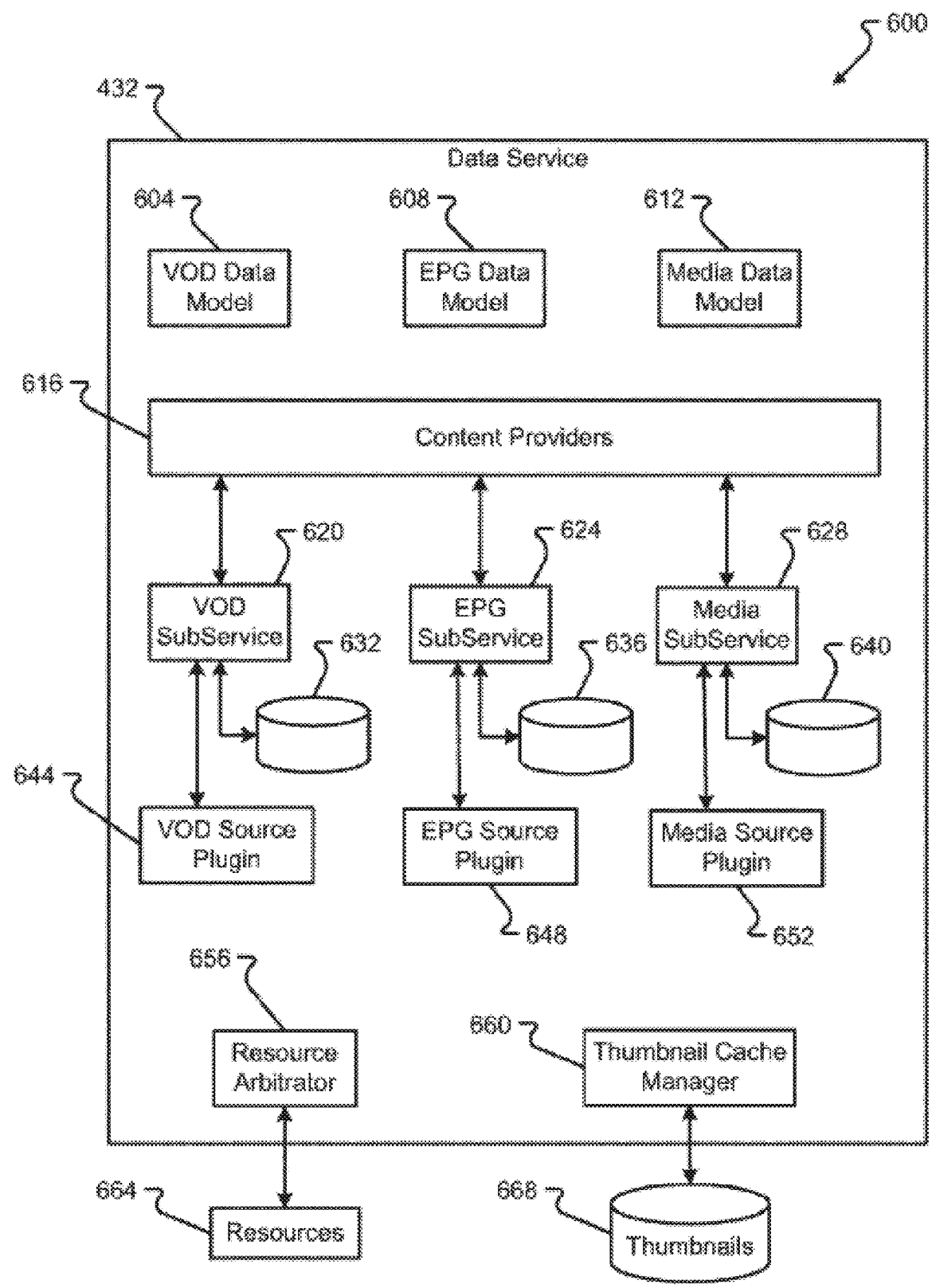
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more application 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources. The application framework 412 can include one or more, but is not limited to, TV services 434, TV services framework 440, TV resources 444, and user interface component 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources including any types of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application, 452, can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide application for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
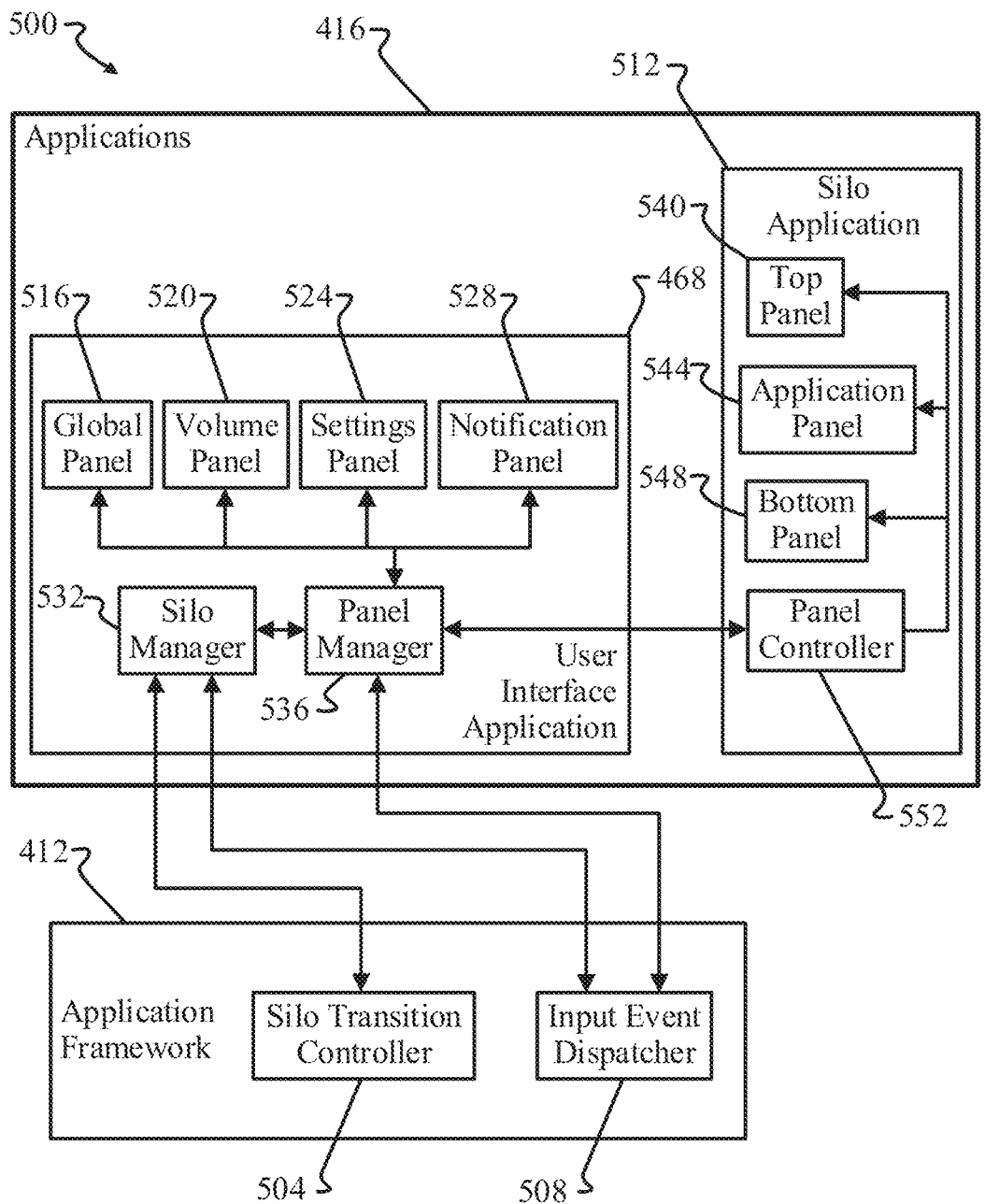
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input even dispatcher 508. These events can include selections of buttons on a remote control or on the TV or other types of user interface inputs. The input even dispatcher may then send these events to a silo manager 532 or panel manager 536 depending on the type of the event. The silo transition controller 504 can interface with the silo manager 532 to affect changes in the silos.

The application framework 416 can include a user interface application 468 and/or a silo application 512. The application framework 416 can include more or fewer user interface applications as necessary to control the user interface of the Intelligent TV 100 than those shown in FIG. 5. The user interface application can include a silo manager 532, a panel manager 536, and one or more types of panels 516 through 528. The silo manager 532 manages the display and/or features of silos. The silo manager 532 can receive or send information from the silo transition controller 504 or the input event dispatcher 508 to change the silos displayed and/or to determine types of input received in the silos.

Figure 64:
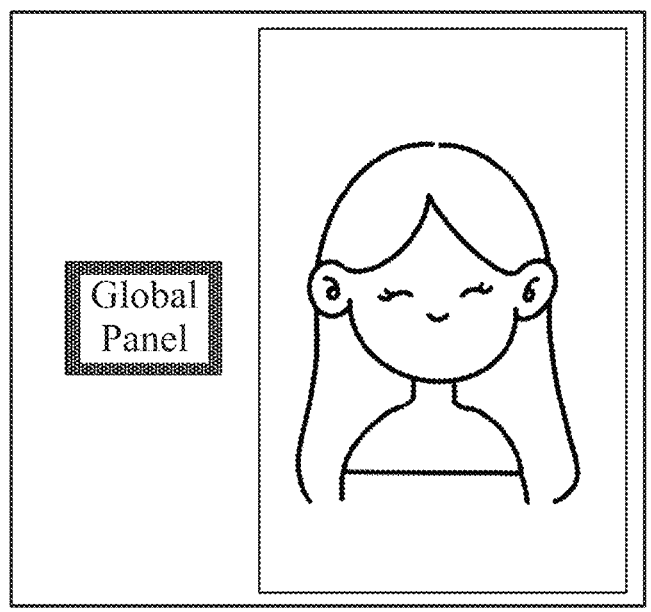
FIG. 64 shows a global panel according to some embodiments of the present disclosure.
Figure 65:
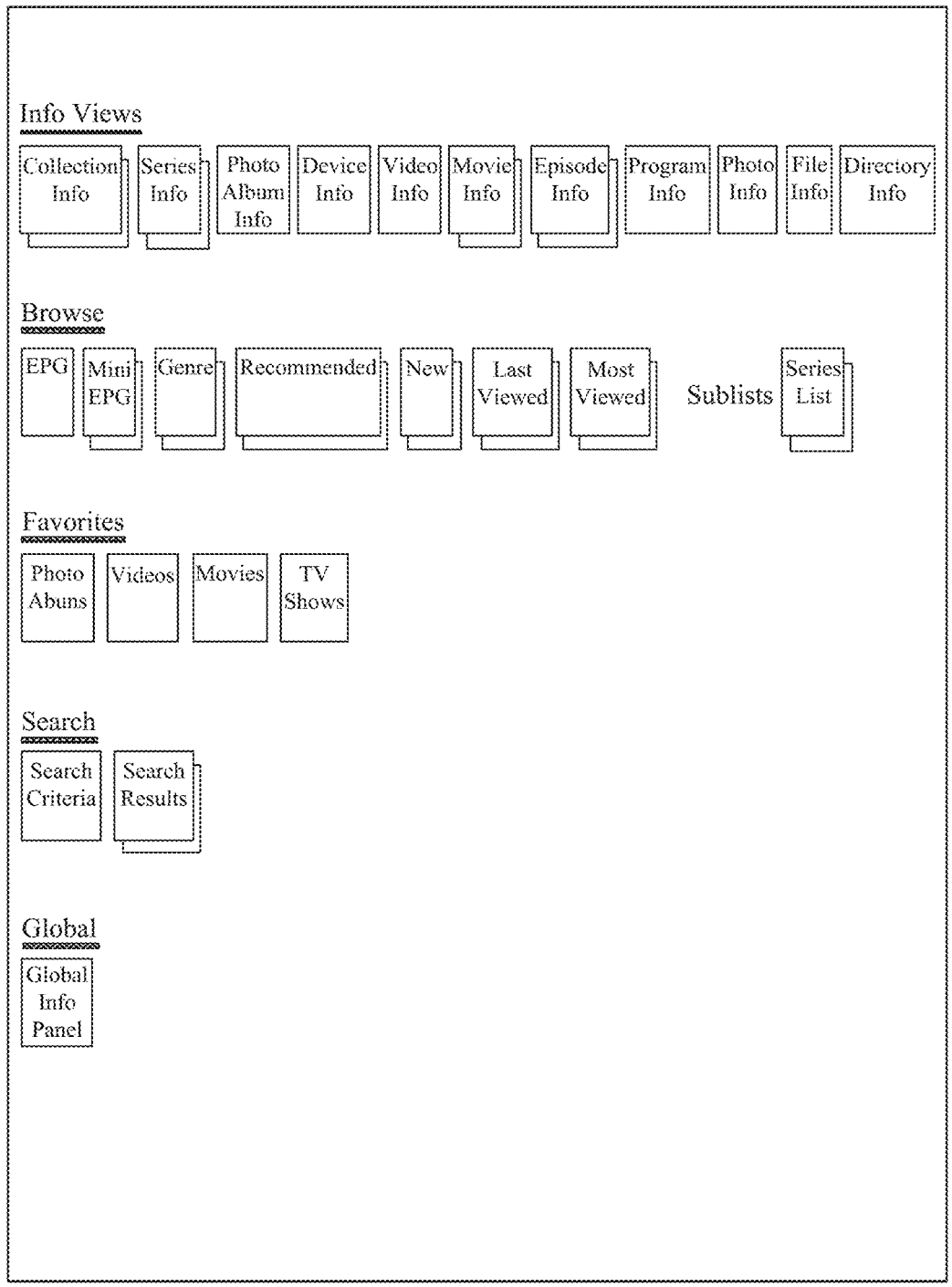
FIG. 65 shows an intelligent television supporting 5 main categories of panels according to some embodiments of the present disclosure.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512. The global panel 516 can be configured to contain functionality that exists at a system level, and can be completely independent of the currently viewed content. The global panel 516 can have multiple key benefits, such as, providing consistent high level actions across all applications, providing an anchor for all views, following the same pattern as the application panels, and unifying experience, etc. In some embodiments, an example of the global panel can be of the form shown in FIG. 64. The global panel may not be content sensitive and can provide system level functionalities. The intelligent television can support, for example, 5 main categories of panels shown in FIG. 65. Within in each of these categories, there may be multiple variations. The types of panels available are based on the needs of the applications.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548. The application panel 544 can be contextual to an active application view. The application panel 544 may provide customized information in each application. The navigation pattern and content layout can remain consistent across all applications. There may be maximum six tabs in the application panel navigation bar. Each tab can represent a panel view. The total number of views in application panel may vary in each application. The application panel navigation bar can follow the same interaction pattern across all functions. If overflow happens, the navigation bar may become horizontally scrollable and visual feedback will be provided to indicate so. The content area can be panel view specific, i.e., when a panel view in focus changes, the content area updates to the corresponding panel view that is currently in focus. The active view should not be interrupted while the user is navigating the application panel. The hot key legend may be positioned at the bottom of the panel in an application. The functions of hot keys are context sensitive, and it might vary in different application. However, the red and yellow keys can be navigation based shortcuts, and the green and blue keys can be action based shortcuts, such as marking a series as favorite. The application panel may have multiple key benefits, such as, quickly accessing to core functionality, unobtrusively designing allowing the active video to always be in view, consistent user experience across all applications, and focused contextual content, etc.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservice 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager may obtain thumbnail information from one of the data subservices 620, 624, 628 and store that information in the thumbnail database 666. Further the thumbnail cache manager 660 may extract or retrieve that information from the thumbnails database 666 to provide to one of the data subservices 620, 624, 628.

Figure 13:
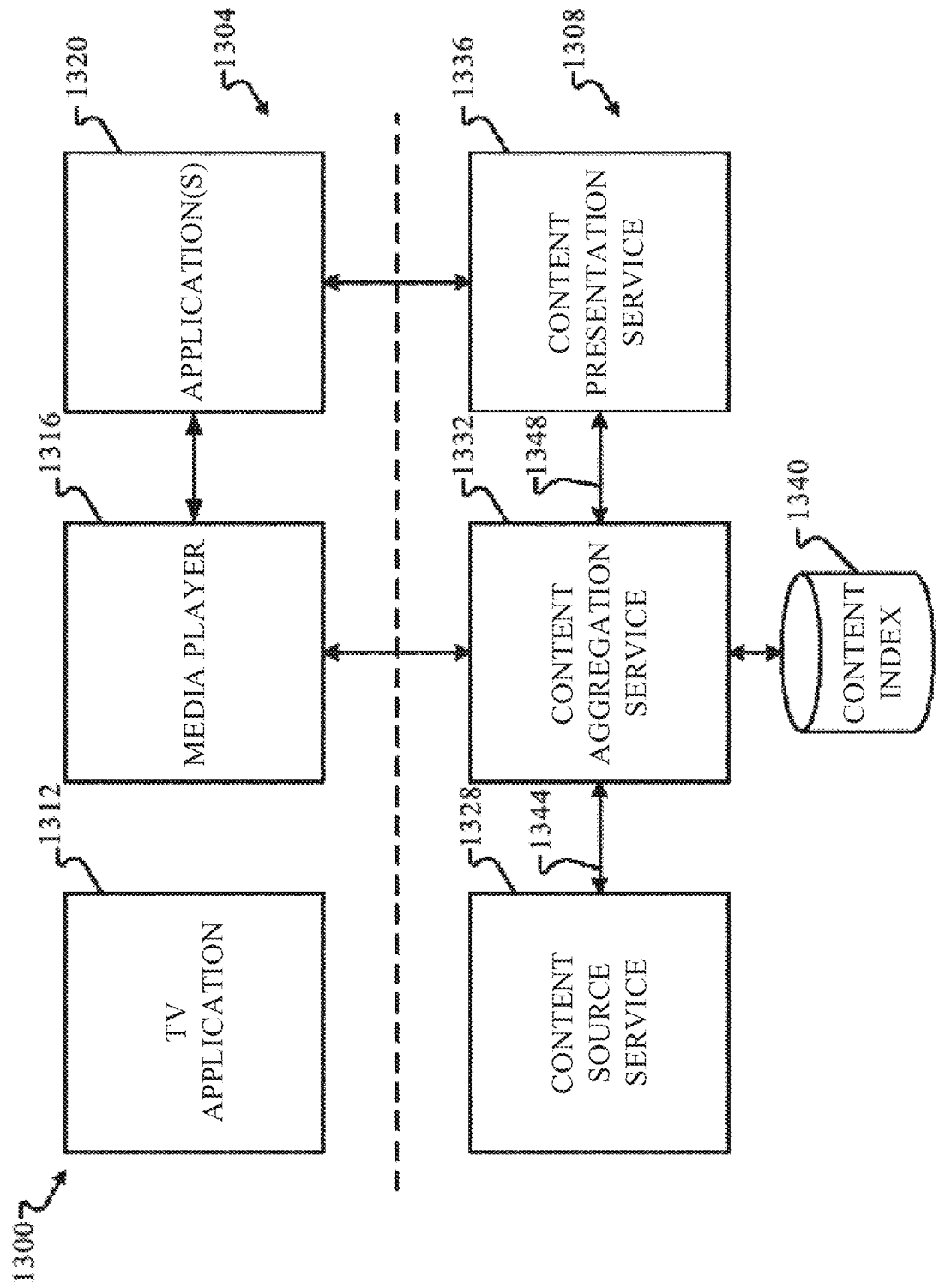
FIG. 13 is a block diagram of an embodiment of a content data service.

An exemplary content aggregation architecture 1300 is shown in FIG. 13. The architecture can include a user interface and content aggregation layers 1304 and 1308. The user interface layer 1304 may include a TV application 1312, media player 1316, and application(s) 1320. The TV application 1312 can enable the viewer to view channels received via an appropriate transmission medium, such as cable, satellite, and/or the Internet. The media player 1316 can view other types of media received via an appropriate transmission medium, such as the Internet. The application(s) 1320 can include other TV-related applications, such as content viewing, content searching, device viewing, and setup algorithms, and works with the media player 1316 to provide information to the viewer.

The content source layer 1308 can include, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 can start content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or an action of the user), the user interface layer 1300 disconnects the socket. As shown, media can be provided directly by the content aggregation service 1332 to the media player 1316 for presentation to the user.

Figure 7:
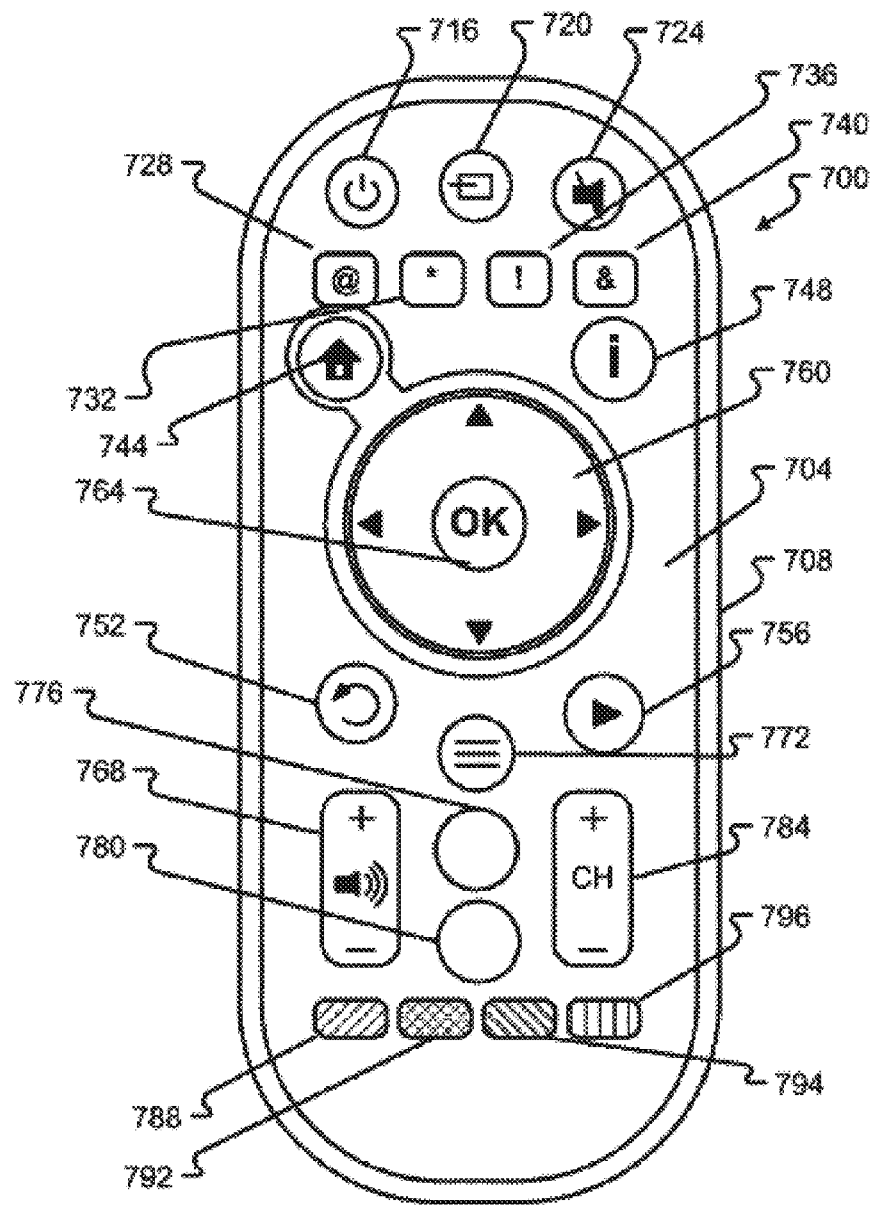
FIG. 7 is a plan view of an embodiment of a handheld remote control.
Figure 8:
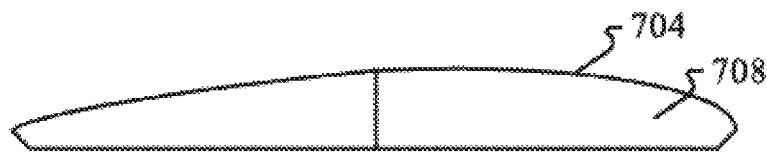
FIG. 8 is a side view of an embodiment of a remote control.
Figure 9A:
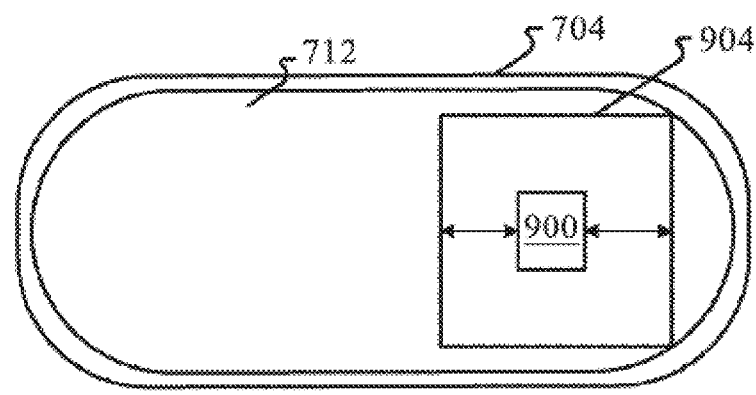
FIG. 9A is a bottom view of an embodiment of a remote control with a joystick in a neutral position.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as displayed images on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can include previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen.

Commonly, a currently assigned function of any of the fast, second, third, and forth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 52:
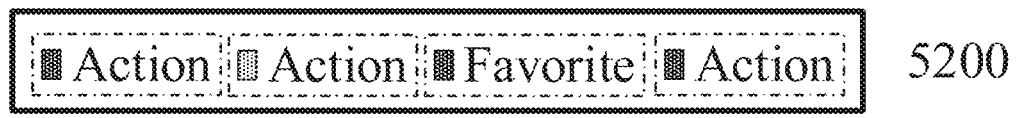
FIG. 52 shows a hotkey legend according to some embodiments of the present disclosure.

An embodiment of a hotkey legend 5200 is shown in FIG. 52.

The hotkey legend can be a common component that appears throughout the overall system. This component can provide information on the contextual function of hotkeys for the current view. The legend can be visible for any view that supports hotkey functionality. Components can comprise simple components and complex components. Typically, complex components are made up of a group of two or more simple components. The hotkey legend can be considered as a type of components. In addition to the hotkey legend components, there are many other components. All components will support some or all of the following states in Table I.

TABLE I

| state | Selection state | Description |
|---|---|---|
| enabled | normal | This is the default view |
| | Selected—active | The object is selected and has focus |
| | Selected—passive | The object is selected, but does not have focus |
| | Non selected—focus | The object has focus but is not selected |
| | Pressed | Shown while the user is pressing the selection key |
| Disabled | | The object is visible but not actionable |
| Unavailable | | The object is visible but not available for use |

| | | |
|---|---|---|
| 1 | Red Graphic | Associated Action |
| 2 | Yellow Graphic | Associated Action |
| 3 | Green Graphic | Associated Action |
| 4 | Blue Graphic | Associated Action |

| | | |
|---|---|---|
| 1 | Enabled | |
| 2 | Disabled | If an action is not applicable to the currently selected object, the hotkey can be made to appear disabled. |
| 3 | Unavailable | If a view has not associated action for a hotkey, it can be made to appear unavailable. |

The following selection states can be supported.

| | | |
|---|---|---|
| 1 | None | This is the normal state for this control |
| 2 | Pressed | When a hotkey is pressed on the remote, the legend can provide some visual feedback. |

Figure 53:
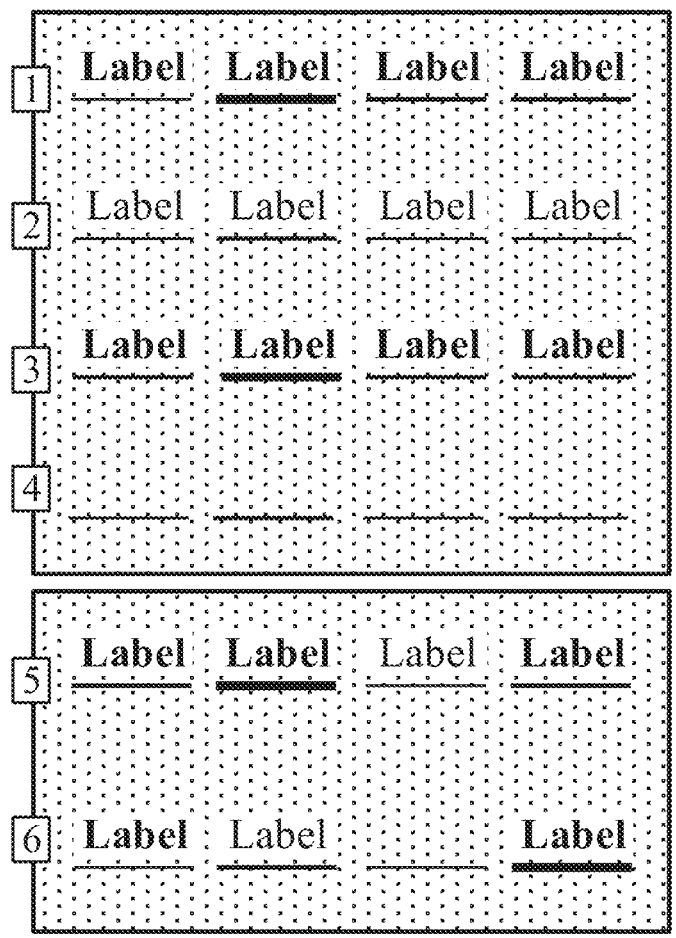
FIG. 53 shows a hotkey visual design according to some embodiments of the present disclosure.
Figure 54:
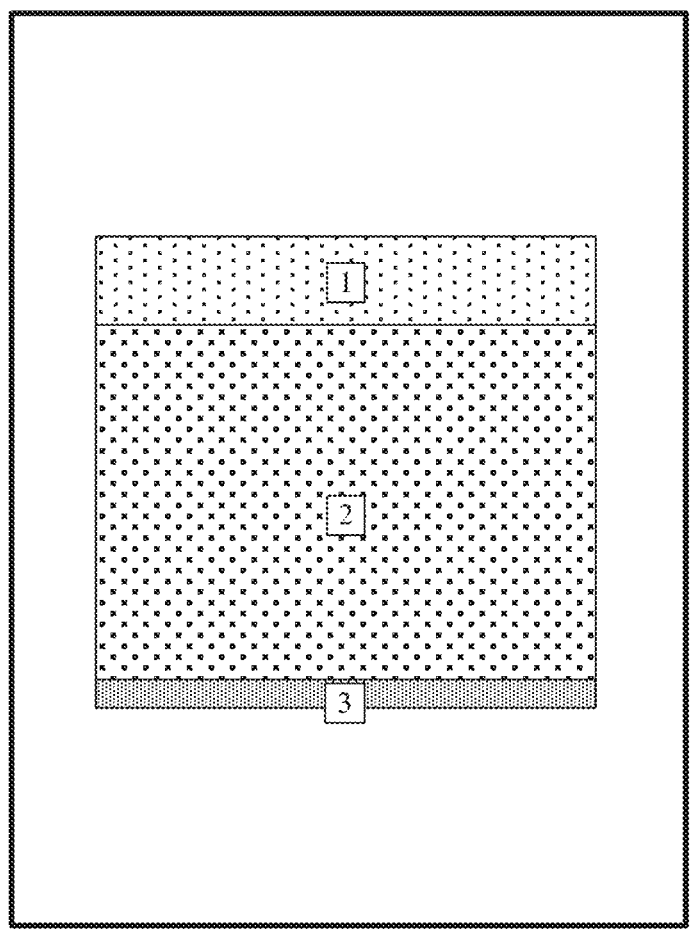
FIG. 54 shows an information panel according to some embodiments of the present disclosure.

An embodiment of a hotkey visual design is shown in FIG. 53. Hotkeys can be found in various views, but master views (i.e., showcase views) may be one of its exceptions. Hot keys may have a different background or no background depending on the location. For example, the global panel and the collection view may have a different background. All hotkeys may have four states as shown in FIG. 53: normal state (1), where this is used for enabled actions; disabled state (2), where this is used for when an action is temporarily disabled; pressed state (3), where this is used for when a command for the action is received; and unavailable (4), where this is used for when actions are not present. Majority of silo screens and their sub layout can use the same basic structure, unless specified differently. For example, in master collect layout shown in FIG. 54, the interface layout can comprise a header area (1), a content area (2) and a footer area (3). The header area (1) can display navigation, brand and elements. The content area (2) can display different types of content layouts and list items that either horizontally or vocally. The footer area (3) can display system and contextual information and hot key related events, or none of the above unless specified.

Figure 55:
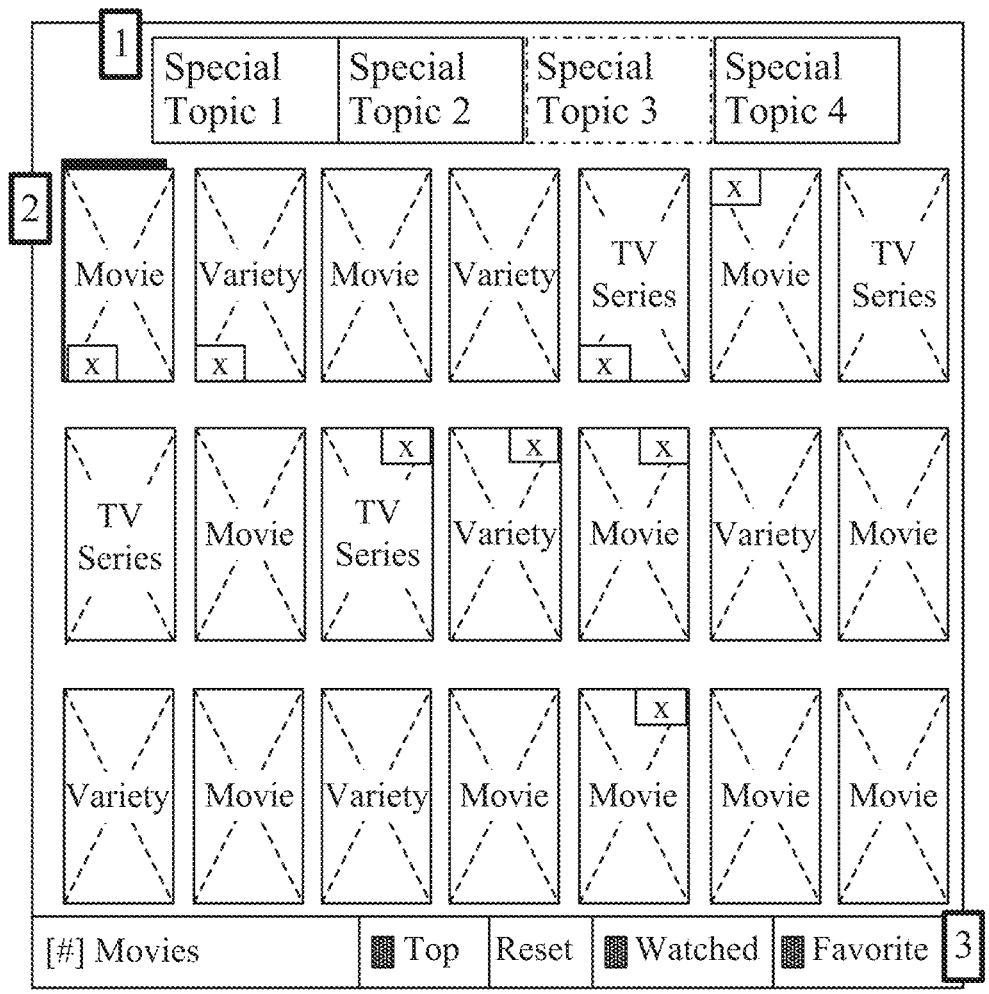
FIG. 55 shows a content area including many items according to some embodiments of the present disclosure.

In some embodiments shown in FIG. 55, the header area (1) can be a special topics navigation bar, the content area (2) can be a collection area, and the footer area (3) can be a hot key legend. Special topics in FIG. 55 are small collections of comment that all share some common timely topic. These collections are defined by the provider and will be in the range of 15-20 items. Special topics are dynamic and change regularly. The sort order is defined by the content provider. As shown in FIG. 55, there are many items listed in the content area. The footer area can include hotkey legend. For example, the red hotkey can be used for returning the user to the top of the collection. The yellow hotkey is not associated with any function on this interface. The green hotkey can be used for indicating watched state, and can toggle watched state of the video between not watched—in progress. The blue hotkey will make any media in focus as a favorite. If the video media is already a favorite, this key can be pressed to remove it from a favorite. It should be noted that the above example is merely an embodiment of the hotkey arrangement on a user interface or a silo or application. In other embodiments, the hotkey(s) can be arranged in another manner.

Figure 56:
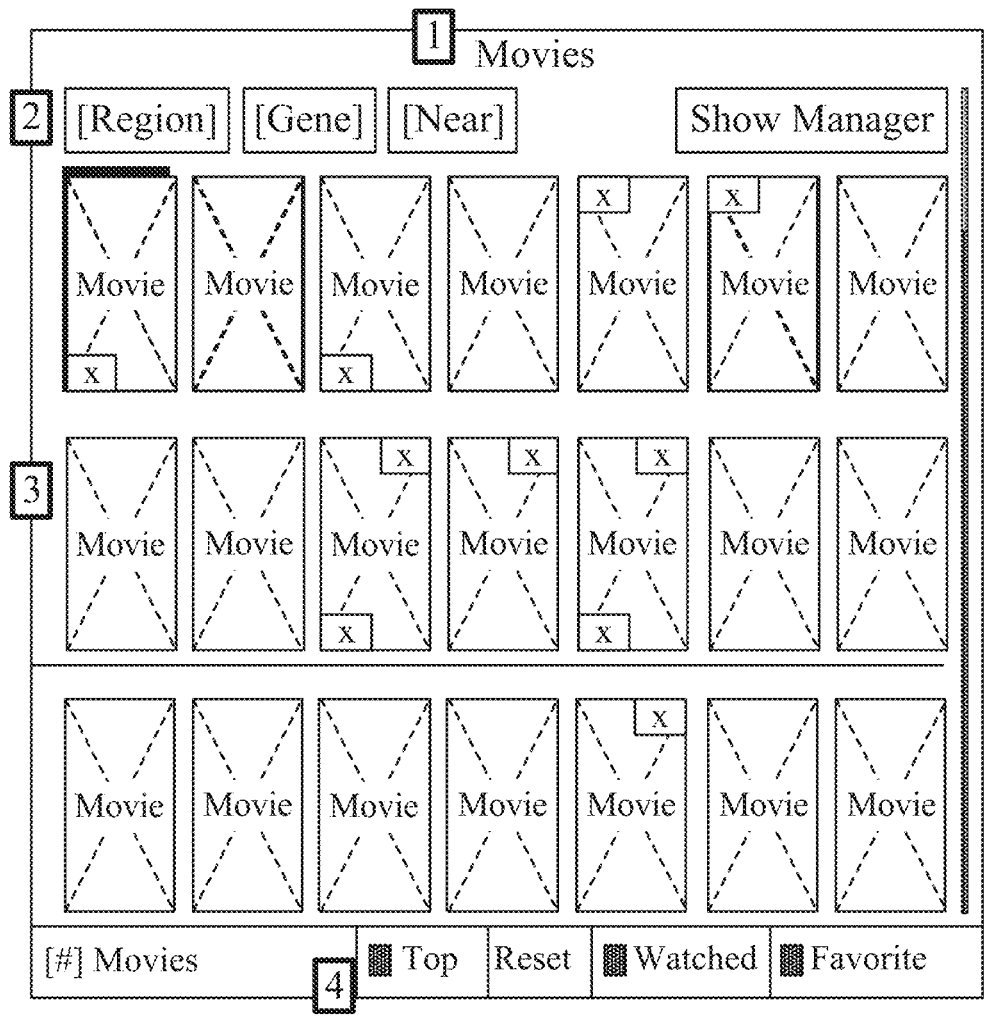
FIG. 56 shows another user interface according to some embodiments of the present disclosure.

For example, in another user interface shown in FIG. 56, the yellow hotkey is visually indicated for resetting all filters. The catalog view shown in FIG. 56 provides a vertically scrolling collection of all movie posters tagged with the specific stars. Default sort is alphabetical. Scrolling to the bottom of the collection will provide visual feedback. For example, the red hotkey can be used for returning the user to the top of the collection. The yellow hotkey resets at fitters to all on this interface. The green hotkey can be used for indicating watched state, and can toggle watched state of the video between not watched—in progress. The blue hotkey will make any media in focus as a favorite. If the video media is already a favorite, this key can be pressed to remove it from a favorite.

Figure 57:
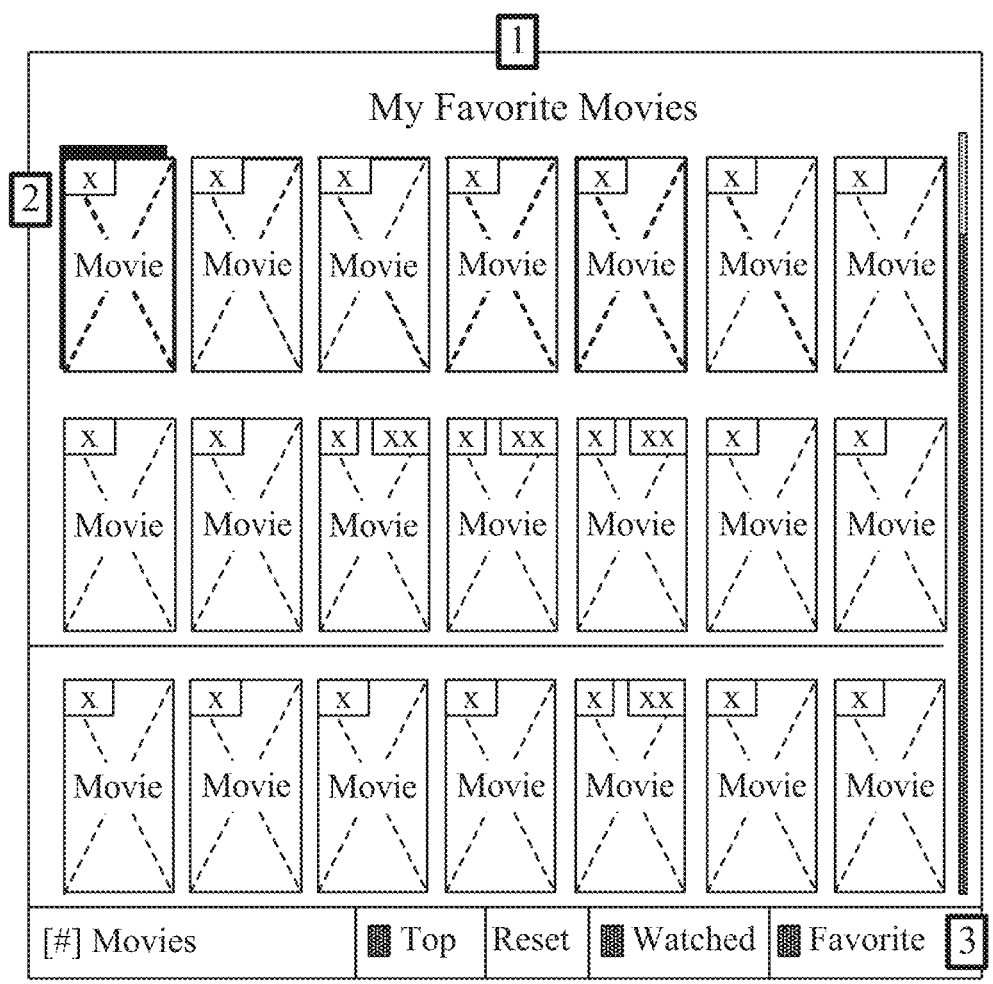
FIG. 57 shows yet another user interface according to some embodiments of the present disclosure.

In yet another user interface shown in FIG. 57, the yellow hotkey is visually indicated for sorting. For example, the sorting can be rearranging the sorting order in the collection to cycle according to certain criteria, such as date or alphabetic. The Favorite movies collection is a collection of all movies that the user has marked as a favorite. The default sort order is alphabetic. For example, the red hotkey can be used for returning the user to the top of the collection. The yellow hotkey rearranges the sort order in the collection to cycle between Date (descend leg)-Alphabetic (ascending). The green hotkey can be used for indicating watched state, and can toggle watched state of the video between not watched—in progress. The blue hotkey will make any media in focus as a favorite. If the video media is already a favorite, this key can be pressed to remove it from a favorite.

Figure 58:
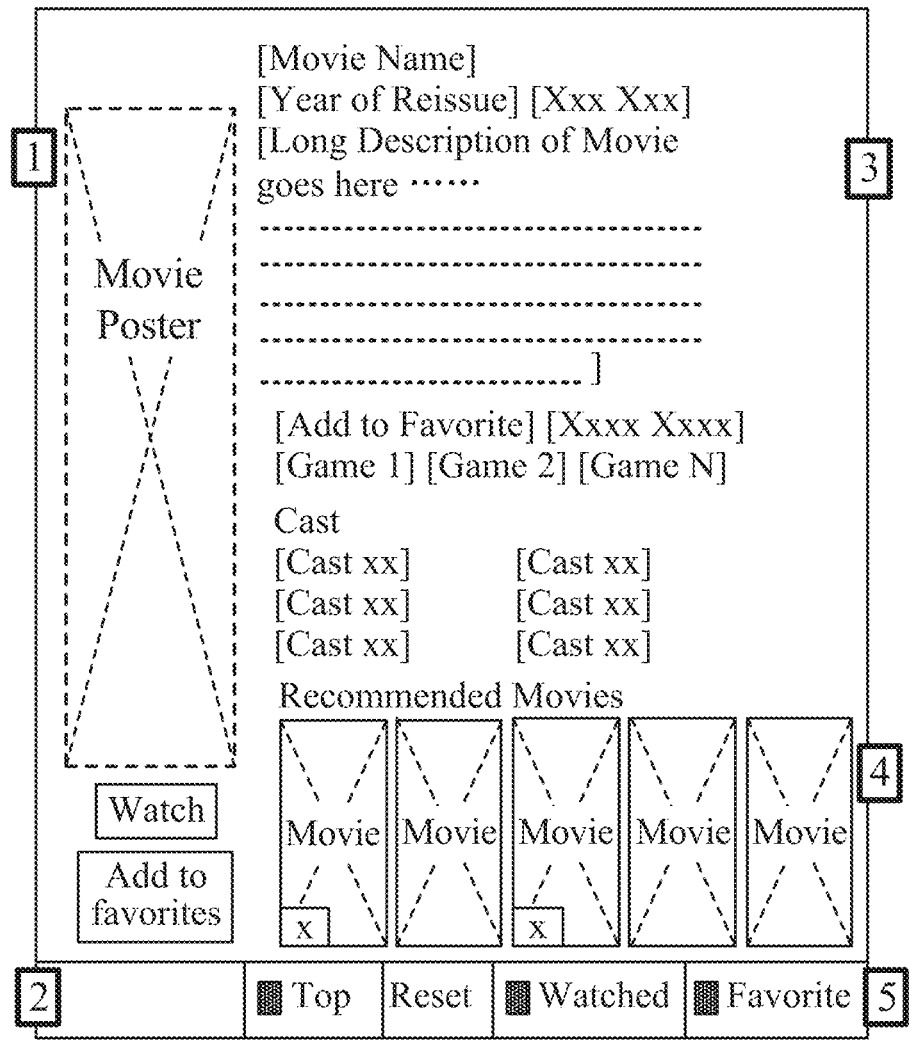
FIG. 58 shows yet another user interface according to some embodiments of the present disclosure.

In yet another embodiment shown in FIG. 58, instead of making the blue hotkey associated with favorite function, the green hotkey is visually indicated for performing favorite function. This will make any media in focus as a favorite. If the media is already a favorite, this key can be pressed to remove it from favorites. In this case, the blue hotkey can be associated with another function or can be not associated with any function. This form in FIG. 58 provides a very simple navigation pattern. Only the action buttons and the recommended movies are able to receive a focus. It can provide extended information on the currently watched program, such as movie poster (1) (if available), movie info., (2), movie name, description and info., (3), recommended movies (4), and hotkey legend (5).

Figure 59:
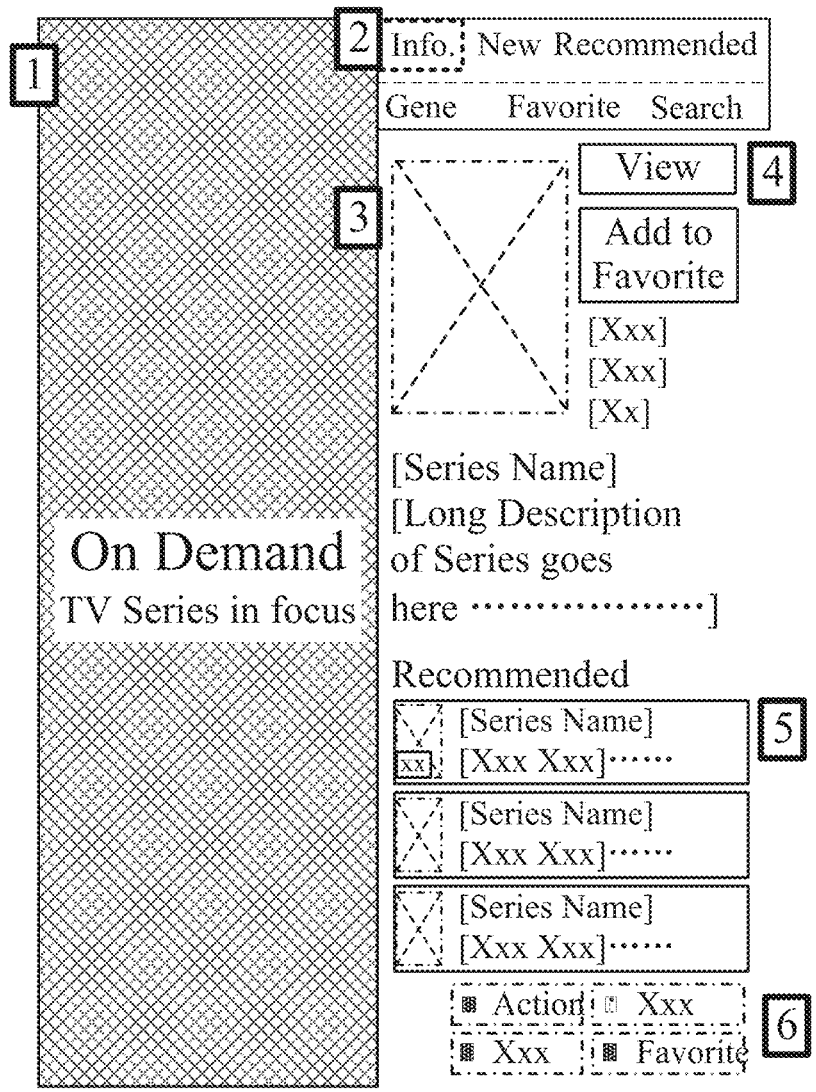
FIG. 59 shows yet another user interface according to some embodiments of the present disclosure.

In yet another embodiment shown in FIG. 59, in this user interface, only one hotkey is visually associated with favorite function, the other three hotkey are not associated with any function in this user interface. As can be seen from the above embodiments, one or more hotkeys can be indicated on a user interface or application interface and the functions of the one or more hotkeys can be different depending on the user interface or application, or selection state of an item or object. In some embodiments, function(s) of a hotkey can be switched between two opposite state based on a previous state of a selected item or object. Application Panel may have six main views including info., Recommended, Genre, Last Viewed, Favorites and Search.Info Panel can provide contextual content and help the watcher quickly access related functionality. All views are accessible via D-Pad within the panel. It can provide extended information on the currently watched program, such as active view (1), panel navigation bar with information selected (2), series thumbnail (3), action buttons (4), recommended content (5), and hotkey legend (6).

Figure 60:
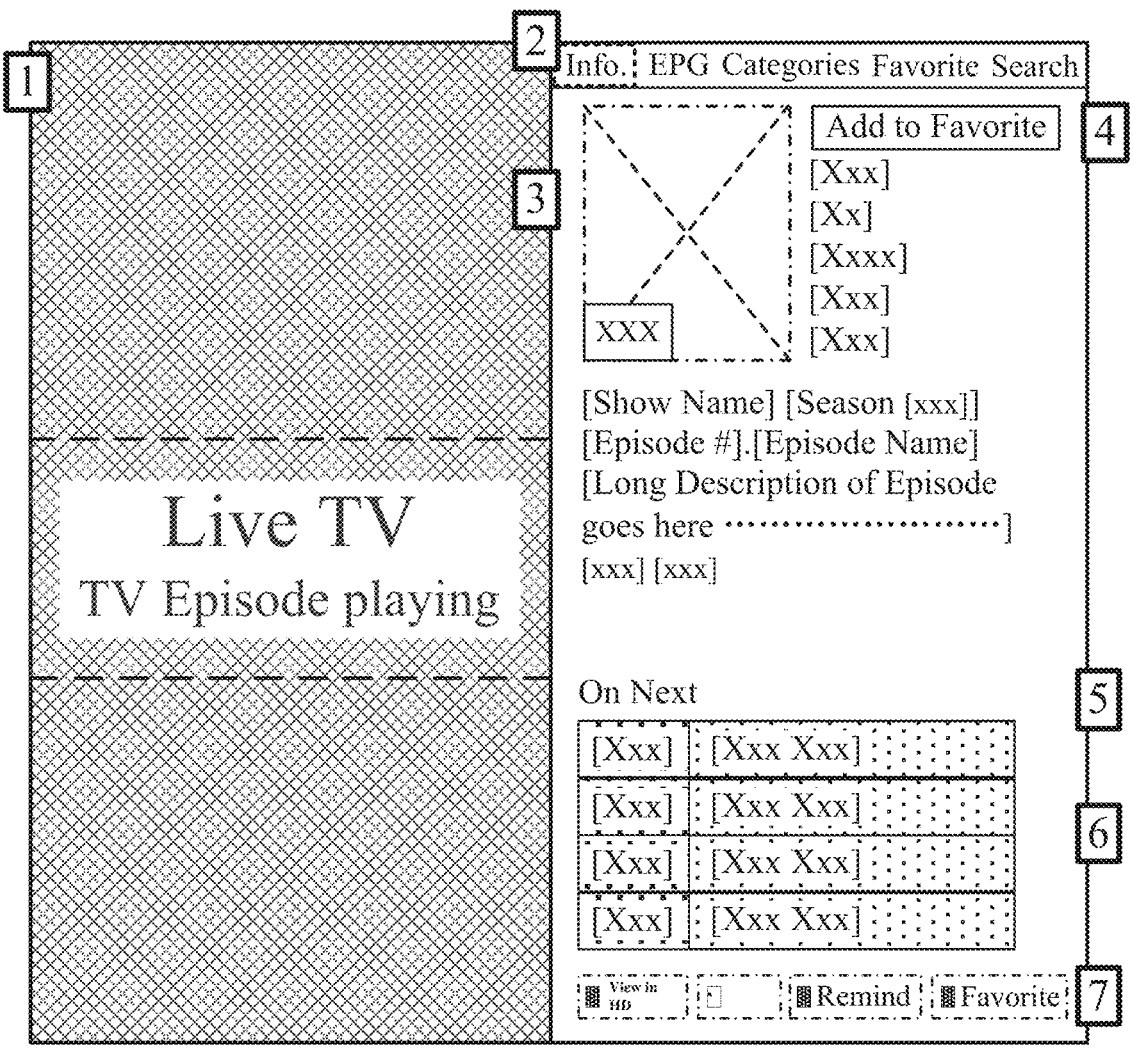
FIG. 60 shows an information panel according to some embodiments of the present disclosure.

An embodiment of an information panel is shown in FIG. 60. The information panel for Episode can be available when the user is watching a TV episode. It can provide extended information on the currently watched program, such as active view (1), panel navigation bar with information selected (2), episode thumbnail (if available) with program information (3), add show to favorites button (4), add channel to favorite button (5), on next mini EPG (6), and hotkey legend (7), as shown in FIG. 60. The hotkey actions for this page can include a red button, a yellow button, a green button and a blue button. Here, the red button can be associated with view in HD function, which is available if the current channel is SD and the same program is currently airing on an HD channel, and pressing it will switch to that channel and dismiss the panel. The yellow button may not associate with any function on this page. The green button can be associated with a reminder function which will toggle a reminder on/off for the selected program. The blue button can be associated with favorite function, which will provide a modal with the following: add/remove [show] to/from favorites, and add/remove [channel] to/from favorite.

Remote control actions for this region can include:

| Remote Button | Action |
| --- | --- |
| Select | Add to favorites/remove from favorites<br>This will provide a modal with the following<br>Add/Remove [show] to/from favorites:<br>Mark the program currently being played as a |

-continued

| Remote Button | Action |
| --- | --- |
| | favorite. If the program is already a favorite, pressing this key will remove it from favorites<br>Add/Remove [Channel] to/from favorites:<br>Toggies the favorites status of the current channel |
| Play | No Action |
| Back | Dismisses Panel |
| Hot keys | Favorite is supported |

A user can press a panel button, such as the application panel button 748, on the remote control 700 to launch an application panel, and press the panel button again to dismiss the application panel. In some scenarios, the panel can be dismissed automatically upon the user chooses to play a video by either selecting a "Watch" button or pressing a "Play" button (such as the play button 756) on the remote control 700.

Figure 63A:
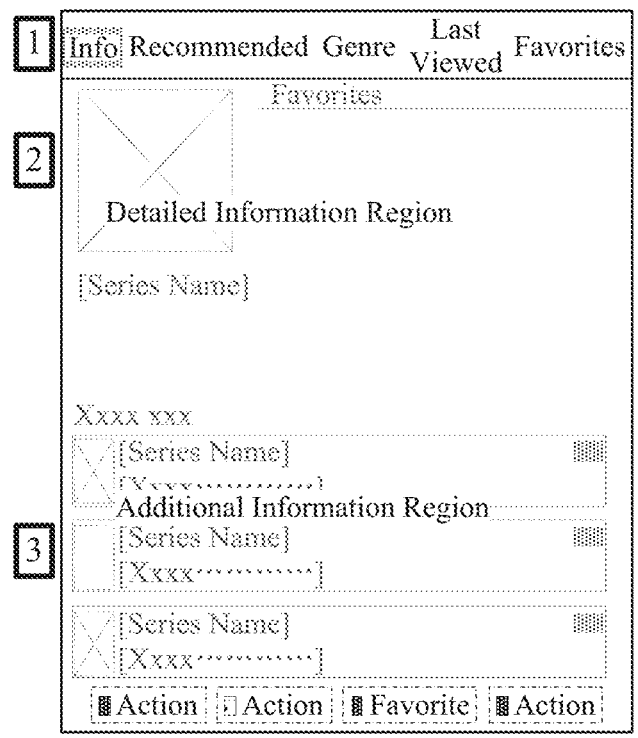
FIG. 63A shows a kind of information panel according to some embodiments of the present disclosure.

An embodiment of a kind of information panel is shown in FIG. 63A. Information panel can provide a user with information related to the current active view. For example, if the user is watching episode 5 of a TV series from VOD, then information panel provides the information about the episode 5. If the user is watching live TV, then information panel can provide the information on currently playing program, the channel, etc. The interface as shown includes a panel navigation bar, a detailed information region and an additional information region. Detailed information region can be designated for the information on the current active view. Additional information region is namely used for recommended content or related items depending on the active view.

Figure 63B:
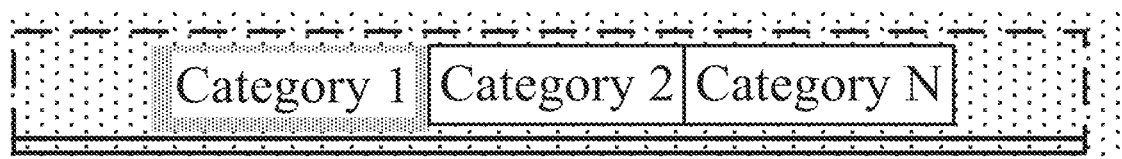
FIG. 63B shows a navigation bar according to some embodiments of the present disclosure.

An embodiment of a navigation bar is shown in FIG. 63B. The navigation bar can appear in multiple places throughout the system, although the visual appearance may vary. A very simple navigation bar shown in FIG. 63B can be used to move between elements in the navigation bar. In some embodiments, when the number of items exceeds the available space, the navigation bar can turn into a drop-down list.

Figure 61:
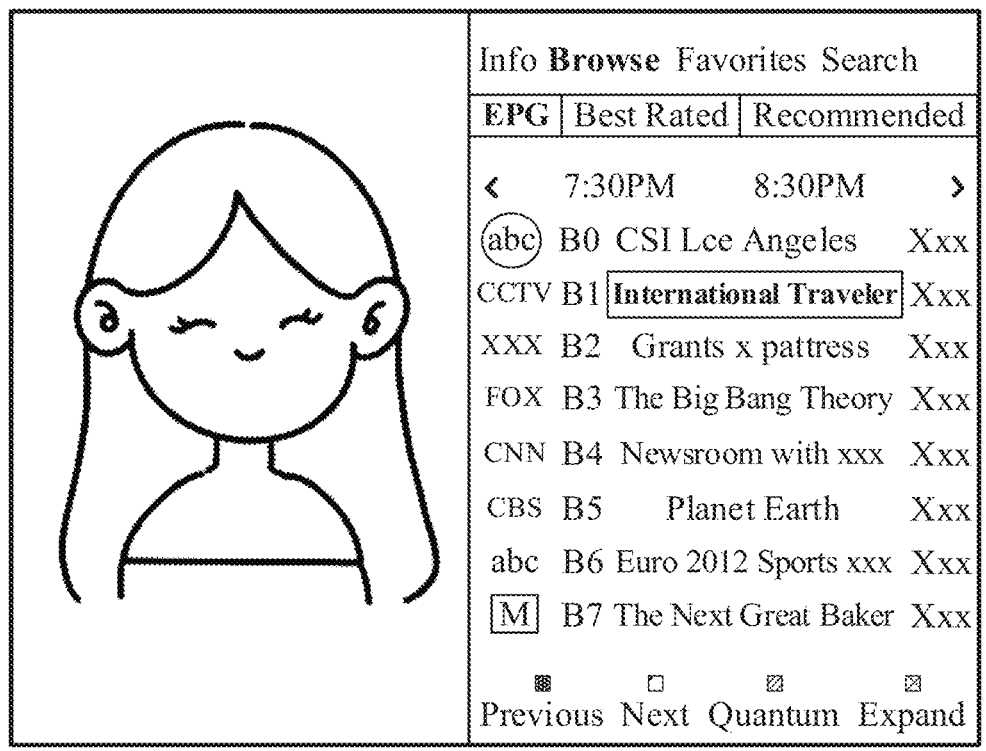
FIG. 61 shows a user interface according to some embodiments of the present disclosure.

In some embodiments, the user interface shown in FIG. 61, while a video or program is playing, a panel button can be pressed to launch an application panel to present on a layer above a video playing layer. The application panel can comprise EPG information and a hotkey legend for associating hotkey(s) with functions within the application panel. For example, a hotkey can be associated with moving to previous function, another hotkey can be associated with moving to next function, while another hotkey can be associated with expand function.

Figure 69:
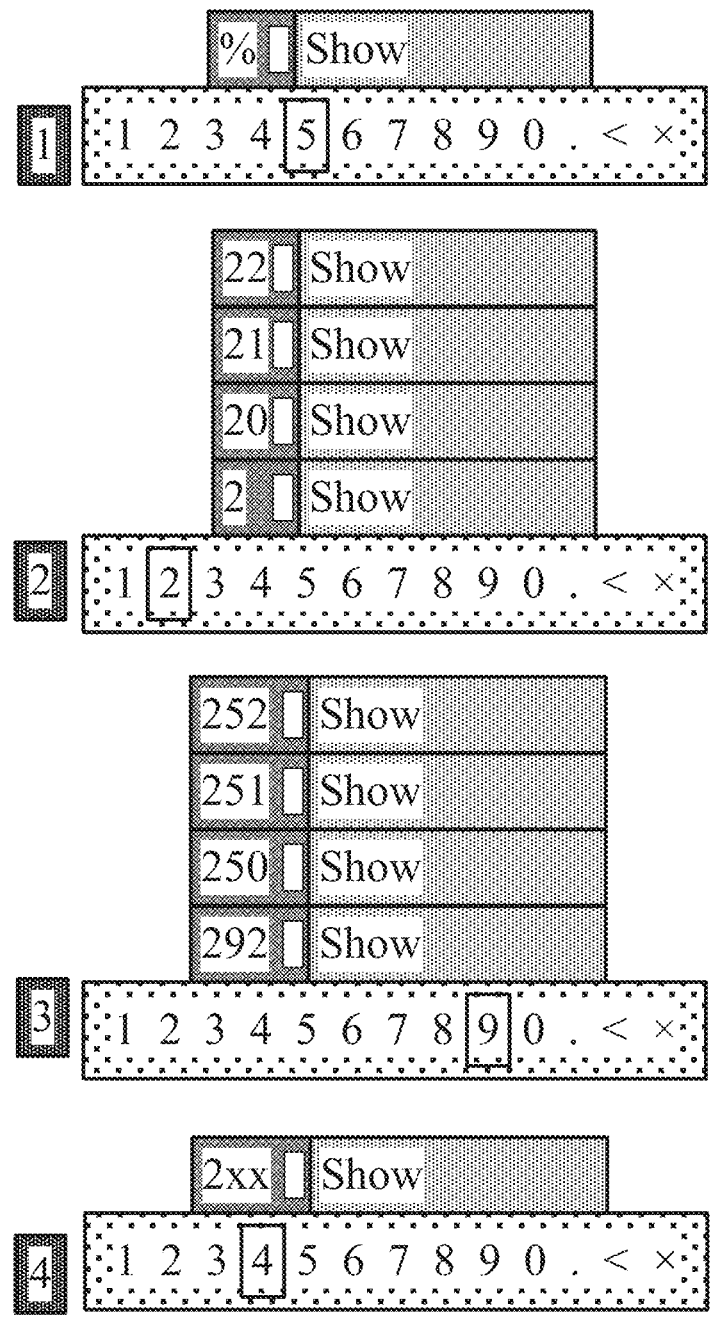
FIG. 69 shows a channel changing workflow according to some embodiments of the present disclosure.

An embodiment of a channel changing workflow is shown in FIG. 69. As shown in FIG. 69, the flow can comprise step 1, step 2, step 3 and step 4.

Step 1: press a select button during Live TV playback. The channel changer is shown with the last manually entered channel and its current listing above.

Step 2: use the D-Pad to select "2". The channel 2 and the next three channels that begin with number 2 are shown in a mini EPG. Selecting any of these entries would automatically change the channel and dismiss the channel changer.

Step 3: use the D-Pad to select "9". The channel 29, and the next three channels that begin with number 29 are shown in a mini EPG. Selecting any of these entries would automatically change the channel and dismiss the channel changer.

Step 4: use the D-Pad to select "4". Only channel 294 is shown since it is the only channel that begins with 294 (only as per this example since available channels will be dependent on the provider).

Figure 9B:
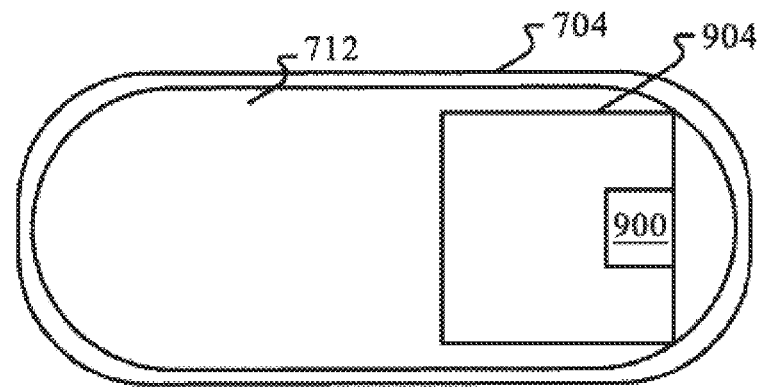
FIG. 9B is a bottom view of an embodiment of a remote control with the joystick in a lower position.
Figure 9C:
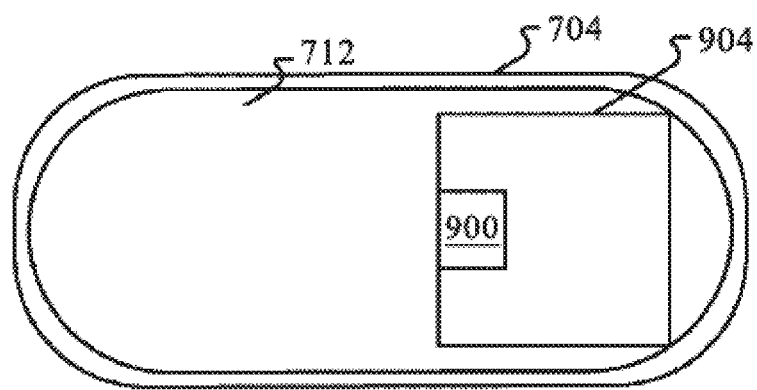
FIG. 9C is a bottom view of an embodiment of a remote control with the joystick in an upper position.
Figure 11A:
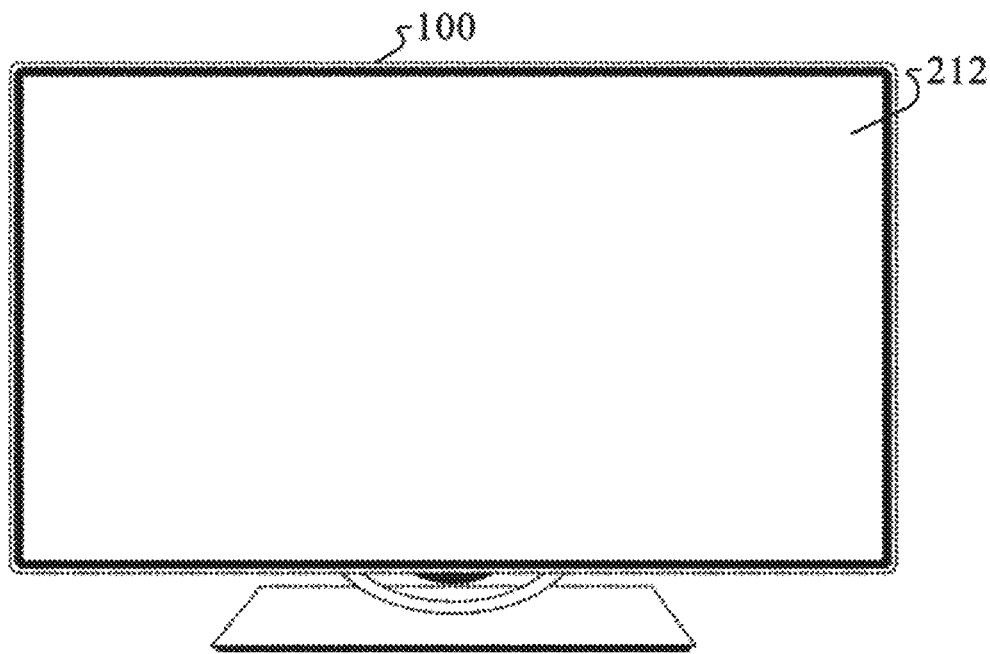
FIG. 11A is a front view of an embodiment of an Intelligent TV screen.
Figure 11B:
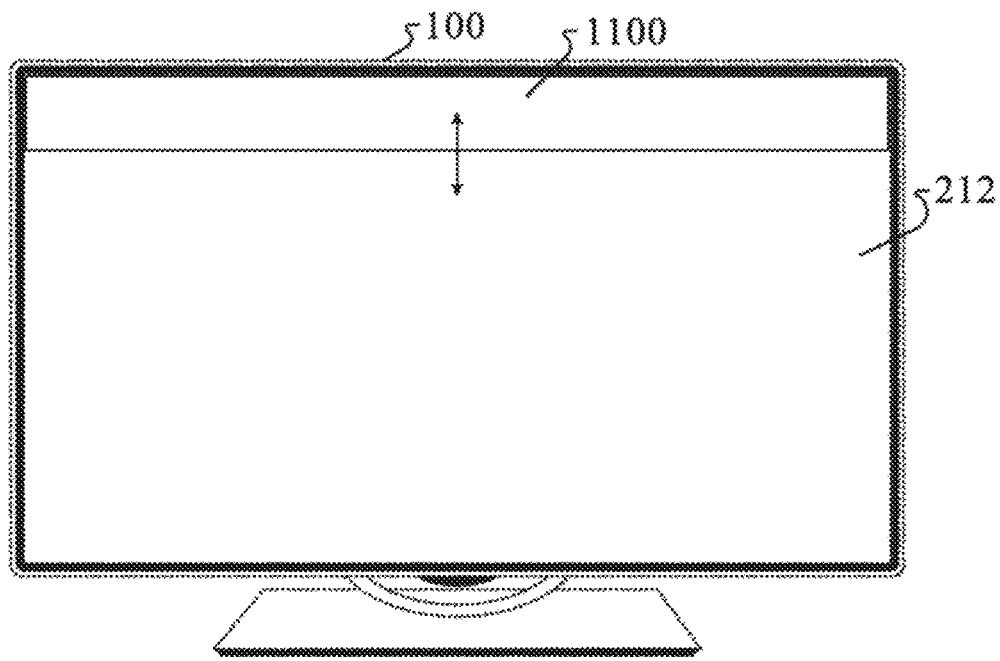
FIG. 11B is a front view of an embodiment of an Intelligent TV screen.
Figure 11C:
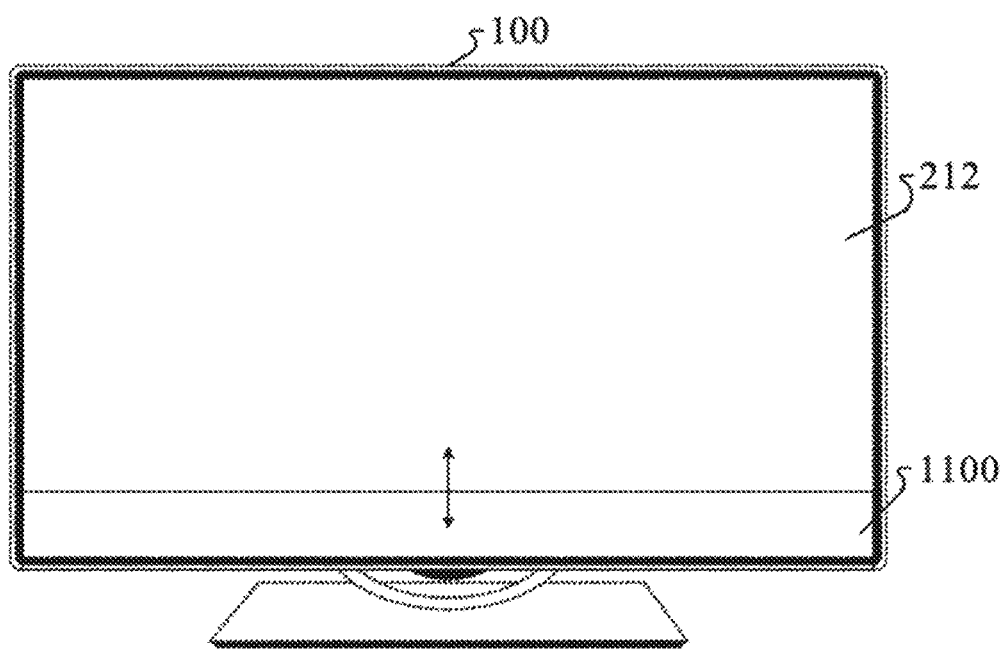
FIG. 11C is a front view of an embodiment of an Intelligent TV screen.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a dropdown window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and WEB browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This can be done in an unintrusive manner and without affecting the flow of content that is pushed up or down. The joystick 900 could be moved, additionally or differently, from side-to-side to cause the window to appear at the left or right edge of the screen 212.

Figure 10:
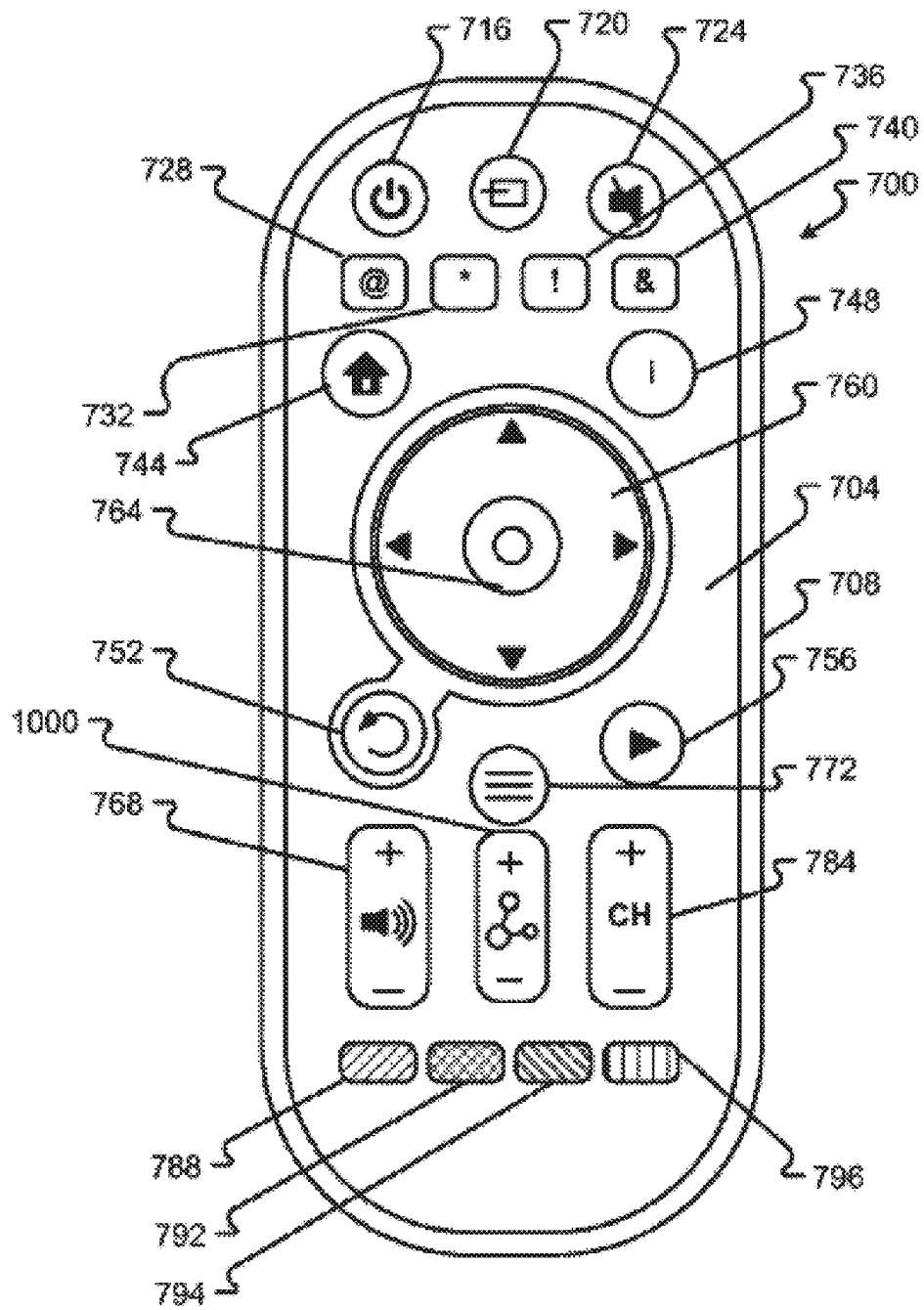
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, Myspace™, Twitter™, YouTube™, DailyMotion™, Facebook™, or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages).

Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different)

mute setting, control, and/or button can stop or pause inbound social network activity (e.g., inbound social messages).

Figure 12:
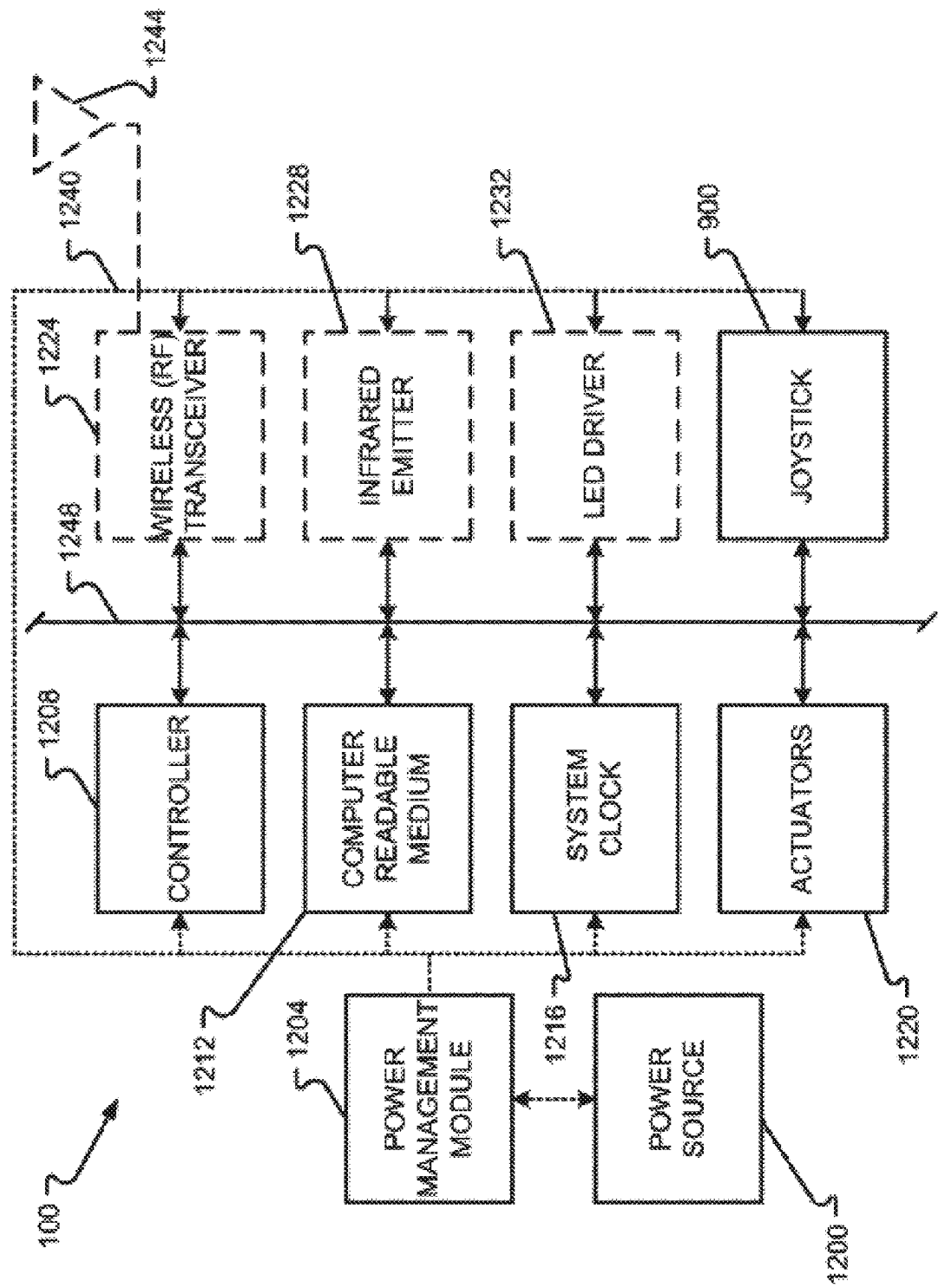
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
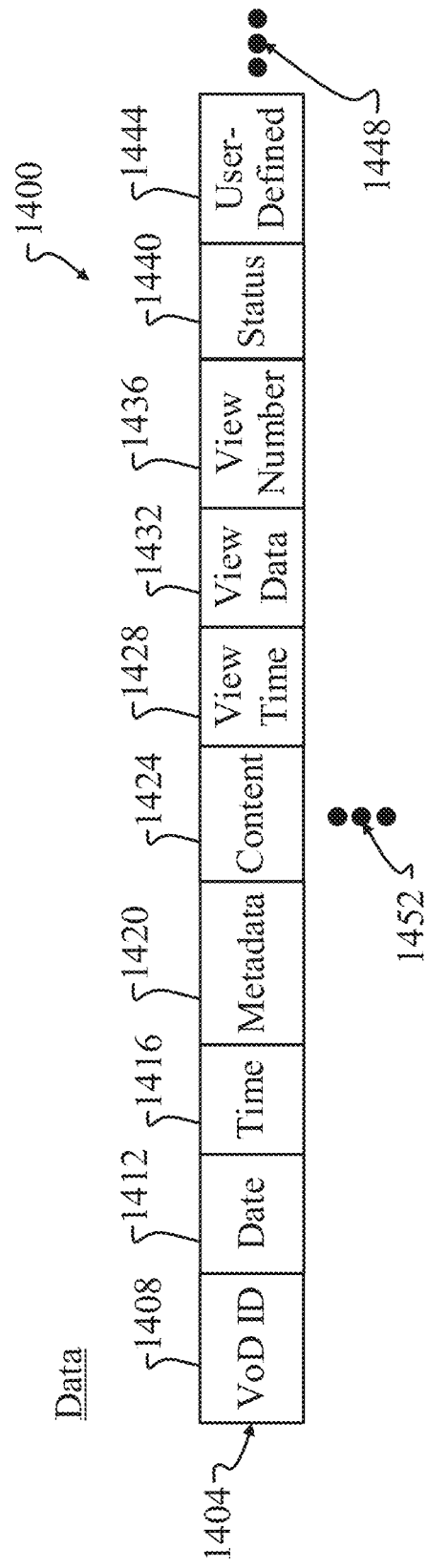
FIG. 14 is a block diagram of an embodiment of a VOD content database for an Intelligent TV.

An embodiment of a database 1400 for storing VOD content is shown on FIG. 14. In some embodiments, the database 1400 can include one or more data structures 1404 for storing individual items of content. The database 1400 can include more or fewer data structures 1404 than those shown in FIG. 14, as represented by ellipses 1452. Each data structure may contain one or more fields as shown in FIG. 14. However, each data structure can have more or fewer fields than those shown in FIG. 14, as represented by ellipses 1448.

The data structure 1404 can include one or more of, but is not limited to, a VOD identifier field 1408, a data field 1412, a time field 1416, a metadata field 1420, a content field 1424, a view time field 1428, a view date field 1432, a view number field 1436, a status field 1440, and/or a user-defined attribute field 1444. Each of the fields can contain information about an item of content. Content can comprise video, picture, music, or other multimedia that may be available to the user for viewing on the Intelligent TV 100. The fields may describe the content and/or information about the content.

A VOD identifier field 1408 can include an identifier that uniquely identifies the content associated with data structure 1404. The identifier can be any alphanumeric identifier, symbolic identifier, globally unique identifier (GUID), or other types of identifiers. The identifier in the VOD identifier field 1408 can uniquely identify the content in comparison to all other content, thus, the VOD identifier 1408 is the only identifier of its type used within the database 1400.

The date field 1412 may include a date at which the content was created and/or downloaded into the database 1400. The date 1412 can include any type of date format, and may be a day, a year, and/or a month. The time field 1416, similar to the date field 1412, can include a time at which the VOD was downloaded and/or created. The time 1416, with the date 1412, gives an indication to the Intelligent Television 100 about when this item of VOD content was available to the user.

Metadata field 1420 can include information about the VOD content. This information can include the genre of the VOD content, the actors within the content, the director for the VOD, the location in which the content was created, for instance, whether the content is movie made in the United States, an Indian movie, a European movie, etc., the year at which the movie was created, or other such information about the VOD content. This information may be used for collection sorting as described hereinafter. Field 1424 includes the data for the content. In some embodiments, the data can include an mpeg or other type of video format data, which can be stored within field 1424.

The view time and view date fields, 1428, 1432, can include the last time and date at which the user viewed the VOD content. Thus, the view time 1428 can include a time at which the user either began watching the last session with the content, or the time at which the user stopped watching the content during the last session. The view date 1432 also includes the month, day, and/or year in which the user decided to last watch the content.

The view number field 1436 may include a counter for the number of times the user has accessed and viewed the content in data structure 1404. The view count 1436 may be triggered by the viewing session that has lasted a predetermined period of time. For example, if the user watches an item of content for more than five minutes, the view number 1436 can increment. In other circumstances, any time an item of content is played, regardless of how long the user watches the content, the view count 1436 may increment. This view count 1436 may persist into the future.

A status 1440 may indicate the status of the content from the last viewing session. For example, if the content was half watched, the status indicator 1440 will indicate that the content was half completed. In other examples, the status 1440 can indicate only the first time status of the content. For example, during the first time the content is viewed, the status 1440 increments over some predetermined level, for example, a quarter watched, half watched, three-quarters watched, completely watched, etc. This status 1440 is maintained regardless of the number of times the content is viewed. Therefore, if a content is viewed a second time, the status 1404 may only show the content has been viewed. In other embodiments, the status 1440 may determine whether the content is new, recently viewed, a favorite, or other information.

User-defined field 1444 includes any kind of user-defined information about the content. For example, the user may set the content as a favorite, which may be stored in user-defined category 1444. There may be other user-defined 1444 information, such as, whether the content is for adults only, whether the content is to be maintained for a certain person, etc.

Figure 15:
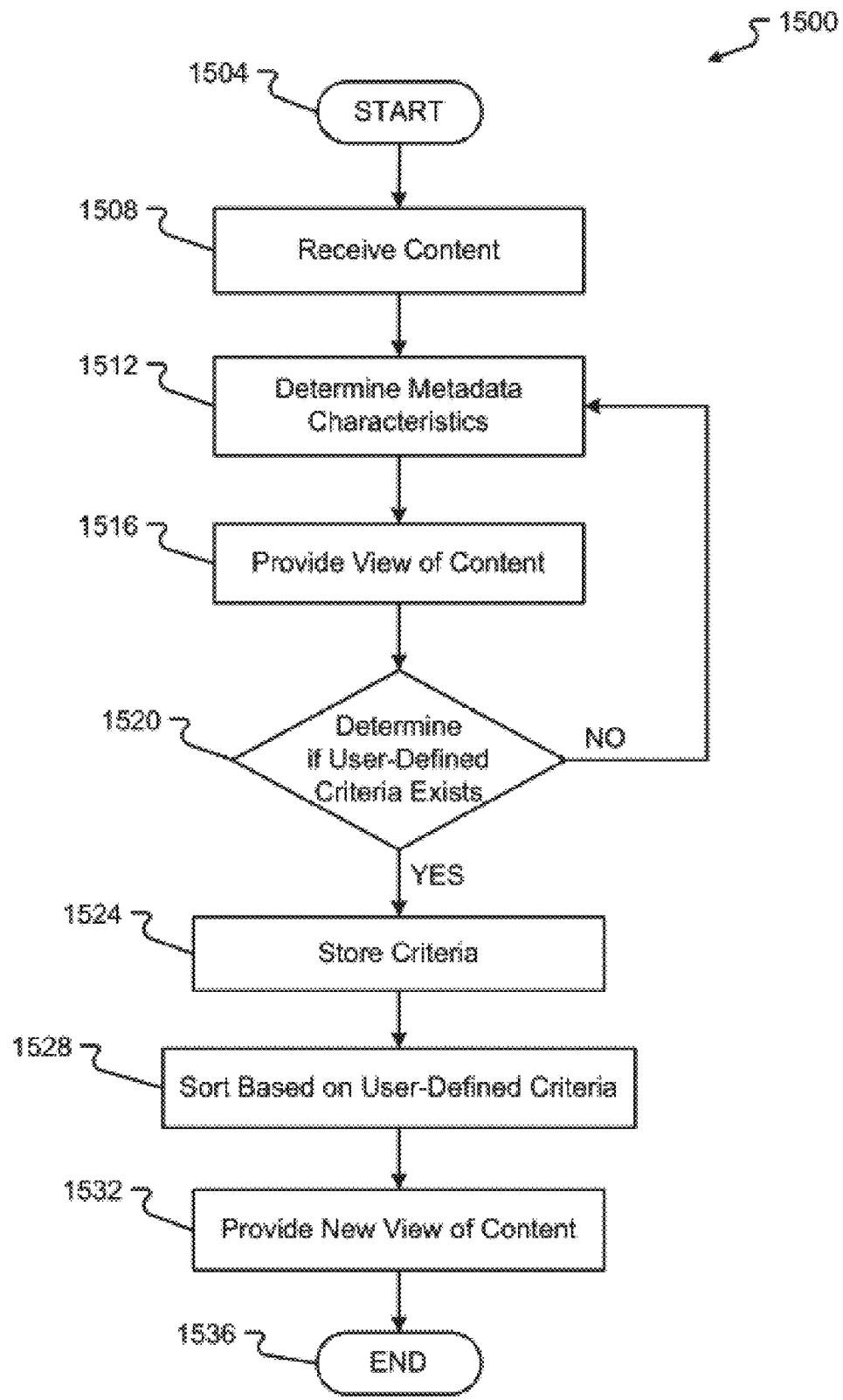
FIG. 15 is a flowchart view of an embodiment of a method for providing VOD in an Intelligent TV.

An embodiment of a method 1500 for sorting VOD collections is shown in FIG. 15. While a general order for the steps of the method 1500 is shown in FIG. 15, the steps may be arranged in any order. Generally, the method 1500 starts with a start operation 1504 and ends with an end operation 1536. The method 1500 can include more or fewer steps or can arrange the order of the steps differently than those shown in FIG. 15. The method 1500 can be executed as a set of computer-executable instructions, executed by a computer system, and encoded or stored on a computer readable medium. Further, the method 1500 can be executed by a gate or other hardware device or component in an Application Specific Integrated Circuit, a Field Programmable Gate Array, or other type of hardware device. Hereinafter, the method 1500 shall be explained with reference to the systems, components, modules, software, data structures, user interfaces, etc. described herein.

The Intelligent TV 100 can receive content, in step 1508. In some embodiments, the Intelligent TV 100 may connect through a network 132 to media application 150, or another source, such as digital media library 148 for information about VOD content. This VOD content may be retrieved or pushed to the Intelligent TV 100. Regardless, the VOD content can be received through the port interface 352 and provided to the processor 364. In some embodiments, the processor 364 can execute a VOD subservice 620, which can receive the content through an instance of the VOD source plug-in 644. The VOD source plug-in 644 can retrieve or receive the VOD content and provide the VOD content to the VOD subservice 620 to be stored in database 632. Database 632 may be the same or similar to database 1400 as described in conjunction with FIG. 14. Thus, the information about the VOD content and the VOD content itself may be sorted and stored in fields 1408 through 1424.

Thereinafter, the user may select a button on the remote control 700, such as button 740, to preview or look at available VOD content. The VOD subservice 620 may read the metadata field 1420 to determine information about the VOD content. The metadata characteristics 1420 may then be used to sort the VOD content into collections, in step 1516. For example, the video subservice 620 can sort the VOD content into a collection based on geographical area or date of issue of the VOD. The VOD subservice 620 may then provide this information to the panel manager 536 of the user interface application 468. The panel manager 536 may then provide a view of the content, in step 1518. This view may be a sorted selection of content, such as a collection view 1704, shown in FIG. 17.

Thereinafter, the user may provide user-defined criteria. The user-defined criteria may be entered through a remote control 700, or some other user interface, and can be provided to the VOD subservice 620. The user-defined criteria may be stored in the user-defined field 1444 of database 1400. Thereinafter, the VOD subservice 620 may determine if there are user-defined criteria that exist, in step 1520. In some embodiments, the user may press a button on the remote control 700 to sort the content based on the user-defined criteria. The VOD subservice 620 may then read any information from the user-defined field 1444 to determine if criteria exist. If no criteria exist, the method 1500 moves through the NO branch back to step 1516 to sort the collections based on metadata. However, if user-defined criteria do exist, the method 1500 proceeds with YES to step 1524.

In step 1524, the VOD subservice 620 may receive the criteria and store that criteria in field 1444, in step 1525. Thus, if the data or criteria is being received by the user, the VOD subservice 620 can store any user-defined criteria in field 1444.

Thereinafter, the VOD subservice 620 may access the user-defined criteria 1444 to sort the collection or VOD content, in step 1528. The VOD subservice 620 may determine the sort that is desired by the user based on inputs into user interface and use that information to sort the content view. The sort operation may be based on such things as whether or not the content is a favorite, whether the content is appropriate for children, or some other type of criteria. Once sorted, the VOD subservice 620 provides the sort information to the panel manager 536 to provide a view of the sorted content, in step 1532. The content may have a similar view 1704, shown in FIG. 17, but have a different arrangement of the content thumbnails based on the sort criteria.

Figure 16:
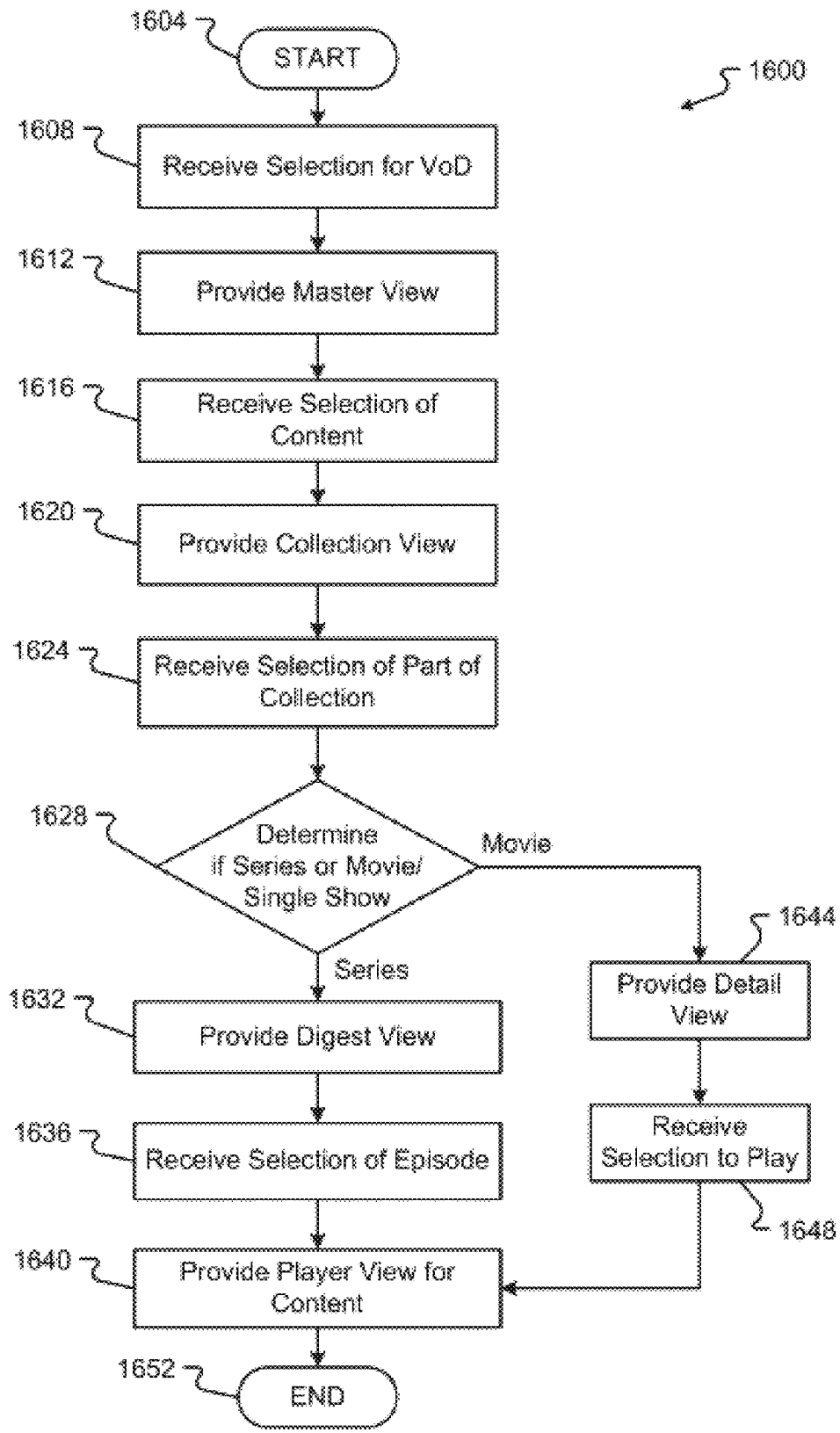
FIG. 16 is a flowchart view of an embodiment of a method for providing VOD in an Intelligent TV.

An embodiment of a method 1600 to provide a series of contextual and easily understood panels to navigate through VOD content is shown in FIG. 16. While a general order for the steps of the method 1600 is shown in FIG. 16, the steps may be arranged in any order. Generally, the method 1600 starts with a start operation 1604 and ends with an end operation 1652. The method 1600 can include more or fewer steps or can arrange the order of the steps differently than those shown in FIG. 16. The method 1600 can be executed as a set of computer-executable instructions, executed by a computer system, and encoded or stored on a computer readable medium. Further, the method 1600 can be executed by a gate or other hardware device or component in an Application Specific Integrated Circuit, a Field Programmable Gate Array, or other type of hardware device. Hereinafter, the method 1600 shall be explained with reference to the systems, components, modules, software, data structures, user interfaces, etc. described herein.

The Intelligent TV 100 can receive a selection for VOD content, in step 1608. In some embodiments, the user may select a VOD button 740, on a remote control 700, which sends a signal to the IR/RF module 354 of the Intelligent TV 100. The signal may then be sent to the processor 364, which translates the signal with a driver 420, and provides the information to the user interface 468 and the VOD subservice 620. The panel manager 536 and/or the silo manager 532 may then receive the signal through the input event dispatcher 508 from the processor 364 and act upon the signal to provide a master view of the content, in step 1612.

Figure 17:
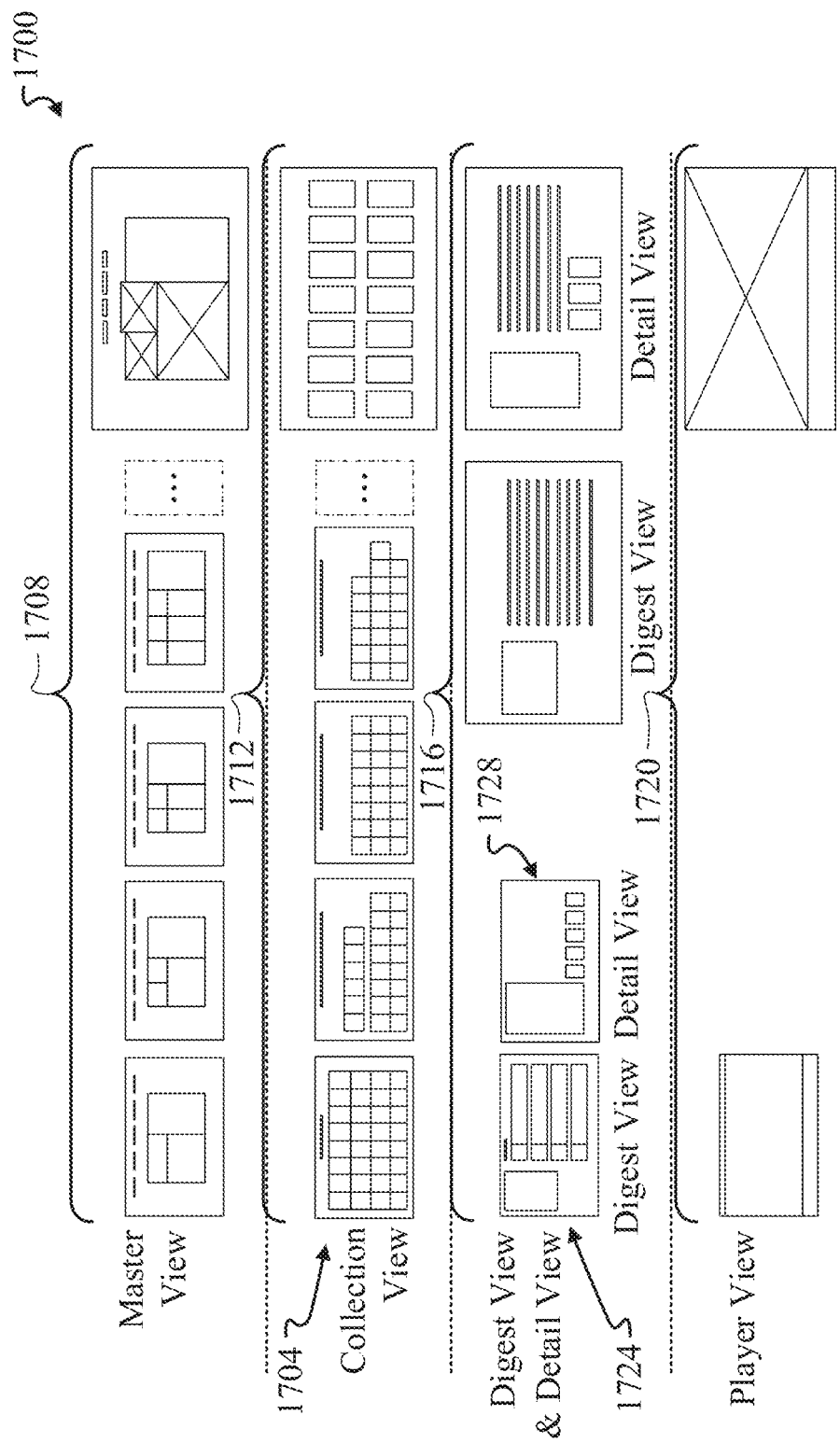
FIG. 17 is a view of an embodiment of a user interface for an Intelligent TV.
Figure 18:
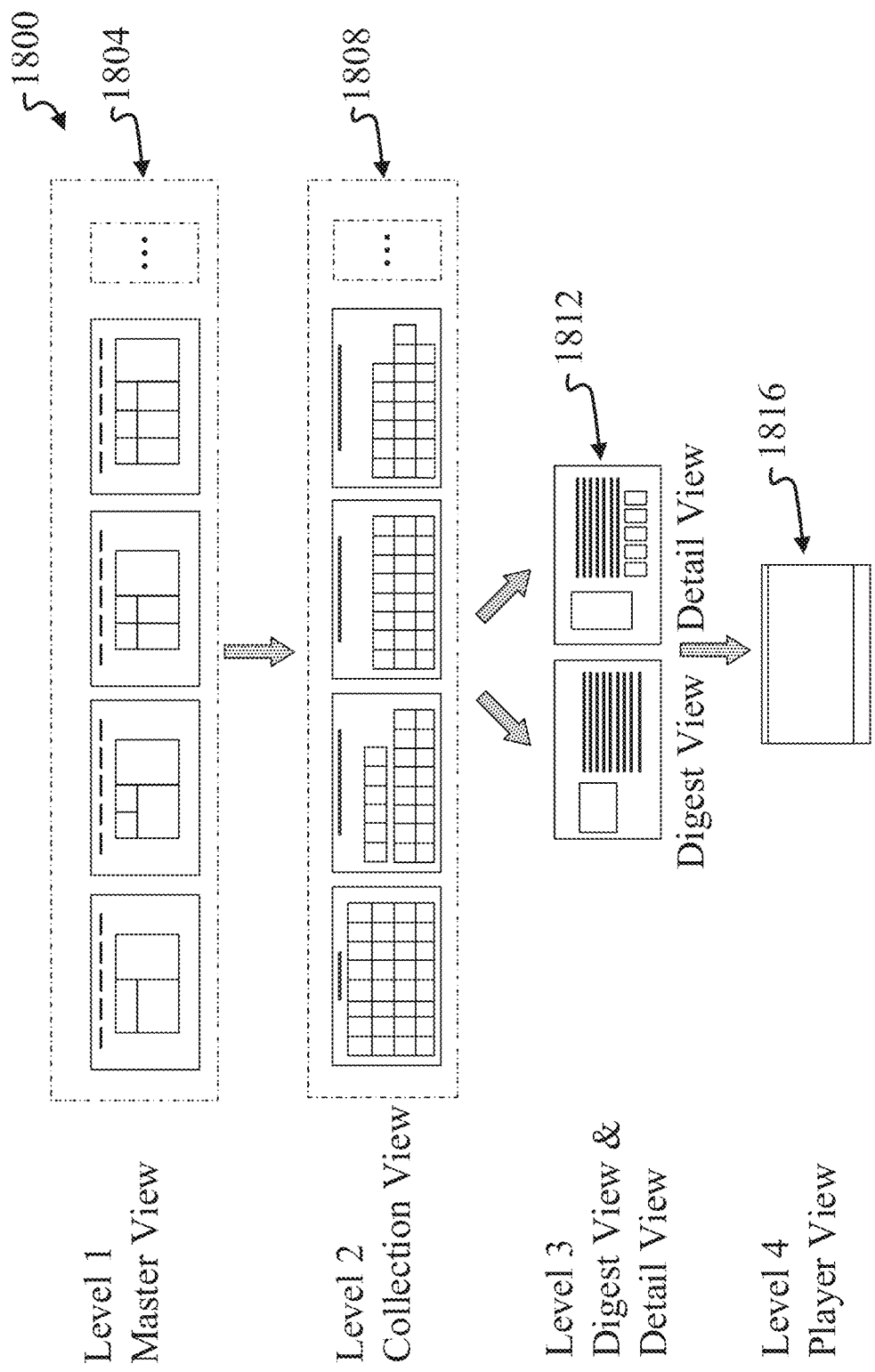
FIG. 18 is a view of an embodiment of a user interface for an Intelligent TV.

The views for the VOD content are broken down into a series of hierarchical steps that allow the user to easily navigate through VOD content. For example, the hierarchical steps may be as shown in FIG. 17 and FIG. 18. In some embodiments, a set of user interfaces 1700, 1800 proceed through four categories to play VOD content. A master view selection 1708, 1804 is a top tier user interface that allows the user to select a type of collection shown in tier 1712. A collection view 1704, 1808 uses a list of media based on a target or sort criteria. The user may then select some type of content from the collection view 1808 to be provided in either a digest view 1724 or a detail view 1728 in tier 1716, 1812. A digest view 1724 shows a view of a television series or series of episodes, where a description of the series and a set of episodes is provided. If there is no series with the content selected, the detail view 1728 may be provided, which gives information for the content which was selected. From one of these views, the user may then select a particular content to play or select a play icon, which may then provide a player view 1816 in tier 1720. In the player view 1816, the actual content is provided to the user and played per their selection.

Figure 19:
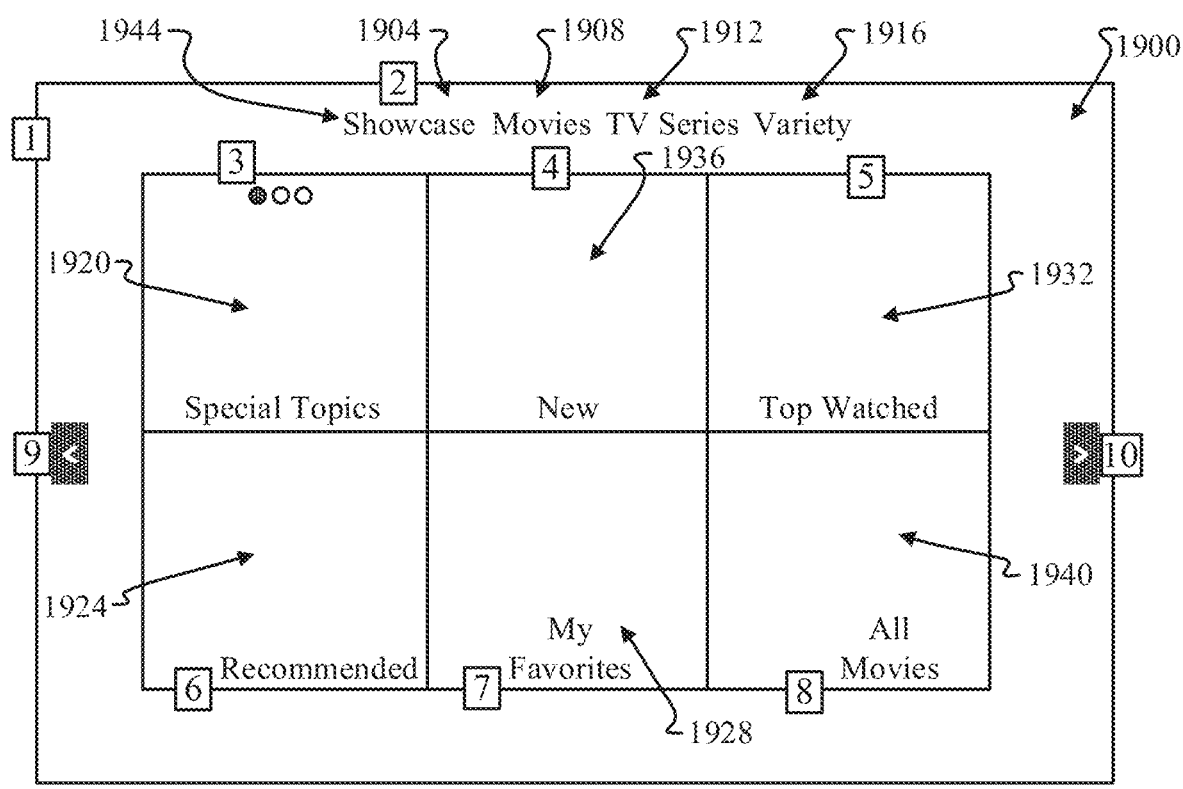
FIG. 19 is a view of an embodiment of a user interface for an Intelligent TV.

Thus, the panel manager 536 upon having a receipt of VOD can provide the master view to the user. The master view 1900 then presents information as shown in FIG. 19. A header navigation bar 1944 provides for selections of types of VOD content. For example, the user can select showcase material 1904, movies 1908, TV series 1912, or variety programs 1916. This first selection may allow the user to navigate to a content or collection view, including that type of material. Further, there are a series of thumbnails to select to navigate to different types of collections. For example, the user can select a special topics icon 1920 to proceed to special content. The user can select a recommended thumbnail 1924 to navigate to a recommenced collection. The user can select favorites thumbnail 1928 to navigate to a favorite's collection. Similarly, the user can select a top watched thumbnail 1932 or a new thumbnail 1936 to navigate to either the top watched content or the new content. Finally, the user can select an all movies thumbnail 1940 to view a collection of all movies currently available as VOD. The user may then make a selection of a collection using the directional pad 760 or some other remote control button.

The selection signal may then be received thorough the IR/RF module 354 and provided to the processor 364 to be translated by a driver 420 and the can be sent to the user interface 468. In some embodiments, the user interface 468 may receive collection information from the VOD subservice 620. A selection of content in the collection of content may be received, in step 1616, and can cause the panel manager 536 to provide a collection view 1712, in step 1620. The user may then select the type of content from the collection view, where this signal is received by the processor 364, in step 1624.

The VOD subservice 620 may then determine if the received selection is a movie, a single show, a series, or other types of content. In this way, the VOD subservice 620 can determine if a digest view or a detail view should be provided. If the selection is associated with a series with two or more episodes, a digest view 1724 should be provided. In contrast, if a single show, movie, or a series with only a single episode is selected, a detail view 1728 should be provided. Thus, the VOD subservice 620 or the panel manager 536 can determine if the selection is a movie or a series. If the selection is a series, the method 1600 proceeds through the SERIES branch to step 1632. If the selection is a movie or single show, the method 1600 moves through the MOVIE branch to step 1644.

In step 1632, a digest view 1724 may be provided to the user. A digest view, similar to that shown in view 1724, FIG. 17, provides a description or view of the series and then the ability to select one or more episodes in that series. The user may then move the focus onto a single episode using the directional pad 760, or some other user interface device, and select the episode to be viewed. This selection may then be received by the processor 364 and provided to user interface application 468. The selection of the episode 1636 causes the user interface to request content information 1424 from the VOD subservice 620, which can provide that content information 1424 from database 1400 to the user interface application 468. The user interface application 468 may then provide a view of the content, in step 1640. For example, the user interface application 468 can provide a player view 1720, which shows the content being viewed.

In the detail view provided by the user interface application 468, in step 1644, the user interface application 468 provides information specific about a single show, movie, or episode. This detail view may be the same or similar to view 1728, shown in FIG. 17. The user may select to play the episode from the detail view 1728. This selection to play may be received by the processor 364, in step 1648, through similar procedures as provided above. The selection can cause the user interface application 468 to provide a player view 1720 and provide a view of the content, in step 1640, similar to the processes as that described above.

The series of views that are performed by executing process 1600 can be as shown in FIG. 18. In some embodiments, the series 1800 can include a master view selection 1804. By selecting something in the master view, a collection view from the set 1808 is provided. By selecting a type of content within the collection view, the Intelligent TV 100 provides either a digest view or a detailed view, such as in set 1812. By selecting to play an episode in set 1812, the Intelligent TV 100 provides a player view 1816. FIG. 18 shows the hierarchical order of the menus, which is intuitive to a user.

Figure 20:
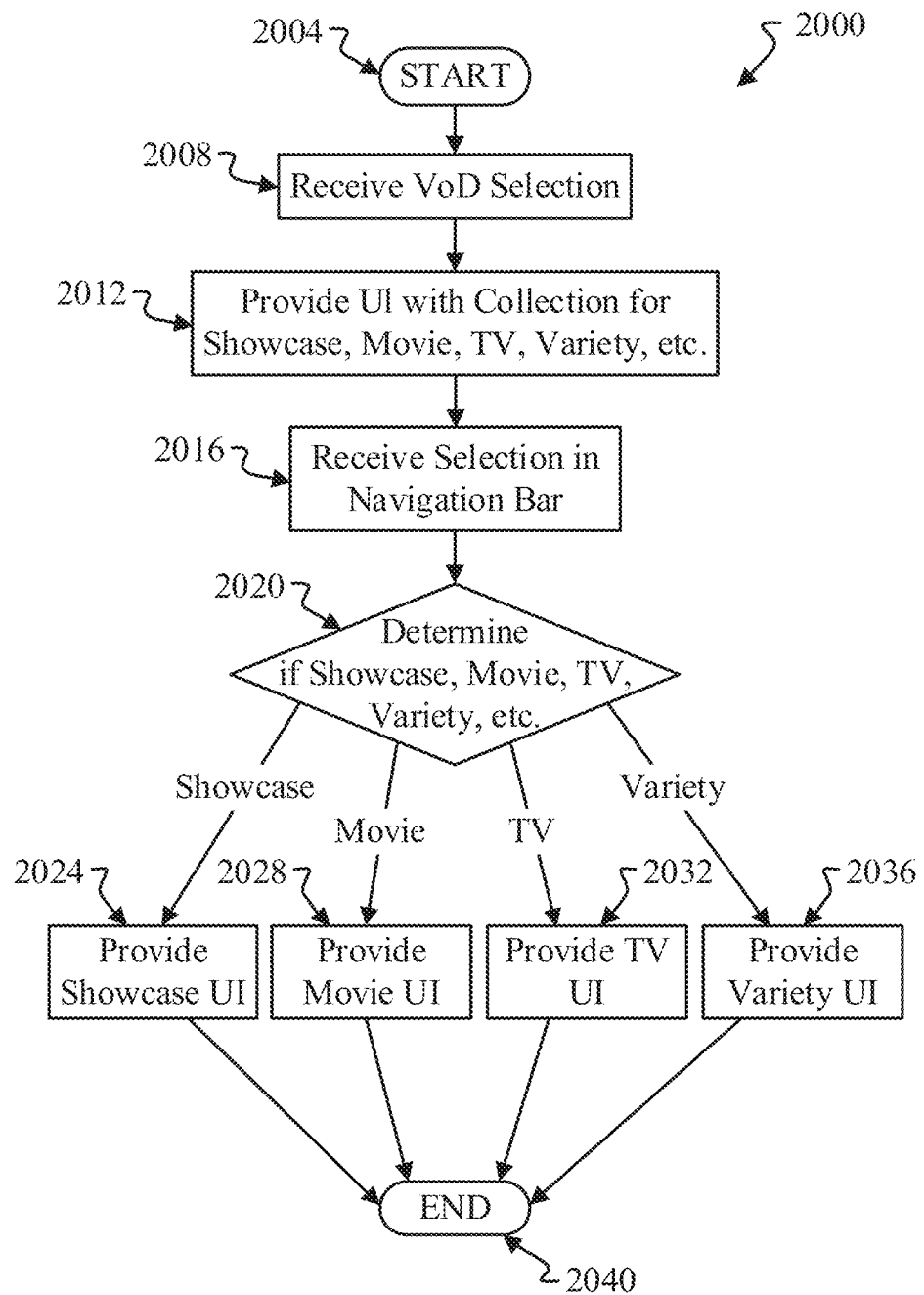
FIG. 20 is a flowchart view of an embodiment of a method for providing VOD in an Intelligent TV.

A method for providing several views of programming is shown in FIG. 20. While a general order for the steps of the method 2000 is shown in FIG. 20, the steps may be arranged in any order unless indicated otherwise. Generally, the method 2000 can start with a start operation 2004 and ends with an end operation 2040. The method 2000 can include more or fewer steps or can arrange the order of the steps differently than those shown in FIG. 20. The method 2000 can be executed as a set of computer-executable instructions, executed by a computer system, and encoded or stored on a computer readable medium. Further, the method 2000 can be executed by a gate or other hardware device or component in an Application Specific Integrated Circuit, a Field Programmable Gate Array, or other type of hardware device. Hereinafter, the method 2000 shall be explained with reference to the systems, components, modules, software, data structures, user interfaces, etc. described herein.

The user may select a VOD request through the remote control 700, by selecting button 740, in step 2008. The VOD selection may be received through the IR/RF module 354 at the processor 364. The signal may be translated by a driver 420 and provided to the VOD subservice 620 and/or the user interface application 468.

Figure 21:
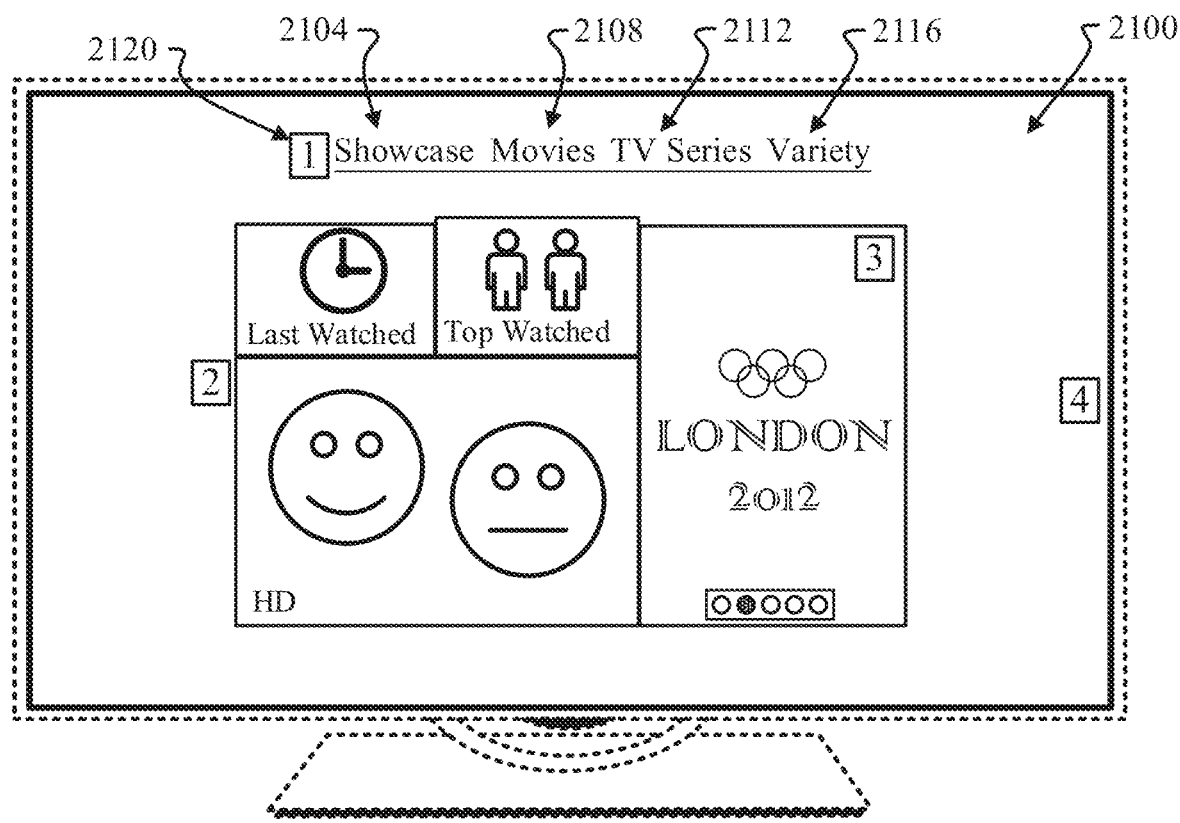
FIG. 21 is a view of an embodiment of a user interface for an Intelligent TV.

The user interface application 468 may execute a panel manager 536 or silo manager 532 through the input event dispatcher 508 to switch to the VOD silo through the silo transition control 504. The silo manager 532 may then provide a master layout view with collections for showcase, movie, TV, and variety programs, in step 2012. For example, the panel manager 536 may provide the panel shown in FIG. 21. In some embodiments, the user interface 2100 provides a navigation bar 2120 having selectable items 2104 through 2116. The device 2104 allows the user to select a master layout view for showcase content. The user interface device 2108 allows the user to select a master layout view for movies. The user interface device 2112 allows the user to select a master layout for TV series, while selecting device 2116 provides a master layout for variety programs.

The user may then use the directional pad 760, or some other remote control button on remote control 700, to select one of the four user interface items, 2104 through 2116, on the navigation bar 2120. For example, the user may put the focus (e.g., the focus is currently on the "Showcase" item 2104 in FIG. 21) on one of the phrase controls shown in navigation bar 2120 in user interface 2100, and then select an OK button 764 to select the material for that user interface item 2104-2116.

The selection is received, again, through the processor 364 and provided to the panel manager 536, in step 2016. The panel manager 536 then can determine which of the four categories was selected, in step 2020. In some embodiments, the panel manager 536 determines which of the items 2104 through 2116 had focus when selected by the user. If the selection was for the "Showcase" 2104, the flow 2000 goes to the SHOWCASE branch to step 2024. If the selection was for a "movie" 2108, the flow 2000 goes to the MOVIE branch to step 2028. If the user selected the "TV series" device 2112, the flow 2000 goes to the TV branch to step 2032. Finally, if the user selected device 2116, the flow 2000 goes to the VARIETY branch to step 2036.

Figure 22:
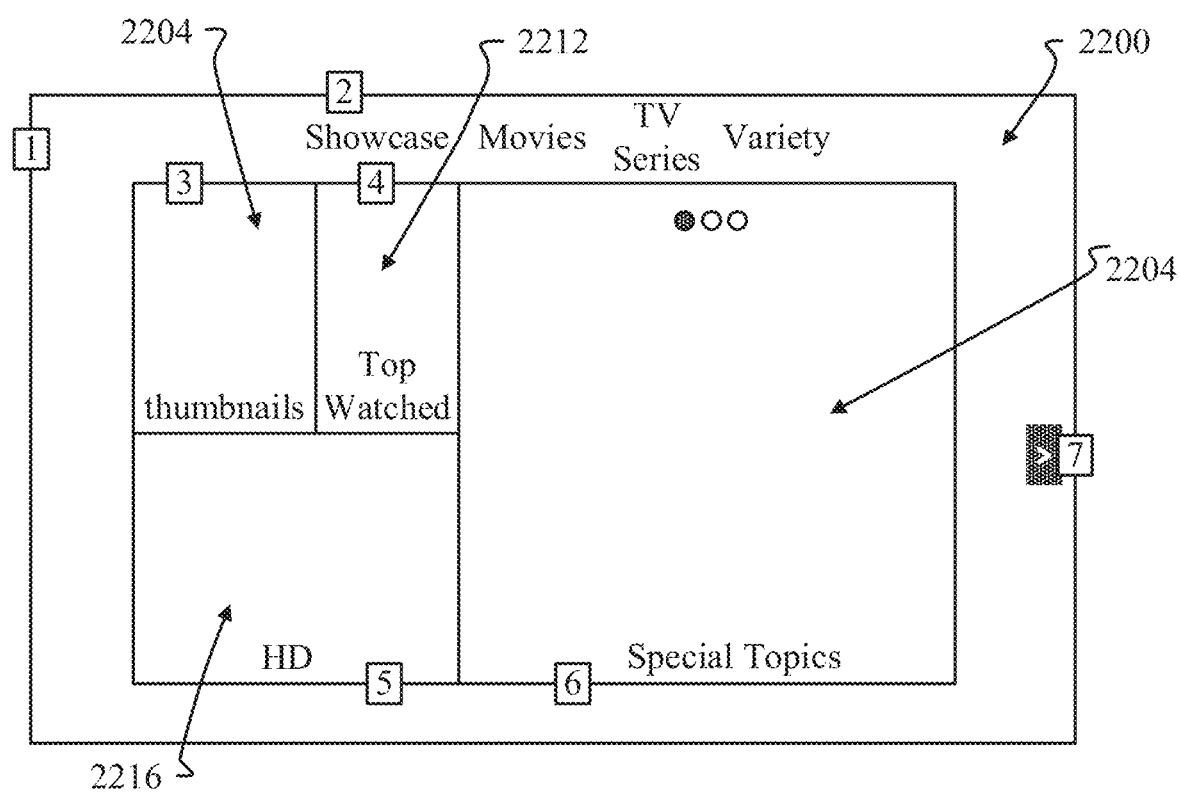
FIG. 22 is a view of an embodiment of a user interface for an Intelligent TV.

In step 2024, the panel manager 526 can provide a showcase user interface, in step 2024. For example, the panel manager 536 may provide the showcase user interface 2200 shown in FIG. 22. In some embodiments, the showcase view can provide thumbnails 2204 through 2216. Each of these thumbnails represents a different topic or collection of showcase content. Showcase content can be any type of material from the other categories that is pertinent to the user and in which the user may have a desire to watch. Thus, the showcase view 2200 has selection of content from all categories and may be organized by last viewed, represented by thumbnail 2204, special topics content, represented by thumbnail 2208, top watched content, represented by thumbnail 2212, and/or high definition content, represented by thumbnail 2216. Thus, the showcase user interface can organize all content based on criteria that are either user-defined criteria or are predetermined criteria based on statistics associated with the underlying content.

Figure 23:
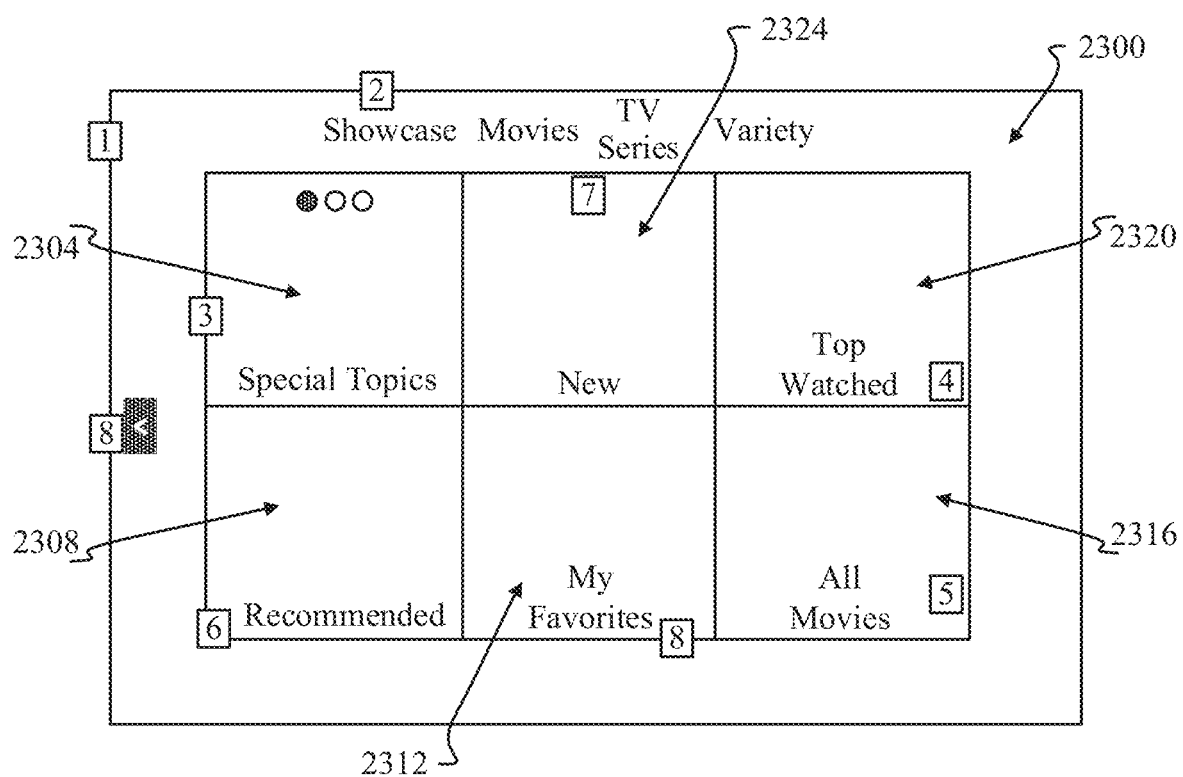
FIG. 23 is a view of an embodiment of a user interface for an Intelligent TV.

If the user selects the variety user interface device 2212, the panel manager 536 can provide a panel manager user interface 2300 as shown in FIG. 23. Variety programming can be any programming not necessarily associated with a movie or TV series. For example, variety programming can include documentaries, special interest shows, or other types of content. The variety programs can have one or more thumbnails, which organize the content and allow the user to select a collection to define content. These thumbnails may represent certain topics, for example, thumbnail 2304 indicates specials topics contents, thumbnail 2308 indicates recommended content, thumbnail 2312 indicates user selected favorites content, thumbnail 2304 indicates new content, thumbnail 2320 indicates top watched or most viewed content, and thumbnail 2316 can represent all types of variety content. These thumbnails 2304-2324 may be selected by the user to be provided with a collection view that is organized based on the associated category that was chosen by the user. Thumbnails may be provided from the thumbnail database 632.

Figure 24:
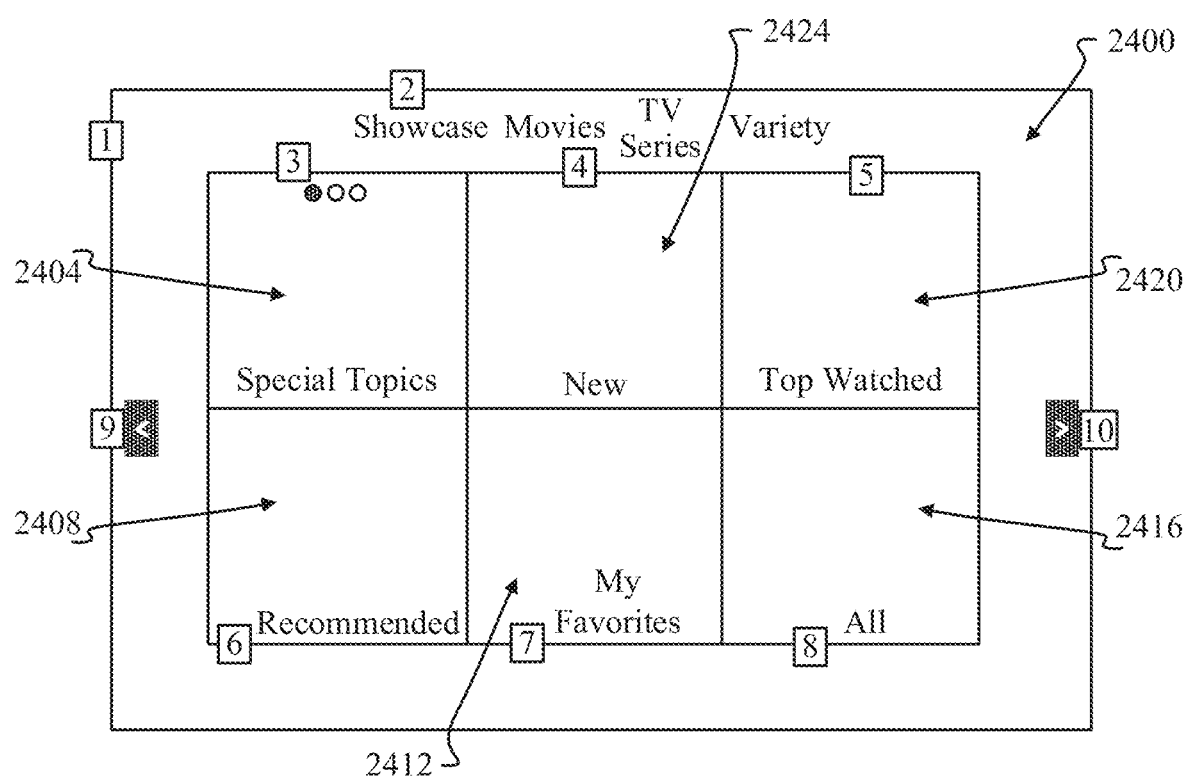
FIG. 24 is a view of an embodiment of a user interface for an Intelligent TV.

If the user selects the movie item 2108, the panel manager 536 can provide user interface 2400 shown in FIG. 24. The panel manager, in step 2028, provides this user interface 2400 with thumbnails 2404-2424, similar to those described in conjunction with the variety user interface in FIG. 23. Thus, the user may, again, select one or more movies, or collections of movies, based on the top categories or the categories listed by the thumbnails in user interface 2400.

Figure 25:
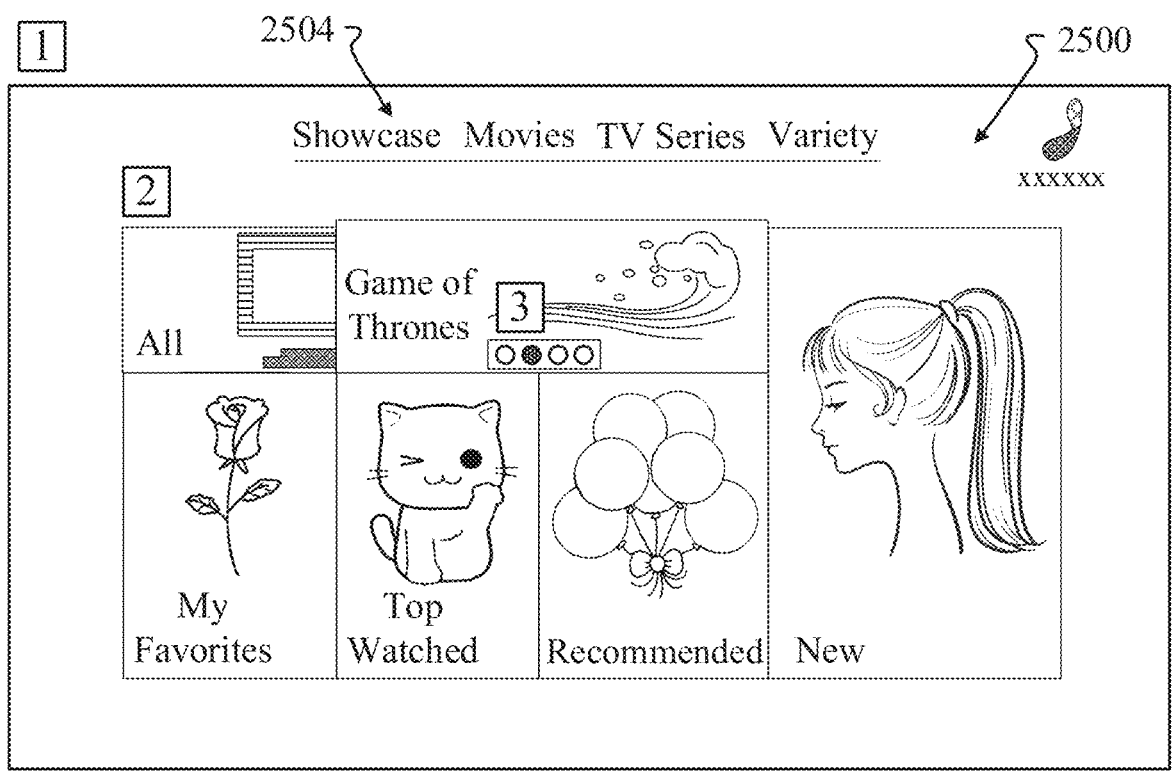
FIG. 25 is a view of an embodiment of a user interface for an Intelligent TV.

If the user selects the TV series item 2112, the panel manager 536 can provide a TV user interface 2500 shown in FIG. 25, in step 2032. In some embodiments, the panel manager 536, again, provides a series of thumbnails 2504-2524, which may be the same or similar to those described in conjunction with the variety user interface in FIG. 23. Further, one or more of the thumbnails may provide several views of different content. For example, user interface device 2504 may sequence through a series of thumbnails indicating different types of series. For example, the user interface item 2504 shows a "Game of Thrones" thumbnail. However, the next sequenced thumbnail may apply to the TV series "Homeland." Thus, the user may view more types of content within one area of user interface 2500 than that shown in any instant of time. These types of sequenced or moving thumbnails may be used in any of the user interfaces described hereinabove.

Figure 26:
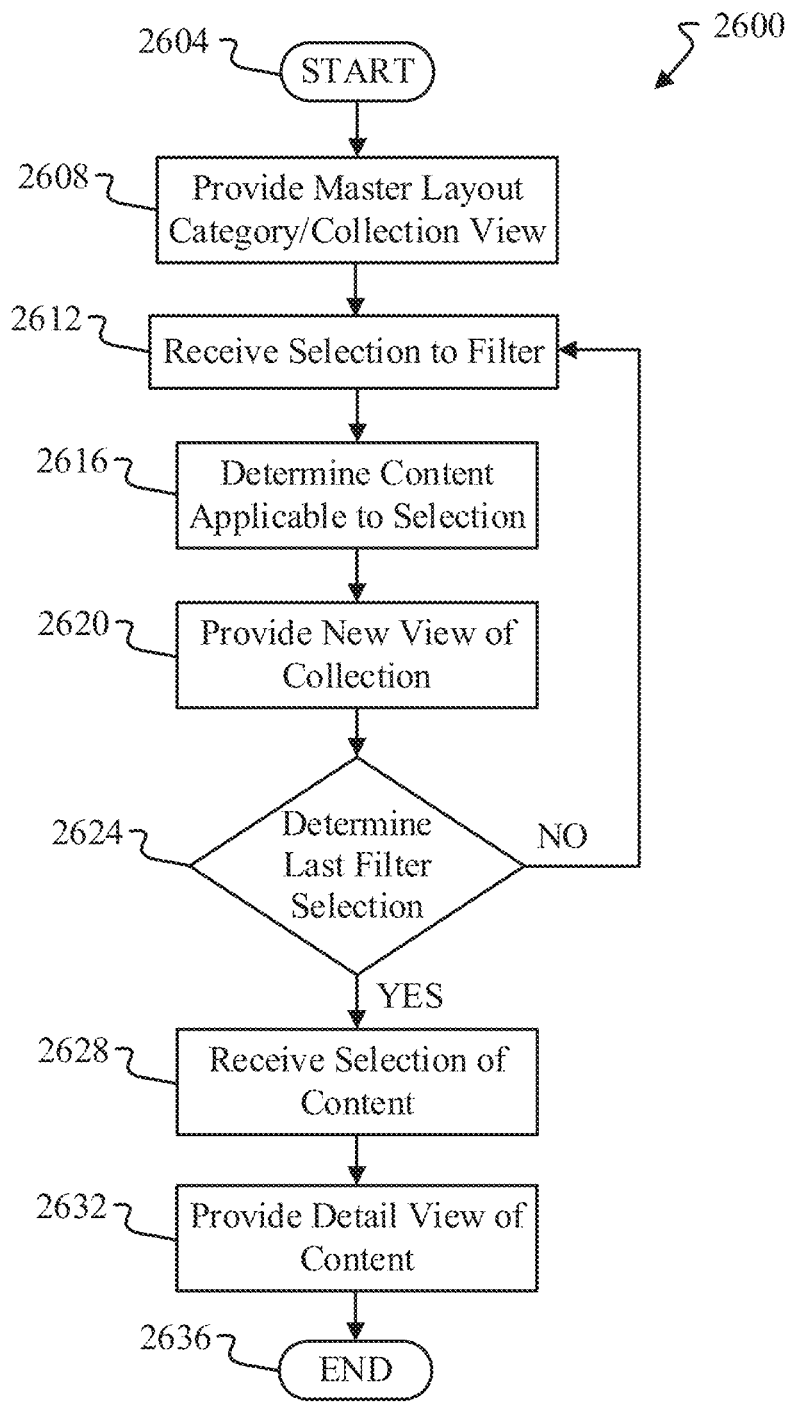
FIG. 26 is a flowchart view of an embodiment of a method for providing VOD in an Intelligent TV.

An embodiment of a flow 2600 for providing a collection view of content is shown in FIG. 26. While a general order for the steps of the flow 2600 is shown in FIG. 26, the steps may be arranged in any order. Generally, the flow 2600 can start with a start operation 2604 and end with an end operation 2636. The flow 2600 can include more or fewer steps or can arrange the order of the steps differently than those shown in FIG. 26. The flow 2600 can be executed as a set of computer-executable instructions, executed by a computer system, and encoded or stored on a computer readable medium. Further, the flow 2600 can be executed by a gate or other hardware device or component in an Application Specific Integrated Circuit, a Field Programmable Gate Array, or other type of hardware device. Hereinafter, the flow 2600 shall be explained with reference to the systems, components, modules, software, data structures, user interfaces, etc. described herein.

The panel manager 536 can provide a master layout view, in step 2608. Thus, as described in conjunction with FIGS. 2000 through 2500, the panel manager 536 using information provided by the VOD subservice 620 can provide a master layout view.

The user may select a thumbnail within one of the user interface items shown in FIGS. 21 through 25. The selection may be made using a directional pad 760 to change the focus onto one of the thumbnails and, using the OK button 764, select that thumbnail. The remote control signal may then be sent to the Intelligent TV 100 through the IR/RF module 354 to the processor 364. A driver 420 can interpret the signal and provide the translation to the user interface application 468. In some embodiments, an input event dispatcher 508 may then send that information to the panel manager 536 to indicate that a selection has been made. A panel manager 536 thus can receive the selection, in step 2612.

Based on the selection, the panel manager 536 can send the information of the selection to the VOD subservice 620. The VOD subservice 620 may then determine which content is applicable to the selection, in step 2616. In some embodiments, the VOD subservice 620 may be provided information from the panel manager 536 as to which of the category was selected. For example, the user can select high definition content, most watched content, top favorites content, most viewed content, or other types of content, as described in conjunction with FIGS. 20 through 25. Once determined, the VOD subservice 620 may then access database 632 that includes the information described in FIG. 14.

In some embodiments, the VOD subservice 620 may search metadata 1420 or other information in fields 1428 through 1444 and fields 1412 through 1416. This information may be accessed to determine which content applies to the selected category. For example, most recent or new content may have a date and time 412, 416, that is within a certain timeframe or period of time. Further, the VOD subservice 620 can access the view count 1436 to determine if the information has been viewed or is new. The view time and view date 428 and 432 may also be used to determine whether the content is new. Further, the view count 436 may be used to determine if the content is most watched. The status indicator 1440 can also be used to provide information for different categories; also, the user-defined field 1444 can be used to determine if the item is a favorite. Thus, the VOD subservice 620 can access any of the information in data structure 1404 to determine which content is applicable to the selection. This content may then be provided to the panel manager 536.

Figure 27A:
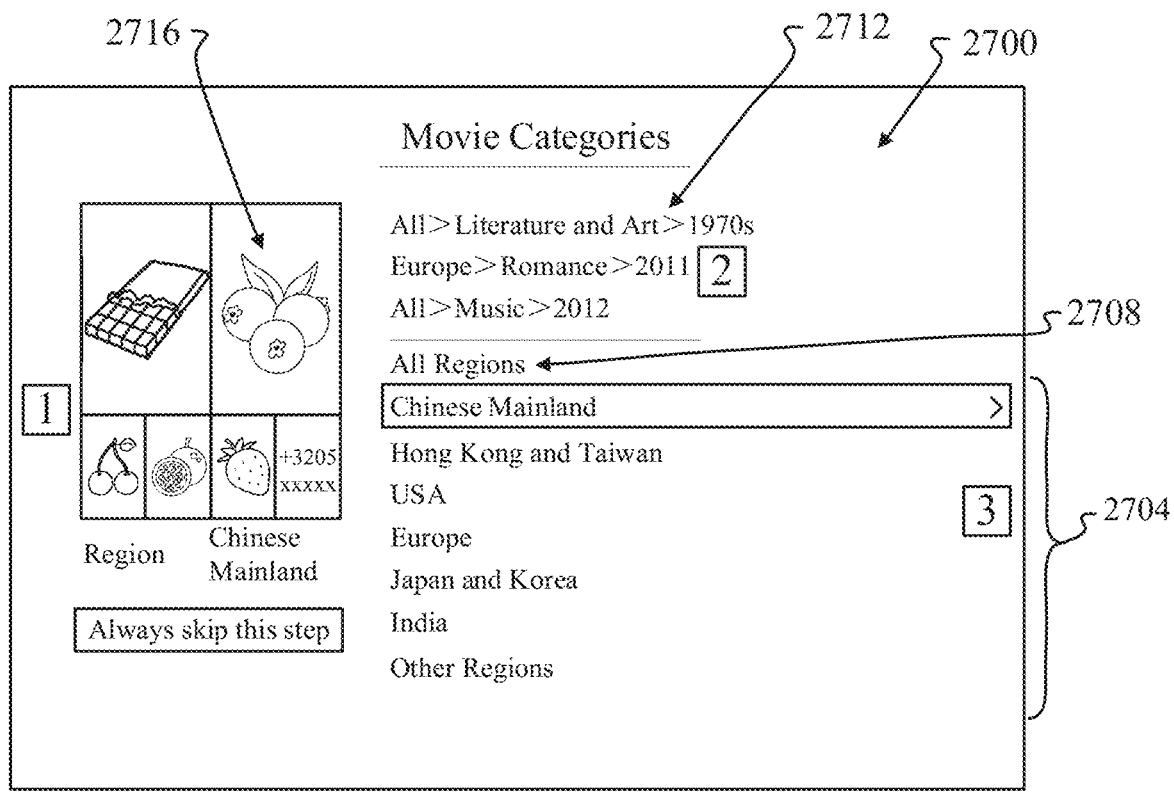
FIG. 27A is a view of an embodiment of a user interface for an Intelligent TV.

The panel manager 536 can then provide a new view for a collection of content, in step 2612. In the content view, the panel manager 536 can now provide a series of filter criteria to allow the user to further filter the collections to better target a particular type or single item of content, in step 2612. The panel manager 536 can provide a first user interface having one or more filter criteria, such as user interface 2700. For example, in FIG. 27A, user interface 2700 can provide one or more filter criteria shown in section 2704. In some embodiments, the filter criteria 2704 can apply to a region in which the movie was created 2708. Past filter criteria are shown in section 2712. The filter criteria 2704 can include a type of content, a year in which content was made, or other such types of filtering selections.

Figure 27B:
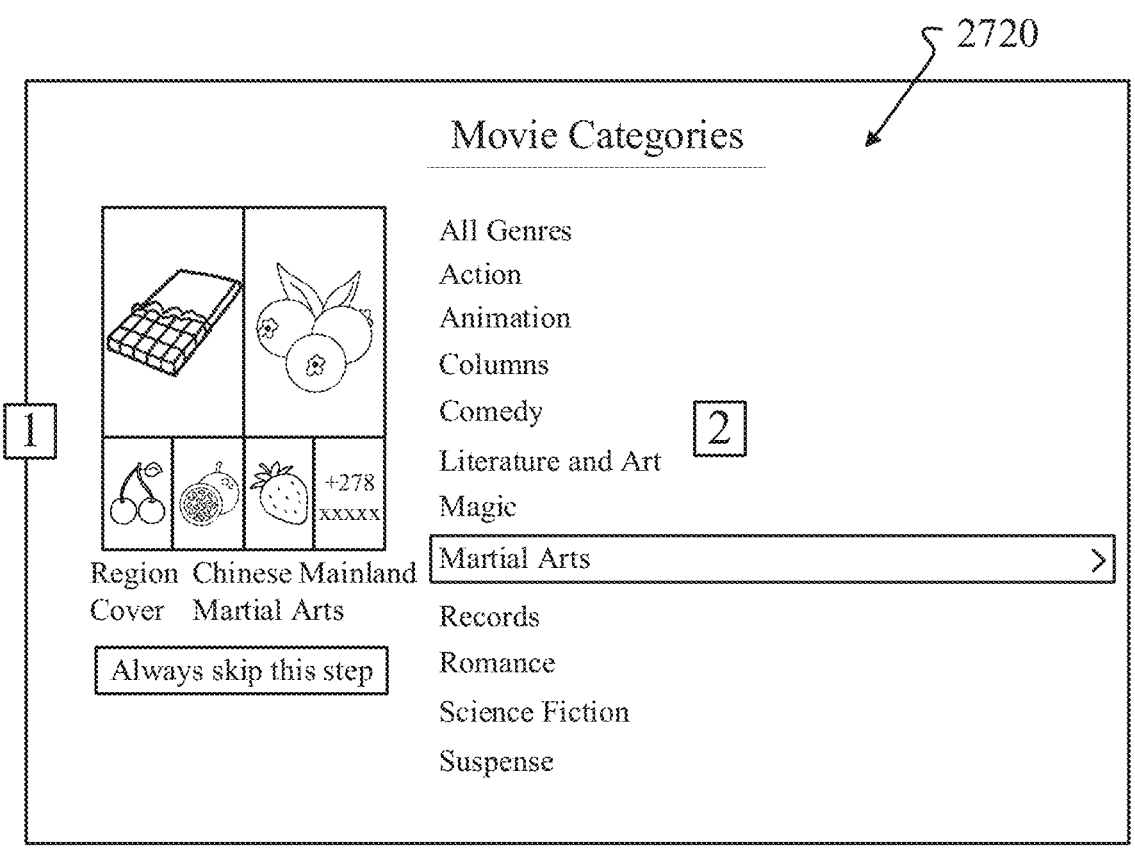
FIG. 27B is a view of an embodiment of a user interface for an Intelligent TV.
Figure 27C:
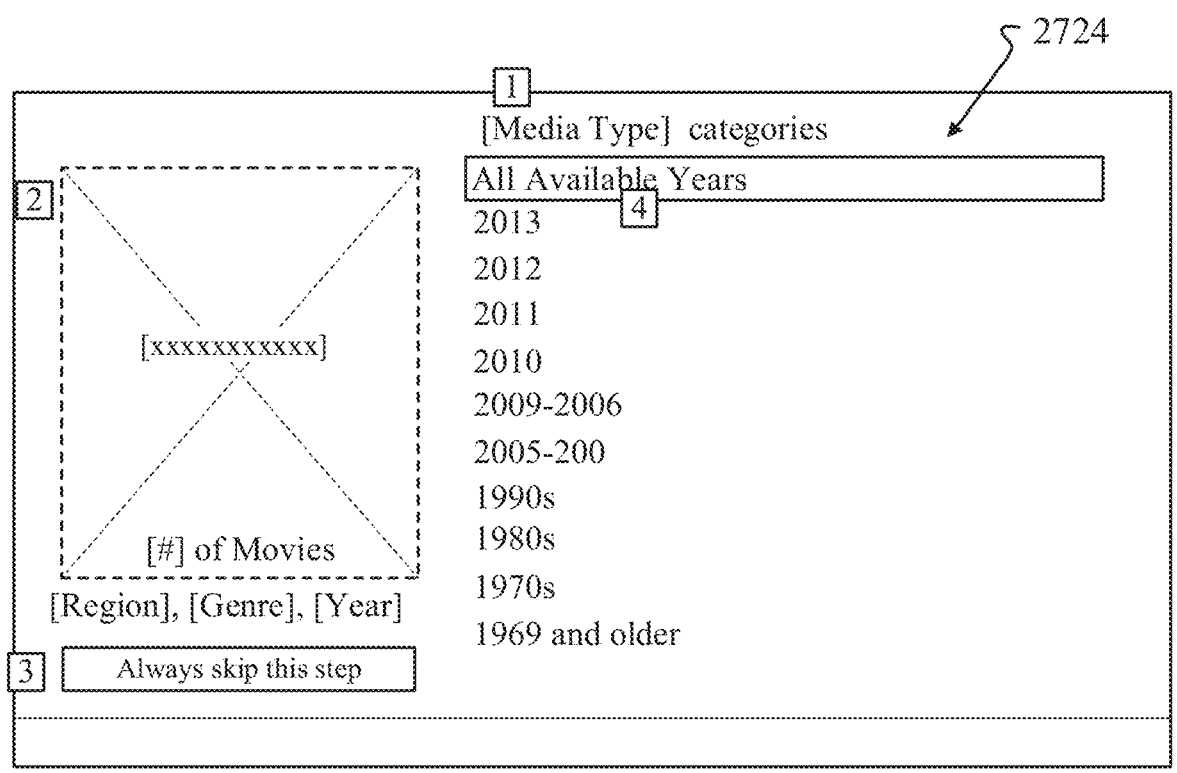
FIG. 27C is a view of an embodiment of a user interface for an Intelligent TV.

The user may then move the focus, with the directional pad 760, to indicate one of the filter selections. The selection may be done, by using button 764, to send a signal to the Intelligent Television 100. The signal is received as described hereinbefore and provided to the panel manager 536. The panel manager 536 can determine the selection made and provide that to the video subservice 620, which further refines the search for content provided to the panel manager 536. The panel manager 536 may then provide a next user interface with the content filtered, in step 2620. Thus, the user can navigate through one or more different types of filters to better categorize or reduce the amount of content available for selection, such as user interfaces 2720 and 2724 in FIGS. 27B and 27C.

The panel manager 536 can then determine if the current selection is the last filter selection made, in step 2624. For example, the user may be able to select a content viewed in section 2716, in which case no further filter criteria is needed. In other embodiments, it may be the last of the type of filter criteria available or there may be only a single item of content or a small set of content to be provided in a last screen. If it is the last filter criteria selected, the flow 2600 goes YES to step 2628. If it is not the last filter criteria selected, the flow 2624 can proceed through the NO branch back to step 2612 to receive another filter selection. In step 2628, the VOD subservice 620 can provide the last selection of content to the panel manager 536. The panel manager 536 may then present this content to the user. The user may then select a content, in which case the panel manager 536 receives that selection, in step 2628. Based on that type of selection, the panel manager 536 may provide a detailed view, described hereinbefore, to view the content for the user, in step 2632.

Figure 28:
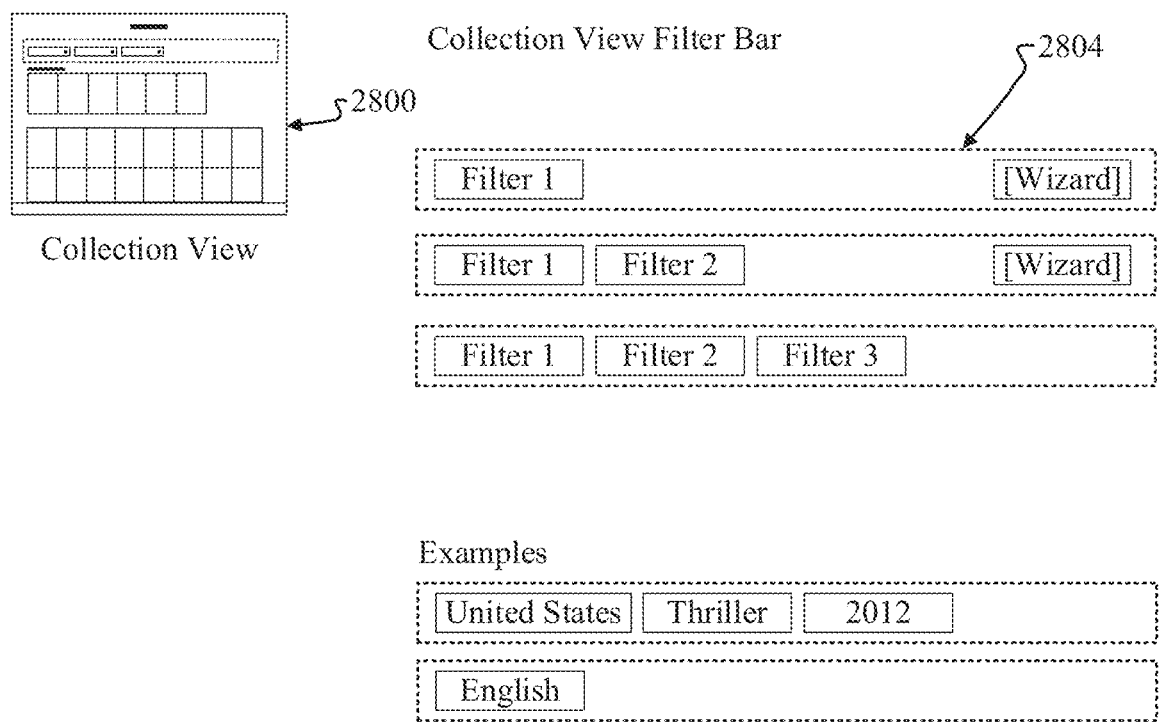
FIG. 28 is a view of an embodiment of a user interface for an Intelligent TV.
Figure 29:
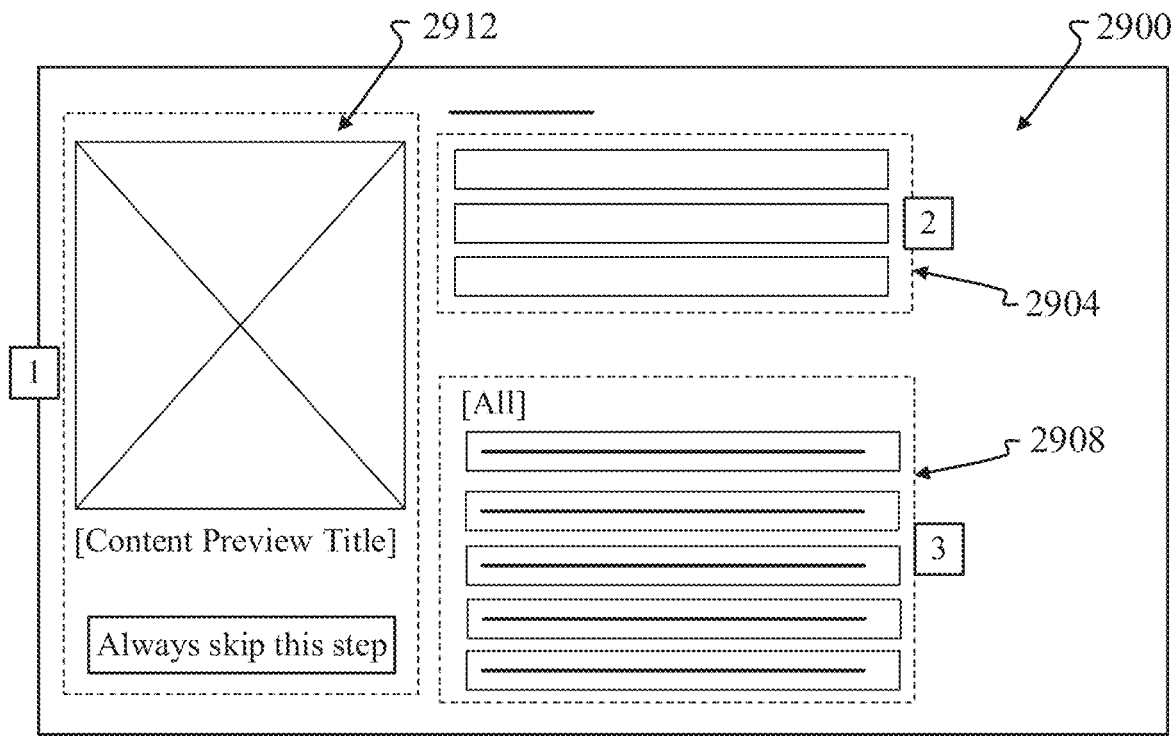
FIG. 29 is a view of an embodiment of a user interface for an Intelligent TV.

The filter views can be presented in two types of user interfaces shown in FIGS. 28 and 29. The user interface 2800 provides a filter bar or filter categories in the navigation bar as shown in user interface 2800. The filter bar can include one or more filter criteria as shown in section or view 2804. Thus, depending on the types of filter category, including genres, dates, regions, etc., the navigation bar can contain different filter criteria.

In FIG. 29, the filter criteria may be provided in one or more areas inside a user interface 2900. For example, a last used filter criterion may be shown in section 2904, while selectable filter criteria may be shown in section 2908. A view of possible content associated or that may be provided with such a search is shown in section 2912. The user interface 2900, shown in FIG. 29, may be the same or similar as that shown in FIG. 27A.

Figure 30:
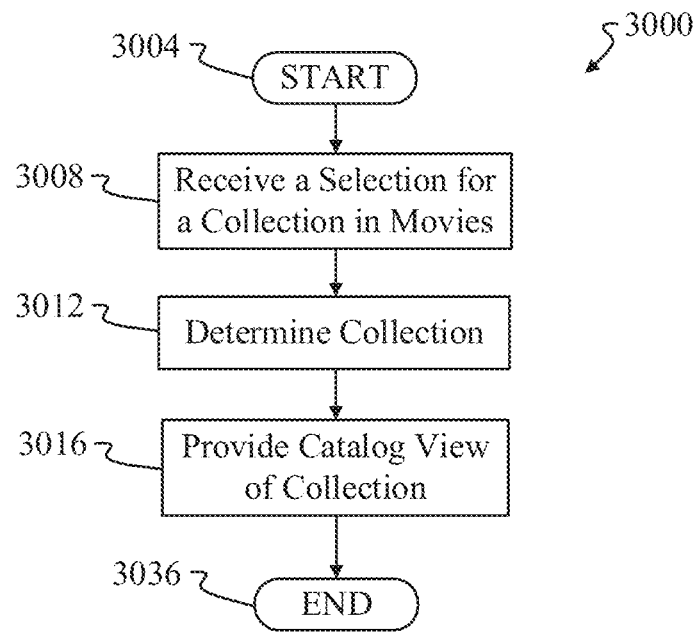
FIG. 30 is a flowchart view of an embodiment of a method for providing VOD in an Intelligent TV.

An embodiment of a method 3000 for providing a collection view after filtering category is shown in FIG. 30. While a general order for the steps of the method 3000 is shown in FIG. 30, the steps may be arranged in any order. Generally, the method 3000 can start with a start operation 3004 and end with an end operation 3036. The method 3000 can include more or fewer steps or can arrange the order of the steps differently than those shown in FIG. 30. The method 3000 can be executed as a set of computer-executable instructions, executed by a computer system, and encoded or stored on a computer readable medium. Further, the method 3000 can be executed by a gate or other hardware device or component in an Application Specific Integrated Circuit, a Field Programmable Gate Array, or other type of hardware device. Hereinafter, the method 3000 shall be explained with reference to the systems, components, modules, software, data structures, user interfaces, etc. described herein.

The panel manager 536 can receive a selection for a collection of movies from a master view or collection view after a filtered category selection, in step 3008. For example, after proceeding through the process described in conjunction with FIG. 26, the panel manager 536 may determine a collection of movies that applies to the filter categories provided by the user. This final selection received through the remote control 700 at the panel manager 536 can be provided to the VOD subservice 620.

The VOD subservice 620 can determine the collection of movies that apply to the filter category, in step 3012. The panel manager 536 thus provides the VOD subservice 620 with the filtering categories or information in which the VOD subservice 620 searches the database 1400 for content applicable to that filter selection or selections. This collection of content may be provided back to the panel manager 536 with the thumbnail information or other content information. The thumbnails may be retrieved by the thumbnail cache manager 660 from the thumbnails database 668. This collection information is then given to the panel manager 536.

Figure 31:
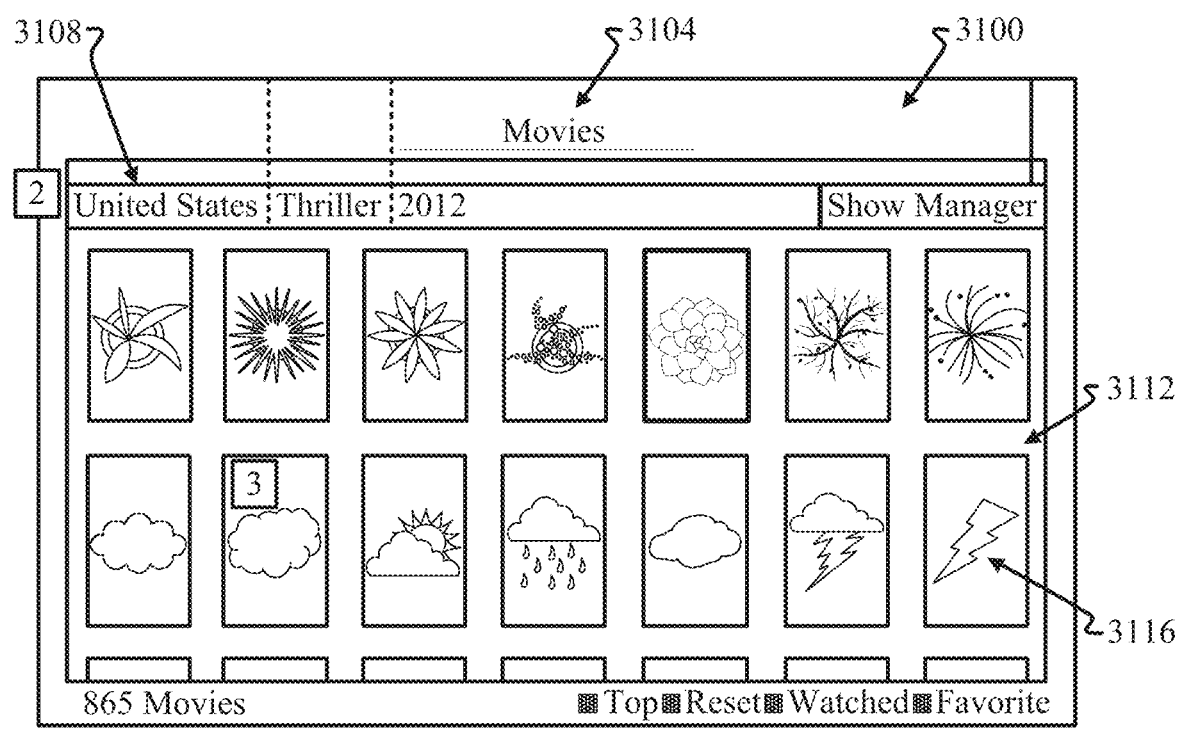
FIG. 31 is a view of an embodiment of a user interface for an Intelligent TV.

The panel manager 536 may then provide the catalog view of the collection, in step 3016. For example, the panel manager 536 can provide a user interface similar to that shown in FIG. 31. In some embodiments, the user interface 3100 is directed towards movie content as indicated by the title 3104. At least three filter criteria have been received, as shown in navigation bar 3108. The collection view includes a content area 3112 that provides one or more thumbnails that are associated with content that are available based on the filter criteria in 3108. For example, thumbnail 3116 can be for a movie that is returned by the VOD subservice 620 based on the filter criteria 3108. The thumbnails, such as thumbnail 3116, are selectable and, if selected, instruct the Intelligent TC 100 to provide content.

Figure 32:
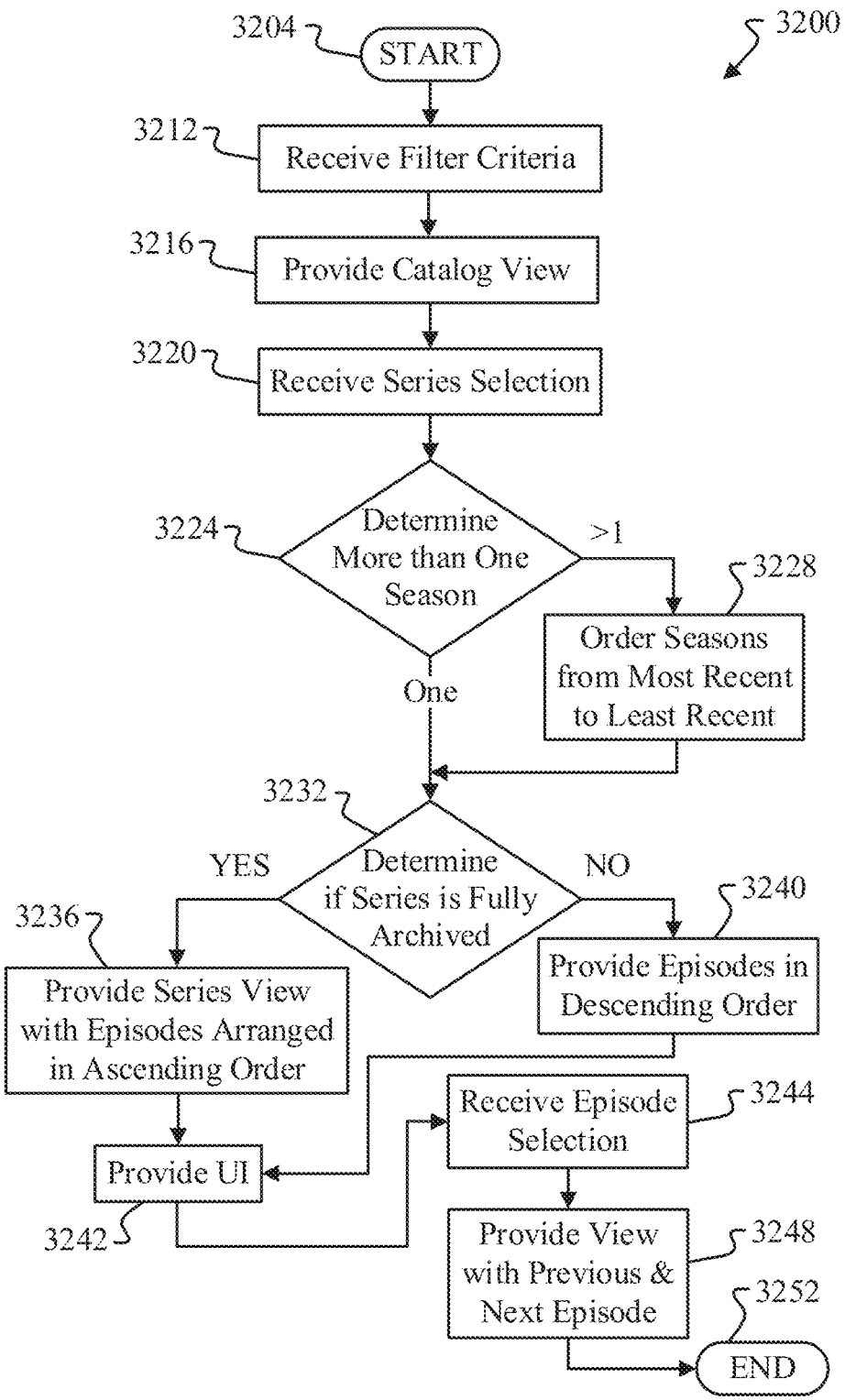
FIG. 32 is a flowchart view of an embodiment of a method for providing VOD in an Intelligent TV.

An embodiment of a method 3200 for providing a catalog view and subsequent detail and series use for TV series and/or variety series is shown in FIG. 32. While a general order for the steps of the method 3200 is shown in FIG. 32, the steps may be arranged in any order. Generally, the method 3200 starts with a start operation 3204 and ends with an end operation 3252. The method 3200 can include more or fewer steps or can arrange the order of the steps differently than those shown in FIG. 32. The method 3200 can be executed as a set of computer-executable instructions, executed by a computer system, and encoded or stored on a computer readable medium. Further, the method 3200 can be executed by a gate or other hardware device or component in an Application Specific Integrated Circuit, a Field Programmable Gate Array, or other type of hardware device. Hereinafter, the method 3200 shall be explained with reference to the systems, components, modules, software, data structures, user interfaces, etc. described herein.

On receiving filter criteria, in step 3212, the panel manager 536 and VOD subservice 620 can provide a catalog view, in step 3216. Receiving a filter criteria and providing a catalog view may be as described in conjunction with FIGS. 26 and 30 described hereinbefore.

Figure 33:
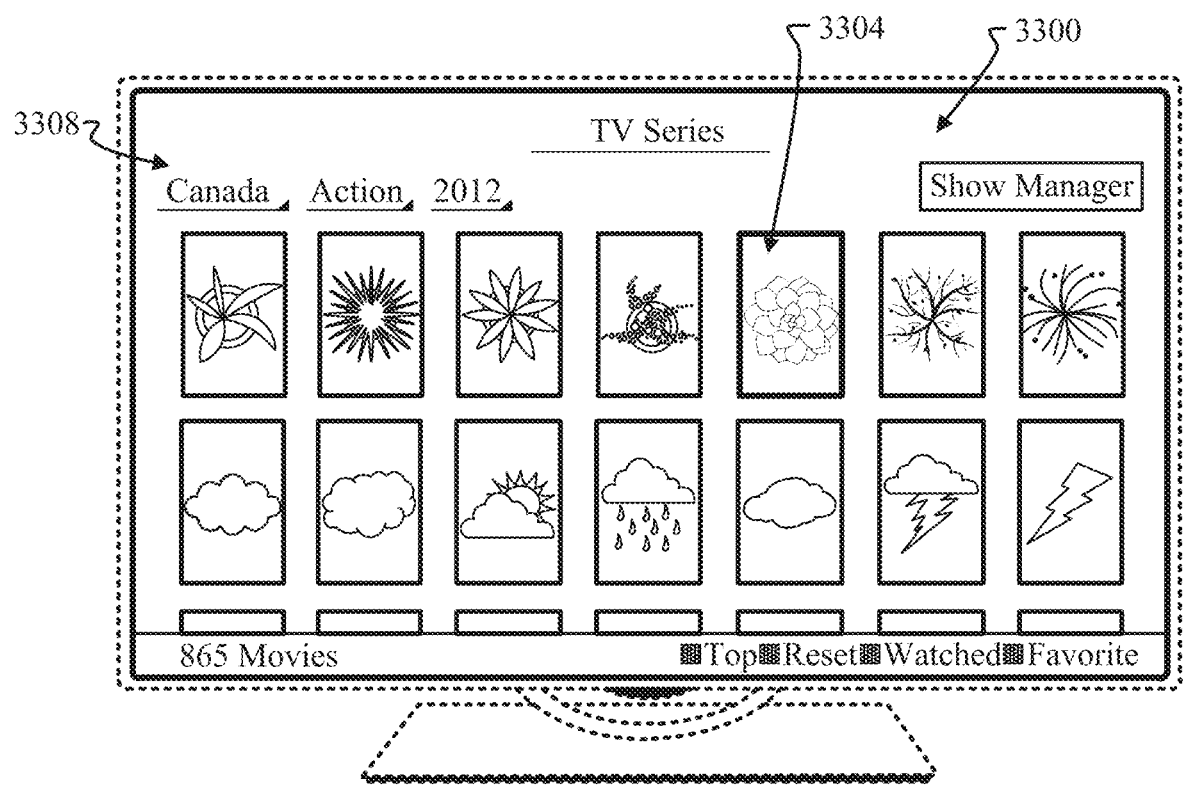
FIG. 33 is a view of an embodiment of a user interface for an Intelligent TV.

The panel manager 536 may receive a series selection, in step 3220. In some embodiments, the user may use the remote control 700 to move a focus with the directional pad 760 and select the focused thumbnail with button 764. For example, as shown in FIG. 33, the focus, in user interface 3300, is placed on the series "Game of Thrones," represented by thumbnail 3304. The thumbnails, shown in user interface 3300, were provided in reaction to providing filter criteria 3308. The user may select the Game of Thrones thumbnail by selecting the OK button 764. The selection for this series is received by the panel manager 536, in step 3220.

The selection may then be provided to the VOD subservice 620. The VOD subservice 620 may then determine if there is more than one season available for the series selected, e.g., "Game of Thrones," in step 3224. If there is only a single season, the method proceeds through the ONE branch to step 3232. However, if there is more than one season, the method proceeds through the GREATER THAN ONE branch to step 3228.

In step 3228, the VOD subservice 620 may determine if all the seasons, or episodes within the seasons, have been aired. For example, if there are four seasons and the fourth season is completely aired, then the sort criteria can be different. However, if the fourth season has not been completely aired, there may be different sort criteria for that situation. If all seasons have been aired, the seasons can be ordered and provided to the panel manager 536 in order from the first season to the last season. However, if the last season has not been fully aired, these seasons are provided to the panel manager 536 from the most recent season to the oldest season.

The VOD subservice 620 can also determine, in step 3232, if the series is fully archived. In this case, for example, if all the episodes within a season have been received and archived in the VOD database 632. If the series is fully archived, the method 3200 goes YES to step 3236. If the season is not fully archived, then the method goes NO to step 3240.

The VOD subservice 620 can provide the series with the episodes arranged in ascending order if all the series have been archived, in step 3236. For example, if the fourth season is fully archived, the episodes within that season may be listed from episode one to the last episode. In contrast, in step 3240, if the series is not fully archived, the VOD subservice 620 can arrange the episodes in descending order. For example, if season four is not fully archived, the episodes may be arranged from the last latest episode to the first episode.

Figure 34:
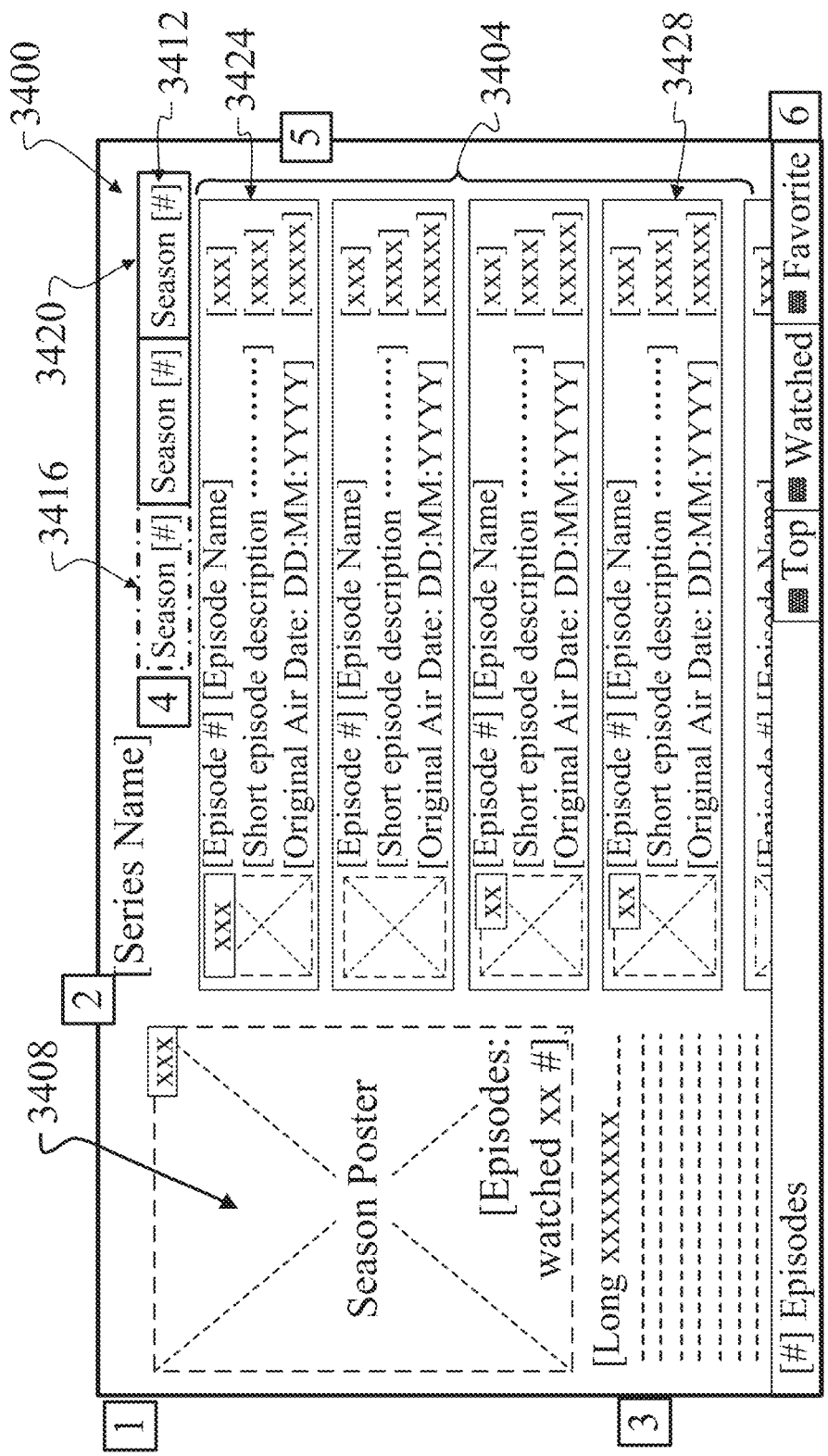
FIG. 34 is a view of an embodiment of a user interface for an Intelligent TV.

The panel manager 536 may receive this information and then provide a user interface having this type of arranged seasons and episodes, in step 3242. For example, the panel manager 536 can provide a user interface 3400 similar to that shown in FIG. 34. In some embodiments, the user interface 3400 can include a section for the season listings 3412. As explained previously, if the seasons are fully aired, the user interface item 3416 will contain the first season, while the user interface item 3420 can include the last season. In contrast, if the seasons are not fully aired, user interface item 3416 will include the last season, while other item will include the first season or earlier seasons. In addition, in the user interface shown in FIG. 34, the bottom portion can comprise a hotkey legend. For example, the hotkey legend can comprise one or more hotkey color indicators each associated with a function within the interface presented on the display or in the application.

The episodes may be arranged in section 3404. Again, as explained previously, if the seasons are fully archived, the episodes are arranged in ascending order with display element 3424 including the first episode of the season and with user interface section 3428 including a later aired episode. In contrast, if the episode or season is not fully archived, user interface portion 3424 can provide information about the last aired episode, while a portion 3428 will include information about an episode aired previously or in the past. The section 3408 may include information about the series, including a poster or thumbnail that gives a visual representation of the season, and a description of the series.

Figure 35:
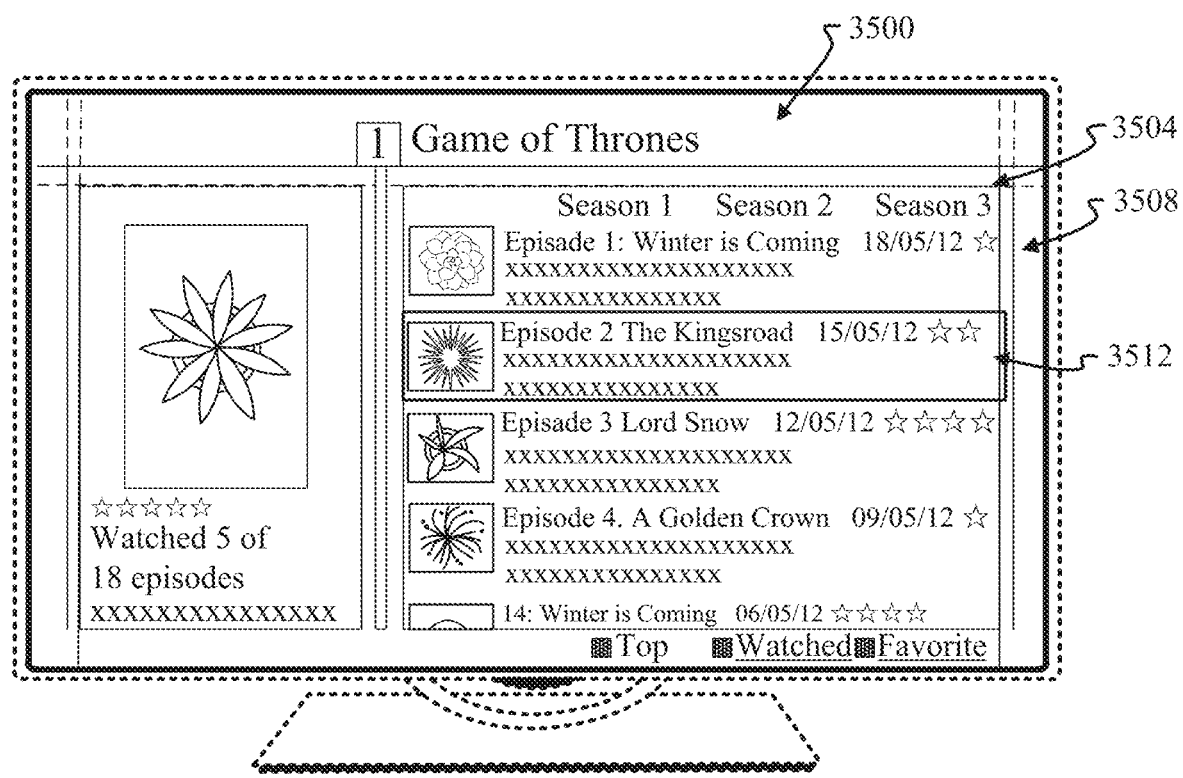
FIG. 35 is a view of an embodiment of a user interface for an Intelligent TV.

Another example of the digest view for a series of television shows or variety shows is shown in FIG. 35. The user interface 3500 can display a series, e.g., Game of Thrones. The season listing is shown in section 3504, while the episode listings for season three is shown in section 3508. One episode 3512 is shown in focus. These presentations are governed by the same rules explained previously.

The user may then select an episode using the directional pads 760 and the selection button 764 as described herein, in step 3244. The selection may be for an episode. For example, the episode with the focus 3512 shown in FIG. 35 may be selected. On receiving a selection, the VOD subservice 620 can provide the content information 354 to the panel manager 536. The panel manager 536 may then provide a view for playback 3600 shown in FIG. 36, in step 3248. In some embodiments, the user interface 3600 can provide the content in portion 3616. The user may control the playback using playback controls 3612. Uniquely, the playback user interface 3600 can also show tiles of thumbnails that are selectable by the user to move to a next episode 3604 or previous episode 3608 in the series. In this way, for TV series or variety series, the user may easily navigate between episodes in a season with these controls in the playback view.

Figure 37:
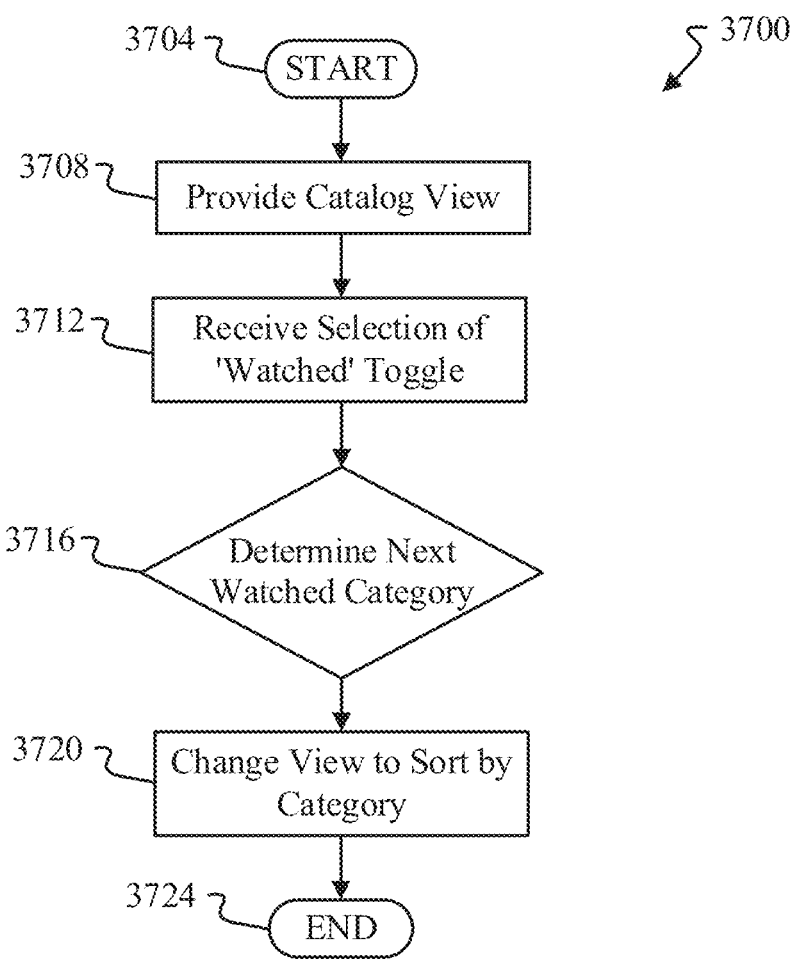
FIG. 37 is a flowchart view of an embodiment of a method for providing VOD in an Intelligent TV.

A method 3700 for toggling between the status of programs is shown in FIG. 37. While a general order for the steps of the method 3700 is shown in FIG. 37, the steps may be arranged in any order. Generally, the method 3700 can start with a start operation 3704 and end with an end operation 3724. The method 3700 can include more or fewer steps or can arrange the order of the steps differently than those shown in FIG. 37. The method 3700 can be executed as a set of computer-executable instructions, executed by a computer system, and encoded or stored on a computer readable medium. Further, the method 3700 can be executed by a gate or other hardware device or component in an Application Specific Integrated Circuit, a Field Programmable Gate Array, or other type of hardware device. Hereinafter, the method 3700 shall be explained with reference to the systems, components, modules, software, data structures, user interfaces, etc. described herein.

Figure 38:
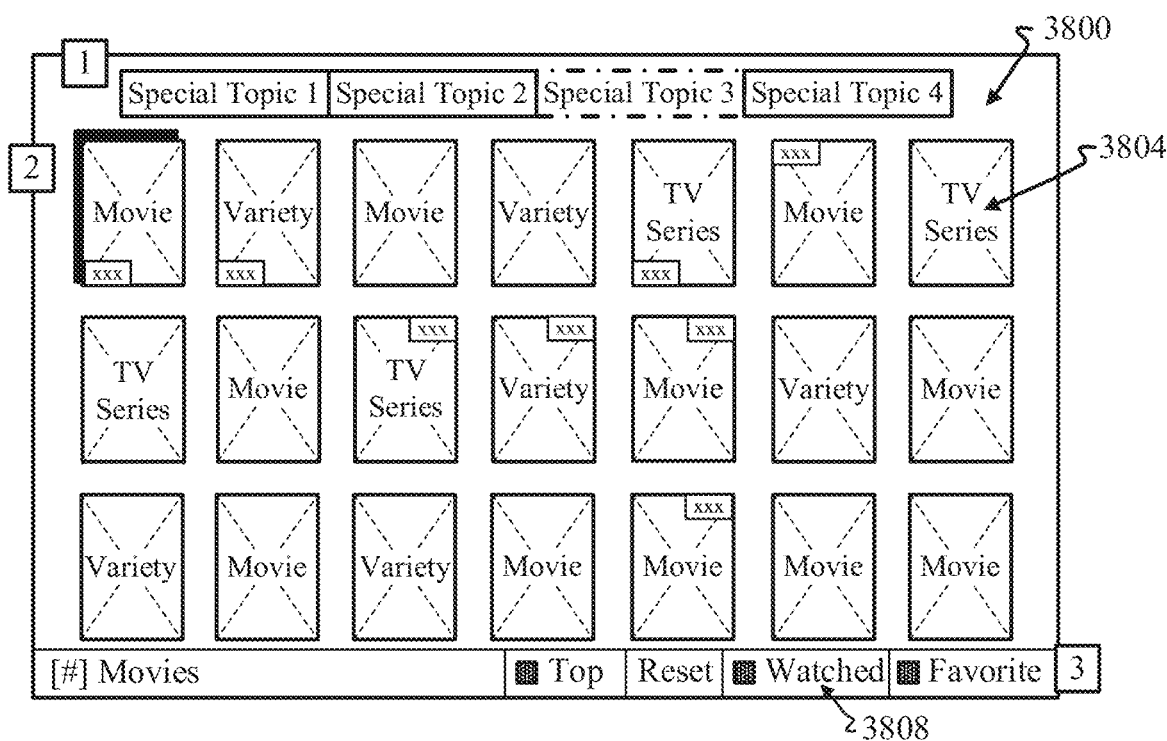
FIG. 38 is a view of an embodiment of a user interface for an Intelligent TV.

In some embodiments, the user may be provided a catalog view, in step 3708. The panel manager can provide a catalog view, similar to that shown in FIG. 38. In some embodiments, the catalog view 3800 includes a bunch of thumbnails for example, thumbnail 3804, that are associated with a type of content. These content thumbnails may be arranged in any type of order based on filter criteria. The user may then select a hotkey icon 3808 to watch the content provided in the catalog view 3800. This selection may be completed, for example, by a selection of a hotkey on the remote control. This selection is received by the processor 364 and provided to the panel manager 536 in step 3712.

Based on the selection, the content in user interface 3800 may be arranged based on whether the program has been watched or not. For example, the user may select to watch only programs that have been previously watched, which may be displayed in user interface 3800. However, the watch status may be different, and the user may desire to watch programs that are in progress. Further, the user may desire to watch only programs or view programs that have not been watched previously. Thus, the panel manager 536 can determine which category or watched category is requested, in step 3716.

In step 3716, the panel manager 536 may determine the context of the interface 3800. The context can mean what type of watched status is currently being displayed. If interface item or hotkey indicator 3808 is selected, the panel manager 536 can determine what is the next category for watched status. The next category may then be provided to the VOD subservice 620 to search the database 1400 for status information 1370, which is associated with that watched category. The content having that watched status is provided back to the panel manager 536 to render in the user interface 3800. Thus, the content thumbnails shown in user interface 3800 will update based on the watched status being provided. Thus, the panel manager 536 can change the view of user interface 3800 to sort by the watched category, in step 3720. The view may thus be toggled between watched status, in progress status, or not watched status.

Figure 39:
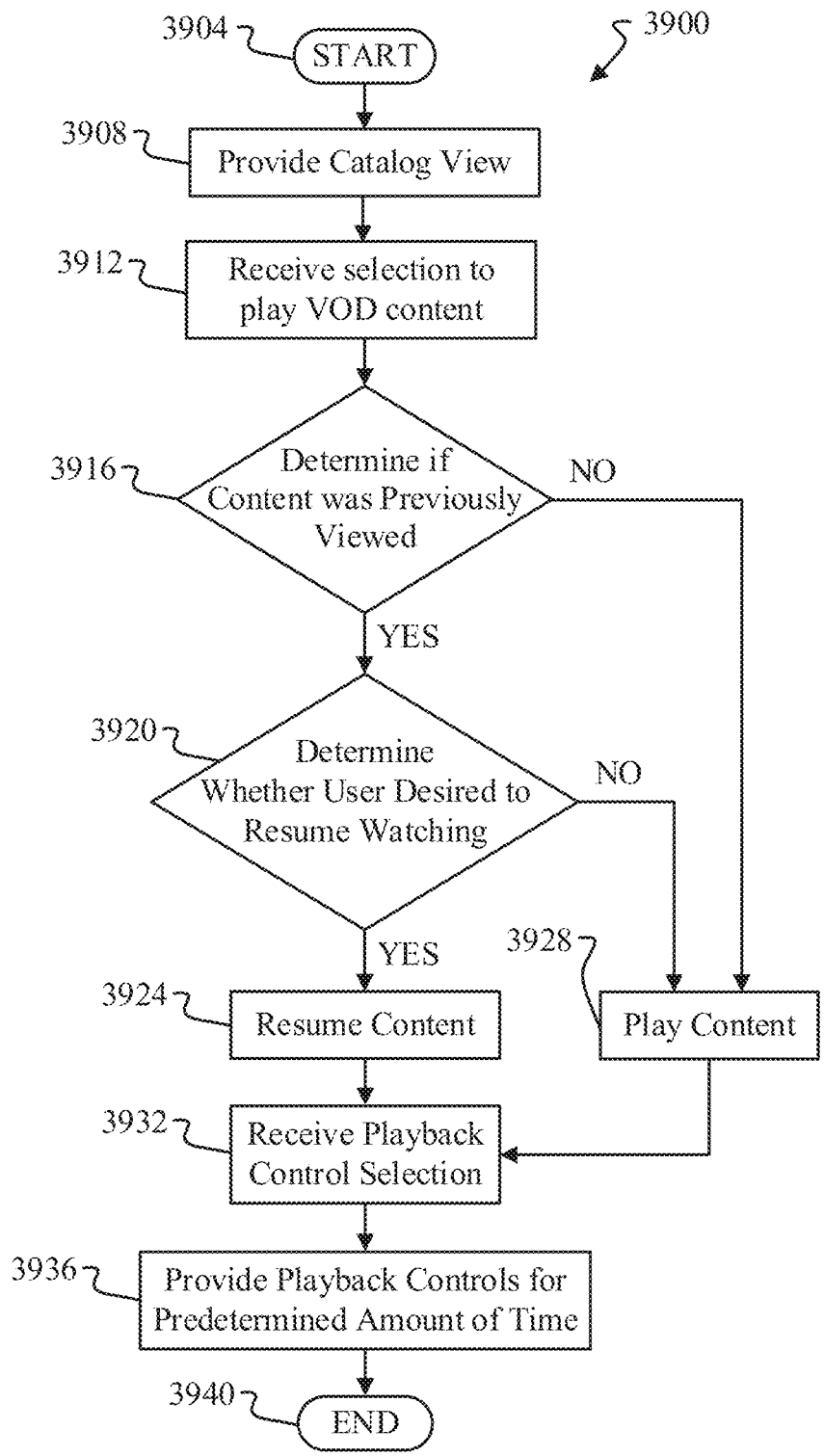
FIG. 39 is a flowchart view of an embodiment of a method for providing VOD in an Intelligent TV.

A method 3900 for providing playback of VOD is shown in FIG. 39. While a general order for the steps of the method 3900 is shown in FIG. 39, the steps may be arranged in any order. Generally, the method 3900 can start with a start operation 3904 and end with an end operation 3940. The method 3900 can include more or fewer steps or can arrange the order of the steps differently than those shown in FIG. 39. The method 3900 can be executed as a set of computer-executable instructions, executed by a computer system, and encoded or stored on a computer readable medium. Further, the method 3900 can be executed by a gate or other hardware device or component in an Application Specific Integrated Circuit, a Field Programmable Gate Array, or other type of hardware device. Hereinafter, the method 3900 shall be explained with reference to the systems, components, modules, software, data structures, user interfaces, etc. described herein.

A catalog view for items of content is provided, in step 3908. A catalog view may be as described in conjunction with FIG. 38. The intelligent television 100 can receive a selection to play VOD content, in step 3912. The user may place focus on an item 3804 in the catalog view 3800 and press a confirm button using a remote control 700, as has been described previously herein.

The selection signal may be sent to the VOD subservice 620. The VOD subservice 620 may then determine if a user has previously watched the selected content, in step 3916. The VOD subservice 620 stores the watch status 1440 in database 1400, as described in conjunction with FIG. 14. The status 1440 is associated with the content 1424 in data structure 1404. This status information 1440 may be retrieved from the data base 1400 by the VOD subservice 620 for presentation on the user interface.

If the user has previously watched the content, the method 3900 goes YES to step 3920. In step 3920, based on if the status 1440 shows that the user previously viewed the content, prompt the user if the user desires to resume watching the content. A notification or other user interface element for alerting the user that the user had previously watched the content is provided. The user interface element may have a selectable button or other control to resume watching the content. if the user desires to resume watching the content based on the selection of the button is determined, in step 3920. If the user selects the button, the method 3900 goes YES to step 3924 where the content is resumed from the point at which the user had stopped watching. If the user does not select the button, the method 3900 goes NO to step 3928 where the application begins the playback of the content from a beginning of the content. If the user has not previously watched the content, the method 3900 goes NO to step 3928 where the user interface application 468 also plays the content from a beginning of the content.

During playback, the user may select a button on a remote control 700 to view playback controls, in step 3932. The playback controls may be the same or similar to those described in conjunction with FIG. 36. In response to receiving a playback control selection, the application can provide the playback control for a predetermined amount of time, in step 3936. The predetermined amount of time can be any time period, for example, 10 seconds, a minute, five minutes, etc.

Figure 36:
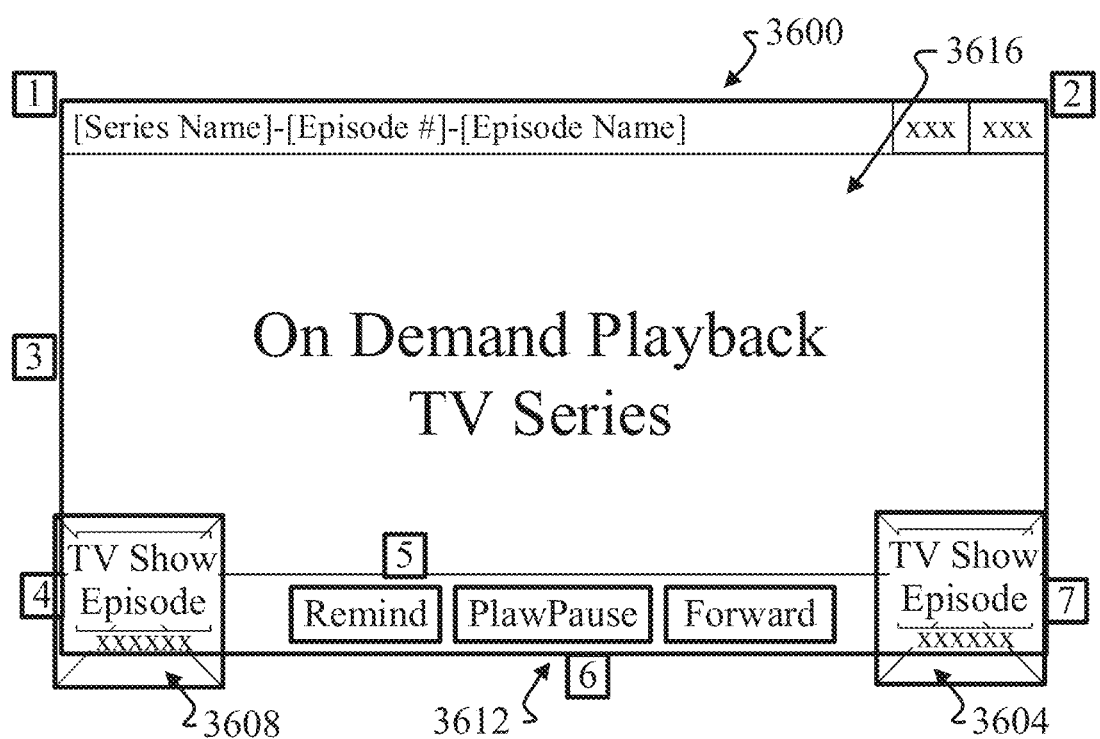
FIG. 36 is a view of an embodiment of a user interface for an Intelligent TV.

The playback control(s) 3612 may be in a footer, as shown in FIG. 36. A first user-selectable item 3608 for navigating to a previous episode may be provided to the left of the playback controls 3612 in the footer. A second user-selectable item 3604, for navigating to a next episode, may be provided to a right of the playback control(s) 3612 in the footer. The playback control(s) 3612 can include selections to rewind the content, forward the content, play the content, and pause the content. Other controls are possible and envisioned.

Figure 40:
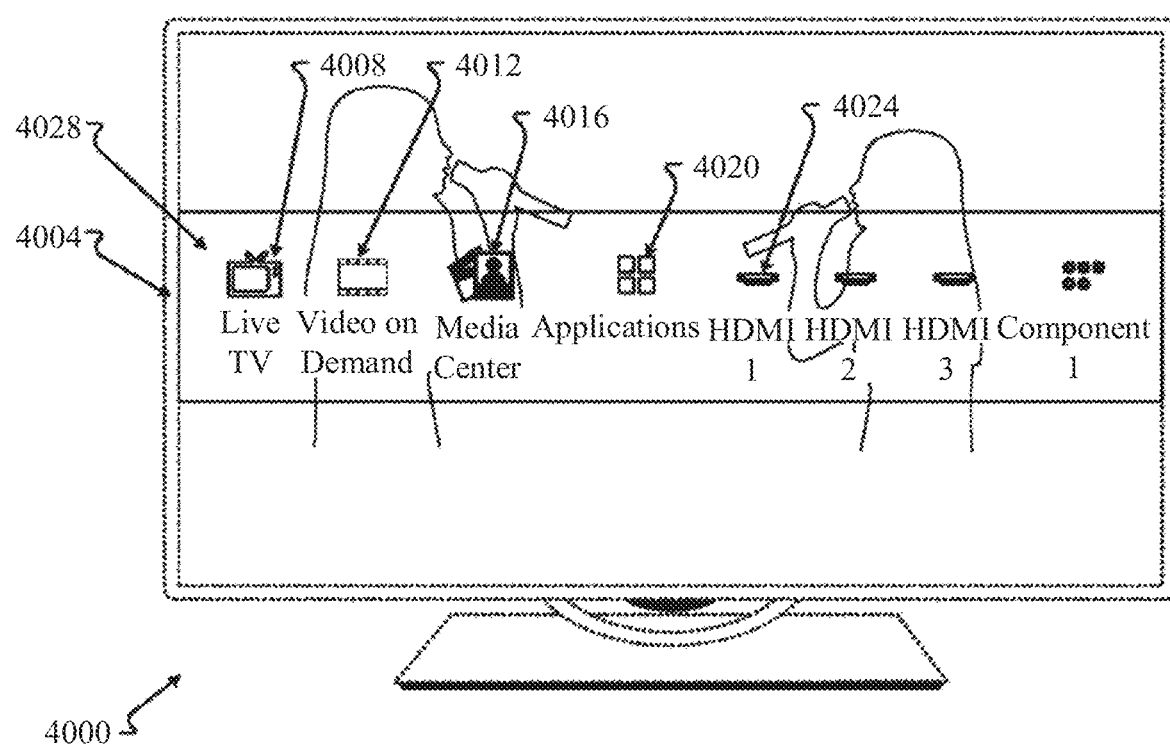
FIG. 40 is a visual representation of an embodiment of a user interface for a content/silo selector.

An embodiment of a visual representation 4000 of the silos is shown in FIG. 40. This visual representation 4000 includes a content source list 4004. The content source list 4004 can include representations of one or more silos 4008 through 4024. A silo, as used herein, can refer to the logical representation of one or more content sources. A content source can include input sources and/or content applications/premier applications. A content application silo, as described herein, can include any type of application or system that provides media content or entertainment content but is not necessarily associated with a device or other input that is connected to the TV through a port or other electrical connection. An input source can be any type of device or other storage mechanism that may be connected to the television 100 through an input port or other electrical connection. For example, devices 168 are input sources.

The content source list 4004 can include two or more icons 4008 through 4024 that represent different silos. For example, icons 4008 through 4020 can represent content application silos. The different content application silos can include a Live TV silo represented by icon 4008. The Live TV silo is a logical representation of a broadcast television signal application that provides television content to the user of the TV 100. A video on demand (VOD) silo is represented by icon 4012. VOD silo provides access to videos or other types of media that can be selected and presented to the user on an as-needed basis. For example, the VoD silo can be the VoD application as described in FIG. 44. A media center silo may be represented by icon 4016. The media center silo can include an application that provides user developed or stored pictures and/or movies. The media center provides a way for the user to store their media with the TV 100. An application silo is represented by icon 4020. An application silo provides for applications, such as, games and other user applications that may be accessed and used on the television.

One or more input sources might be represented by the type of port or other connection that is used to connect a device or content source to the television 100. For example, input source silo HDMI 1 is represented by icon 4024 that indicates that the input source is connected to the television 100 through an HDMI connection. Other types of icons and connections are possible for the input sources and may be represented in the silo selection or content source selection interface 4004.

To select a silo, a user may operate the remote control 700 to move a focus box 4028 onto an icon or user interface item or element. Upon moving the box 4028, the user may select another button on the remote control 700, for example a select or OK button 764, to select that silo. Upon selecting the silo, the user may be provided content associated with the silo. Alternatively, the user may move the focus box 4028 over a silo icon 4008-4024 and maintain the focus box 4028 over the area for some predetermined amount of time. After the predetermined amount of time, the silo may be automatically selected by the television 100, and the silo information may be provided to the user.

Figure 41A:
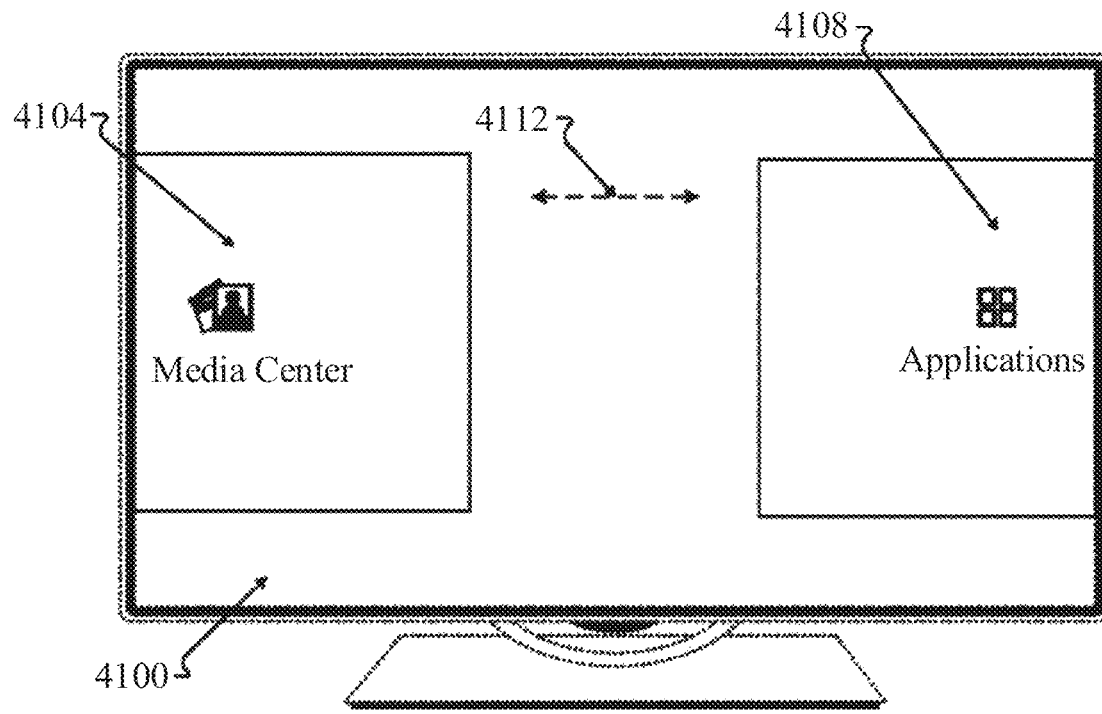
FIG. 41A is a visual representation of an embodiment of a user interface that demonstrates a transition or change between silos.
Figure 41B:
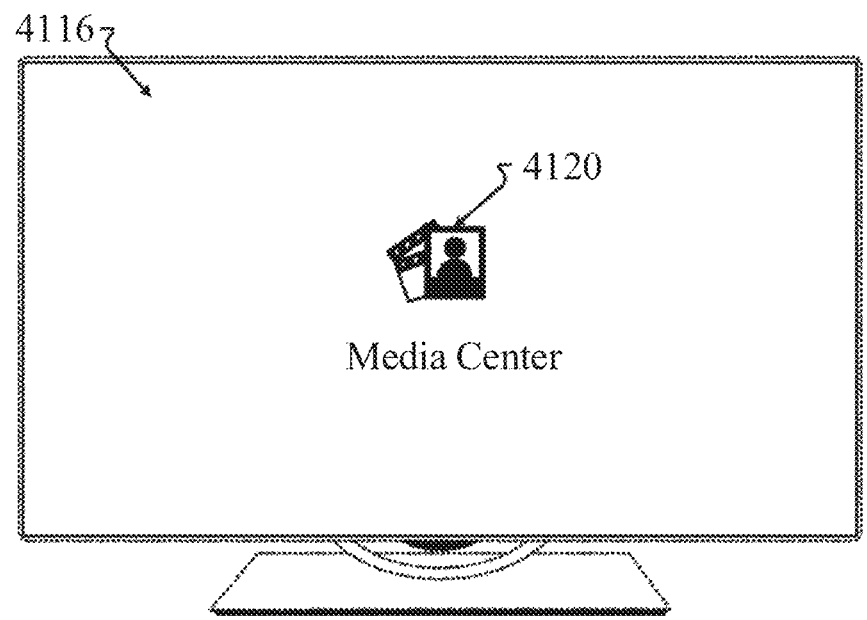
FIG. 41B is a visual representation of an embodiment of a user interface presented at the conclusion of a silo change.

An embodiment of the user interface selection process 4100 is shown in FIGS. 41A and 41B. When the user selects a silo, as described in conjunction with FIG. 40, the television 100 may present a user interface interaction 4100 where the silo is shown as moving from one silo to the next. The silos are presented similarly or logically as shown in FIG. 40. The content application silos may be ordered and presented to the left in a filmstrip that moves from left to right, as represented by arrow 4112. Input source silos may be to the right, in the filmstrip, and may be ordered based on the type of input connection. Thus, when the user selects a silo, the silos may appear to move left or right based on the selection and the current silo being vacated.

As shown in FIG. 41, a user may have been watching media (such as live TV) and had the media related silo selected. Then, the user may request the applications silo 4020. Upon selecting the application silo 4020, the television 100 can provide a display where "slide" 4104 is shown moving from right to left across the screen until the application "slide" 4108 is presented. The movement of the slides is represented by arrow 4112. This user interface 4100 interaction provides a visual indication of movement between silos and enforces the logical representation of content being provided in the silos and the logical order of those silos as is shown in FIG. 40.

Upon reaching the selected silo, an icon or user interface device 4120 may be provided in the interface 4116, as shown in FIG. 41B. The icon 4120 indicates which silo has been selected and may be presented on the screen for a predetermined amount of time before the content is provided from that silo. The icons may each have a particular meaning and be easily identified by the user. For example, icon 4120 is the icon associated with the media silo and is the same as the icon 4016 shown in FIG. 40. Each of the icons 4008 through 4024 may be used on the slides as presented in FIGS. 41A and 41B. These continual and persistent visual representations of the silos ensure the user understands the logical arrangement of the silos and can understand the movement that is occurring on the display when different silos are selected.

Figure 42:
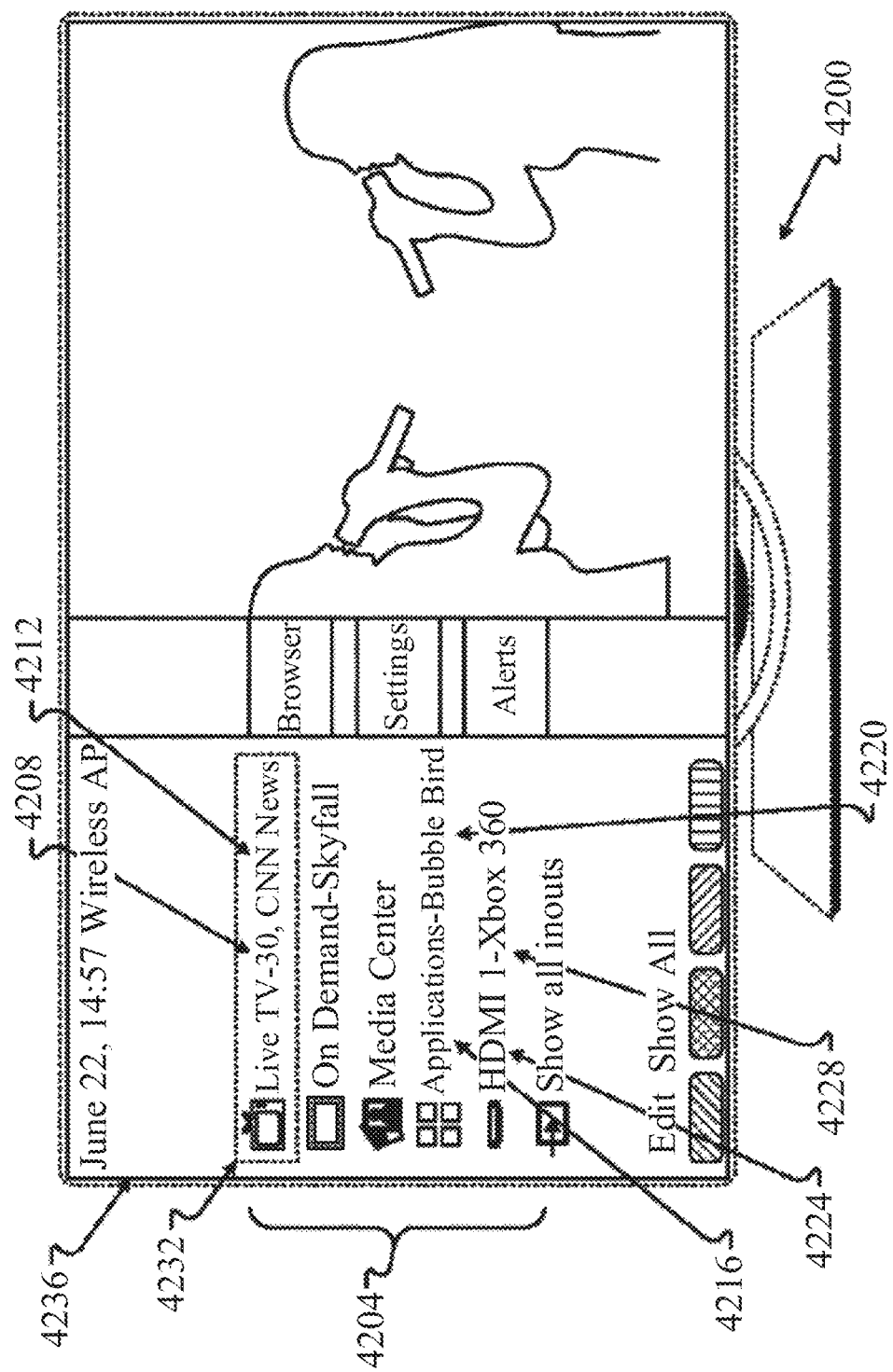
FIG. 42 is a visual representation of an embodiment of a global panel providing access to the silos.

Another embodiment of the television interface 4200 is shown in FIG. 42. In this example, a global panel 4236 can provide for a representation of the silos 4204 in a different orientation but a similar order. For example, the Live TV application is represented by the Live TV display information 4208 at the top of the list of silos 4204. Similarly, an information display 4212 for the on demand silo is presented after, or below in this case, the Live TV information line 4208. The other content application silos for media center 4216 and applications 4224 are shown below the first two content application silos.

A representation of an input source 4224 is shown on a line associated with the HDMI input. In this case, the silos are provided in a similar order as FIG. 40 but oriented from top to bottom. The silo information may also present other information, such as the current state of the silo, in the information line. For example, the information line 4208 shows that the Live TV application is currently displaying channel 30, CNN news. Further, a selection line 4228 can provide for other inputs, which may include the other input sources not currently shown in the global panel 4236. The user may move the focus box 4232 onto one of the lines 4208 through 4228. Upon moving the focus and either selecting another button or user interface selection item or loitering the focus box 4232 for a predetermined amount of time over the silo information line, the user can select that silo from the global panel 4236.

Figure 43:
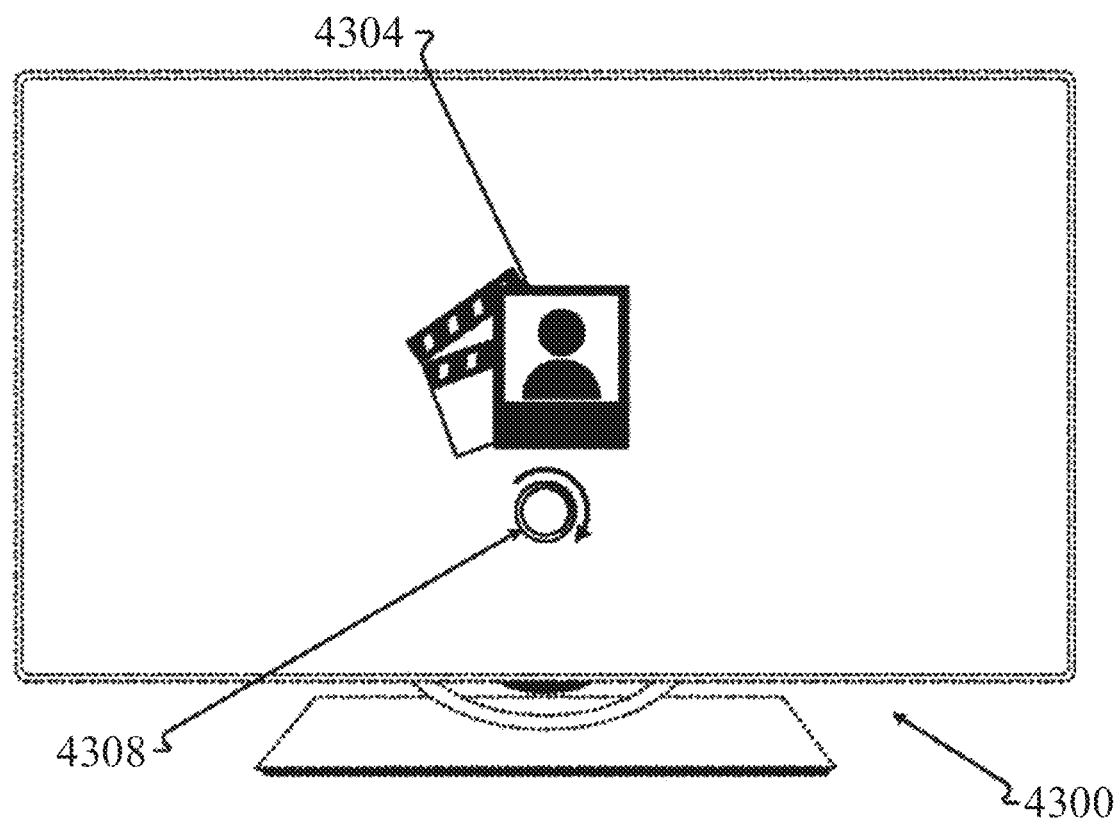
FIG. 43 is a visual representation of an embodiment of a user interface presented when a content application is starting.

A content application silo can include representations for a first time experience (FTE). The FTE representations present the application in a first start up and include a series of user interfaces for the user to begin using the content application silo. For example, if a user begins an application and the application was not currently running or is restarted, a user interface 4300 may be presented to the user, as shown in FIG. 43. The user interface 4300 can include an icon 4304 that represents the application being executed. In this case, the icon for the media center 4304 is shown in user interface 4300. Further, an indication to the user that the content application silo is starting or is being executed is represented by a user interface device 4308, which demonstrates that the content is loading by rotating a revolving wheel.

Figure 44A:
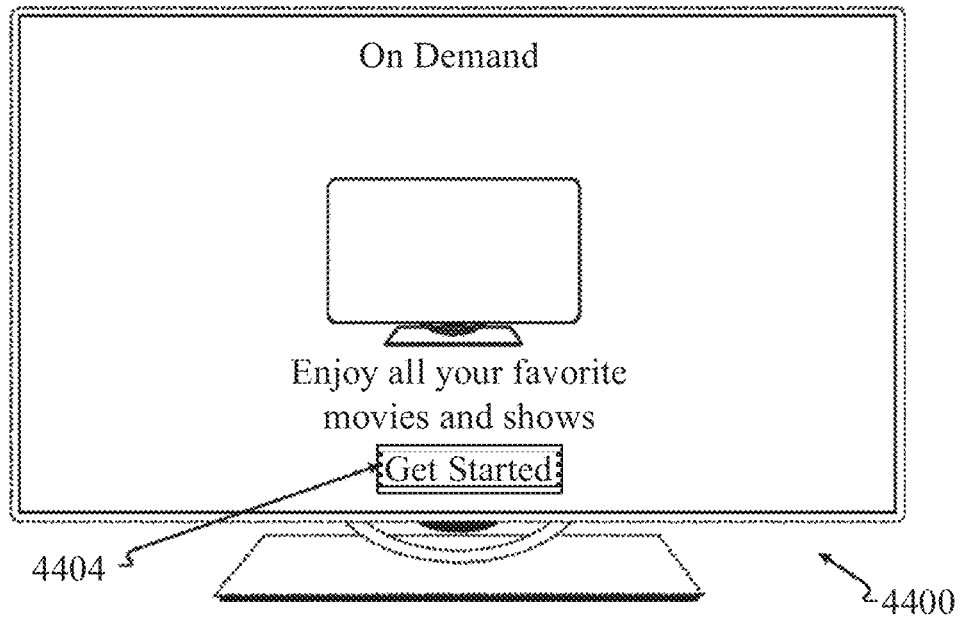
FIG. 44A is a visual representation of an embodiment of a user interface that is presented when a silo is in a first time experience state.

Upon starting the content application silo, the user may be presented with one or more different user interfaces associated with the type of silo. The user interfaces indicate that the silo is conducting or needs to conduct some initial operation to begin providing content. For example, a first user interface 4400 is shown in FIG. 44A. The user interface 4400 for the VOD application silo requires that the user select a "Get Started" icon or button 4404 to initiate the VOD application. Upon using the remote control 700 to move the focus to the "Get Started" icon or button 4404, the user can select the "Get Started" icon or button 4404 to have the television 100 locate and present the VOD sources and/or content to the user.

Figure 44B:
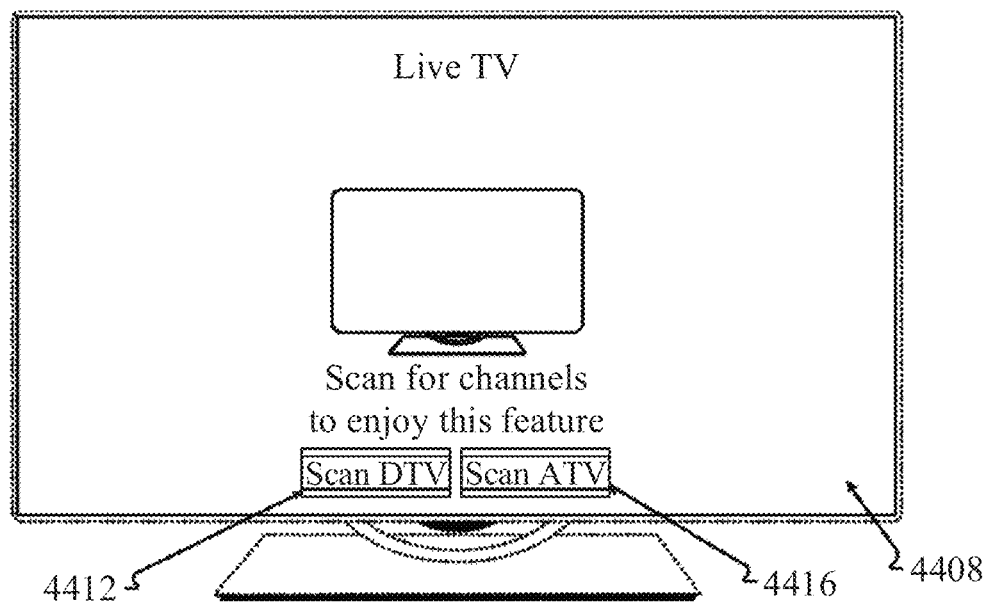
FIG. 44B is a visual representation of another embodiment of a user interface that is presented when a silo is in a first time experience state.

Similarly, a first time experience user interface 4408 for the Live TV application is shown in FIG. 44B. In this example, two buttons 4412 and 4416 can be presented to the user. The button 4412, when selected by the user, requires the TV 100 to scan digital TV signals to determine which channels or content sources are available for the Live TV application. Similarly, if the user selects button 4416, the television 100 scans analog TV signals to determine the channels that may be available for the Live TV application.

Figure 44C:
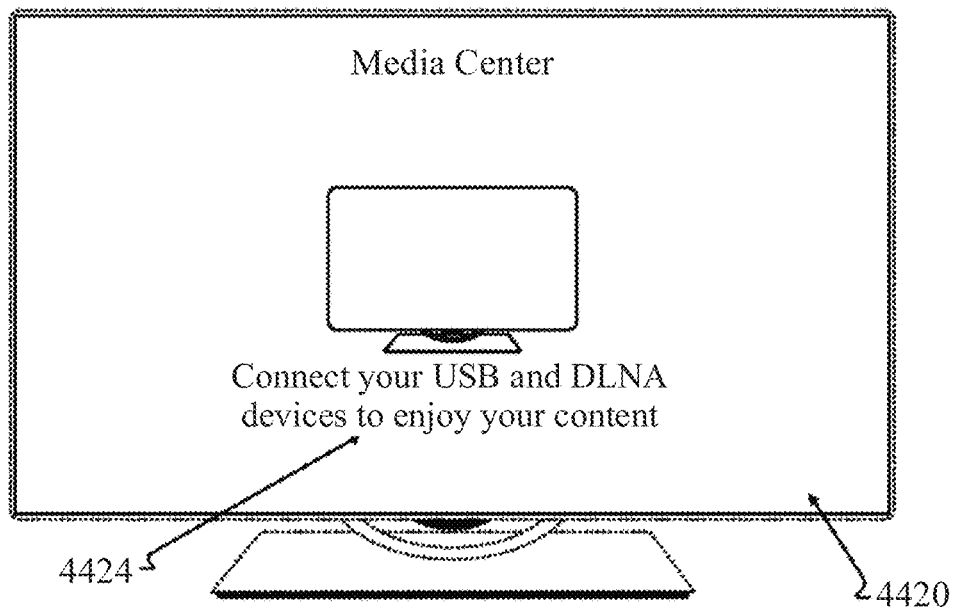
FIG. 44C is a visual representation of another embodiment of a user interface that is presented when a silo is in a first time experience state.

A first time experience user interface 4420 for the media center is presented in FIG. 44C. In this example, there is no icon or other button to select but rather a presentation of information 4424 in the user interface 4420. The presentation of information 4424 requests that the user connects any type of devices to the television 100 or a network that may be associated with the television 100 for the television 100 to extract media, such as pictures and videos, either stored by or created by the user. Once the devices are scanned, the media center may store or create a logical database for the content that may be presented through the media center silo.

Figure 45A:
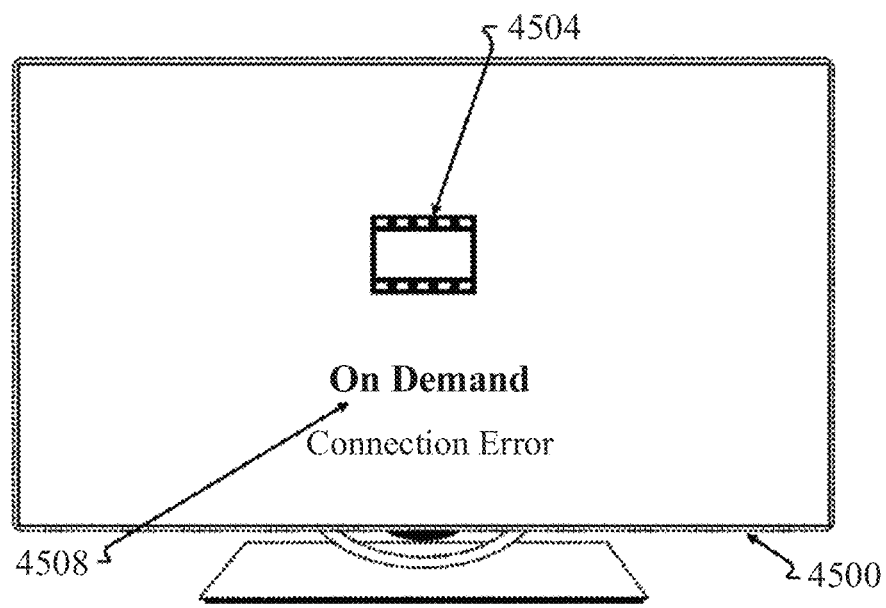
FIG. 45A is a visual representation of an embodiment of a user interface that is presented when a silo is in an error state.

During the live cycle of the silo, the silo may include one or more different states that may be different from the normal operating state of the silo. If the silo enters a state not indicative of a normal operating state, the user interface may present information to the user to indicate the different state. For example, one or more different states for different silos are shown in FIGS. 45A through 45D. For example, a user interface display 4500 is shown in FIG. 45A. The user interface 4500 presents an icon 4504 associated with the silo, in this case, a VOD icon, and provides information that indicates a different state than the normal operating conditions exists. This information 4508 indicates that there is a connection error and the VOD sources cannot be accessed. As such, the user is presented with information about how the silo is operating during the silo's life cycle if that silo is not in a normal operating condition.

Figure 45B:
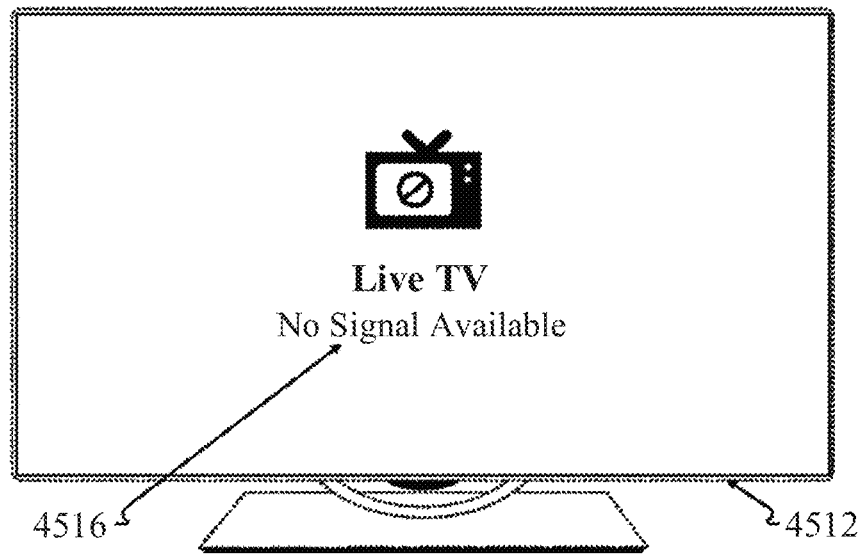
FIG. 45B is a visual representation of another embodiment of a user interface that is presented when a silo is in an error state.

User interface 4512 is presented in FIG. 45B and provides an icon and information 4516 for the Live TV application. In this example, the Live TV application has no signal and is shown with information 4516 on a television screen 304 to indicate this abnormal operation for the Live TV application silo. A "no signal" condition may occur if the content broadcast signal from a satellite, cable box, or antenna is not being received by the television 100. This information 4516 allows the user to understand that the Live TV application is not operating within normal parameters.

Figure 45C:
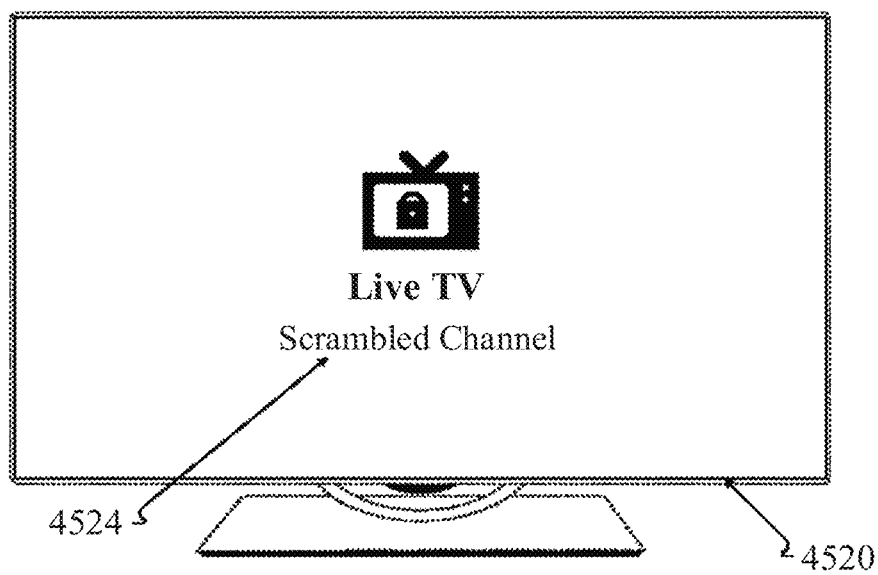
FIG. 45C is a visual representation of another embodiment of a user interface that is presented when a silo is in an error state.

The user interface 4520 is presented to the user with information 4524 for the Live TV application, as shown in FIG. 45C. In this example, the Live TV application has been changed to a channel that provides scrambled content. A scrambled television signal can be a signal that is not provided to this particular user based on their access to content in the Live TV application. For example, a pay for view service, such as HBO or Showtime, may not be provided if the user has not paid for access to those channels or content providers. As such, the Live TV application receives a scrambled channel or scrambled signal for those content sources and the information 4524 may be presented to the user, with the user interface 4520, indicating that content has been scrambled.

Figure 45D:
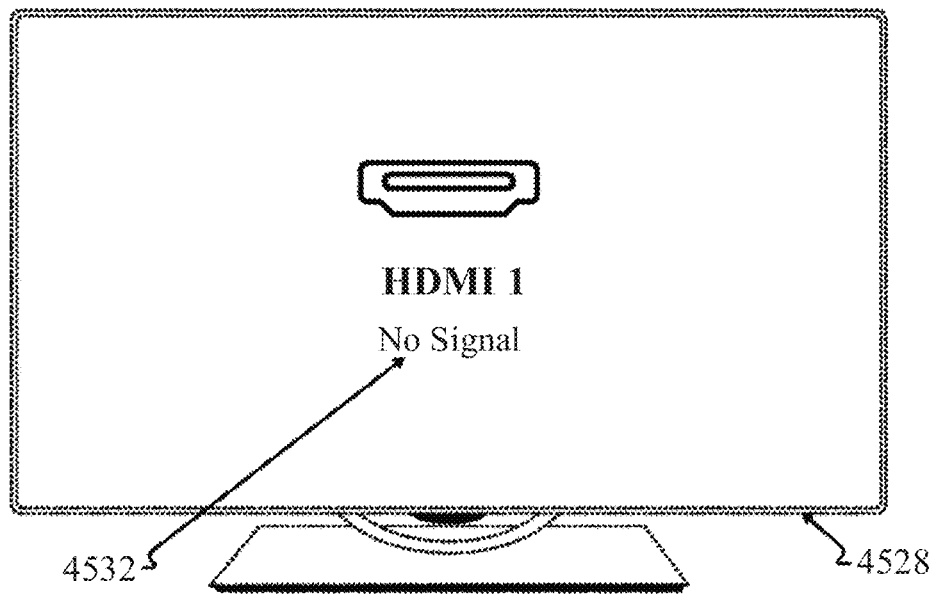
FIG. 45D is a visual representation of another embodiment of a user interface that is presented when a silo is in an error state.

Similar types of life cycle indications may also be presented for input sources. For example, user interface 4528 may be presented to a user, as shown in FIG. 45D. User interface 4528 indicates, with information 4532, that there is no signal coming from an HDMI 1 port. For example, if no device is connected to HDMI 1, the TV 100 can indicate that there is no signal being received at the HDMI 1 port. As such, the user can determine that the operation of any device that should be connected to the HDMI 1 port is not operating correctly.

Figure 46:
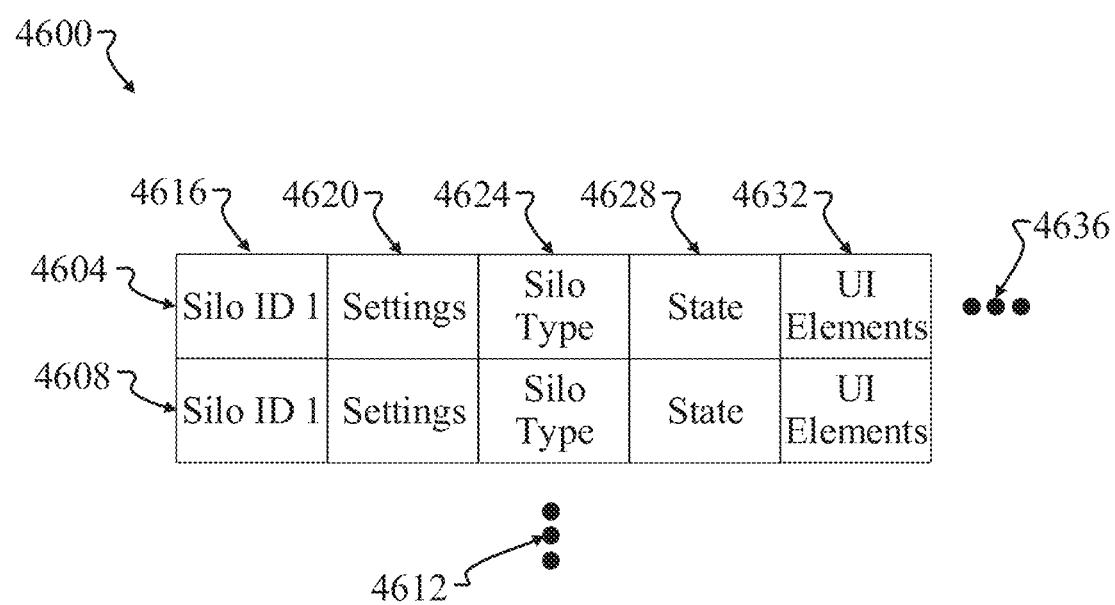
FIG. 46 is a block diagram of an embodiment of a data structure for storing information or data associated with the silos.

As the silos are logical representations of content sources, the logical representations can have one more items of data associated therewith. For example, a data structure 4600 may be created for the silos, as shown in FIG. 46. The data structure 4600 can include information for each silo represented herein as one or more rows 4604 and 4608. Each row 4604, 4608 can be associated with a different silo. For example, row 4604 may be associated with the Live TV application, while row 4608 is associated with the VOD application. There may be more or fewer rows than those shown in FIG. 46 as represented by ellipsis 4612. Thus, each silo may have a different set of data associated therewith. Each row 4604, 4608 may include one or more items of data.

Row 4604 can include one or more of, but is not limited to, five different types of data that are associated with the silo. For example, the silo may have a silo identifier stored in portion 4616, one or more settings stored in portion 4620, a silo type identifier stored in portion 4624, one or more states stored in portion 4628, and/or one or more user interface (UI) elements associated with the silo stored in portion 4632. There may be more or fewer portions of data stored with the row 4604, as represented in with ellipsis 4636.

A silo identifier 4616 can include any type of identifier such as a numeric, alphanumeric, globally unique identifier (GUID), or other types of identifiers that uniquely identify the silo in contrast to all other silos associated with the television 100. The silo identifier 4616 is used to associate the silo with the different data stored in row 4604.

A settings portion 4620 can store one or more settings that are associated with the silo. Settings 4620 can include one or more of, but is not limited to, what type of user display is presented for the application or input source, what time settings are used for different user interface interactions, where one or more content sources that are associated with the application or input source are to be found or addressed, and other types of settings that may be used by the user to customize their interaction with the television 100.

The silo type 4624 can include at least some type of identifier indicating what type of silo is associated with row 4604. The silo type can include whether or not the silo is a content application silo or input source. Alternatively or additionally, the silo type 4624 can include any type of information that uniquely identifies or configures the silo for the user. For example, the silo type 4624 can include Live TV, Application Center, Media Center, VOD, Input Source, etc.

A state portion 4628 can indicate the current or past state of the silo. For example, the Live TV information line 4208 indicated the current state of the Live TV silo is "channel 30 CNN news." This state information may be used to return the silo to the silo's past state if switching from and then back to the silo during a user interface interaction. The state information may be persistent and allow the silo to return to a past state even if the television 100 is powered off.

One or more user interface elements 4602 may be associated with the silo. For example, each silo may have one or more unique icons that are displayed by the television during user interface interactions. Further, some of these user interface elements may be associated with the state 4628 or current condition of the silo. For example, if the Live TV is in a state where it is displaying CNN news, as explained above, the user interface elements may store a screen snapshot of CNN in the user interface elements 4632. Thus, as the user moves between silos, the snapshot of CNN news may be presented while moving between silos. Thus, the information associated with the user interface elements 4632 provides a richer and more contextual indication of what is occurring with the Intelligent TV compared to if just simple icons are being presented.

Figure 47:
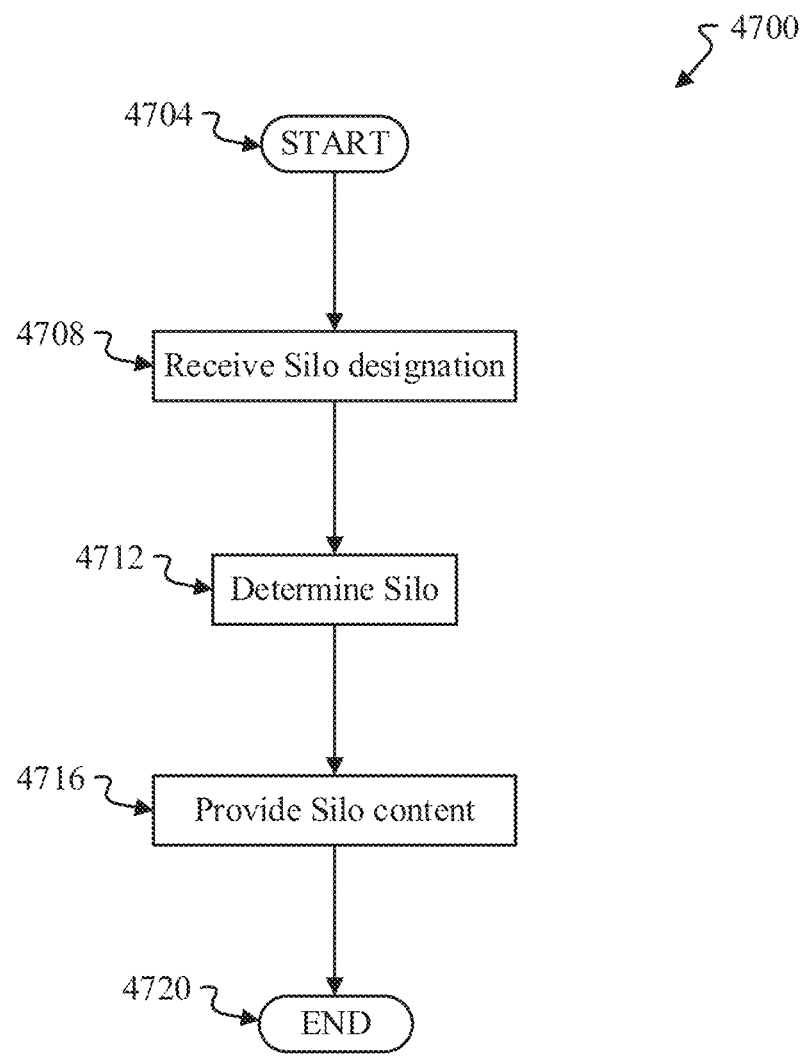
FIG. 47 is a process diagram of an embodiment of a method for providing silo content.

An embodiment of a method 4700 for presenting silo content is shown in FIG. 47. Generally, the method 4700 can begin with a start operation 4704 and terminate with an end operation 4720. While a general order for the steps of the method 4700 are shown in FIG. 47, the method 4700 can include more or fewer steps or the order of the steps may be arranged differently than the method 4700 shown in FIG. 47. The method 4700 can be a set of computer-executable instructions executed by a computer system or processor, encoded or stored on a computer readable medium, or embodied as circuits in an Application Specific Integrated Circuit (ASIC) or a Field Programmable Gate Array (FPGA) that executes the method. Hereinafter, the method 4700 shall be explained with reference to the systems, components, modules, data structures, user interfaces, etc. described in conjunction with FIGS. 1-20.

The Intelligent TV 100 may receive a silo designation, in step 4708. The silo designation may be a user interface input via the remote control buttons 728-740 or into a user interface associated with the Intelligent TV 100. For example, the user may select a silo button 728-740 on the remote control 700 to indicate a desired silo to access. In another example, the user may move the focus box 4428 to a different icon 4008 through 4024 to select a silo on user interface 4004.

The Intelligent TV 100 receives the signal through the user interface interaction. From the signal and the associated user interface or other environmental considerations, the Intelligent TV 100 can determine which silo was designated, in step 4712. Thus, the Intelligent TV 100 can determine the silo desired by the user and present a user interface interaction that shows that the silo has been selected. For example, the user interface may show movement to the silo as indicated in FIG. 41A. Upon the silo that is selected being displayed, the user interface 4116 is presented with icon 4120 showing that the silo, as determined by the Intelligent TV 100, is being provided to the user. The icon 4120 may be provided for predetermined amount of time to indicate the silo selected, without the content of the silo being displayed.

After the user interface selection process is completed, the Intelligent TV 100 can provide the silo content, in step 4716. The silo content can include presenting a Live TV signal, presenting a menu for selecting a VOD or providing the last video displayed in the VOD application, presenting one or more pictures or menu to select pictures in the media center, presenting a menu or previously executed applications in the application silo, or presenting other types of silo content. Thus, the user can interact with the TV 100 in a logical and contextual interaction based on the silos and the content the silos represent.

Figure 48:
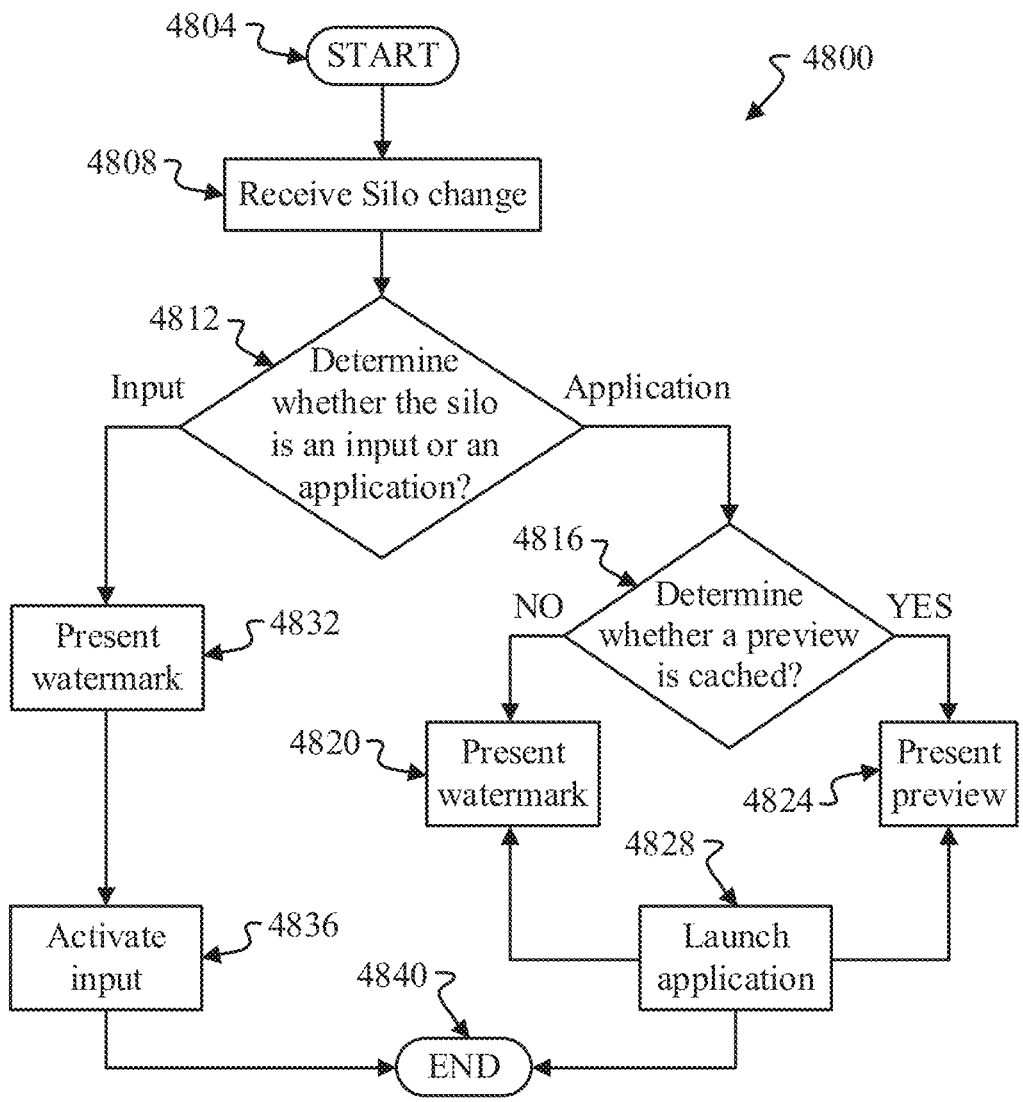
FIG. 48 is a process diagram of an embodiment of a method for managing the life cycle of a silo.

An embodiment of a method 4800 for completing an application life cycle change is shown in FIG. 48. Generally, the method 4800 begins with a start operation 4804 and terminates with an end operation 4820. While a general order for the steps of the method 4800 are shown in FIG. 48, the method 4800 can include more or fewer steps or the order of the steps may be arranged differently than the method 4800 shown in FIG. 48. The method 4800 can be a set of computer-executable instructions executed by a computer system or processor, encoded or stored on a computer readable medium, or embodied as circuits in an Application Specific Integrated Circuit (ASIC) or a Field Programmable Gate Array (FPGA) that executes the method. Hereinafter, the method 4800 shall be explained with reference to the systems, components, modules, data structures, user interfaces, etc. described in conjunction with FIGS. 1-21.

A driver 420 can receive an input from a remote control 700 for silo change, in step 4808. The change can include a selection, from a user interface 4004 or 4204, or selection of a button 728-740 on a remote control 700 that may select a different silo or may be a directional selection on a D-pad 760 to move through one or more silos. The received signal is transferred to the input event dispatcher 508. The input event dispatcher 508 determines from the information from the driver 420 that the signal requests a silo change and passes the signal and any associated information to the silo manager 532. The silo manager 532 may then determine whether the silo desired is an input source or an application, in step 4812. If the desired silo is an application, the method 4800 can go to step 4816. However, if the silo desired is an input source, the method 4800 can go to step 4832.

In step 4816, the silo manager 532 can determine whether there is a preview cached for the particular silo. The silo manager 532 can access the data structure 2000, which may be stored within the data storage 312. The silo manager 532 can access the portion 2032 to determine if there is a UI element stored for the silo manager 532. If there is a UI element in the UI elements portion 2032, the silo manager 532 may read that or retrieve that preview (or thumbnail) from portion of 2032. In other embodiments, the UI elements portion 2032 may include a pointer to a thumbnail stored in a thumbnails database 668. In this situation, the silo manager 532 may send a request to the thumbnail cache manager 660 to retrieve the thumbnail from the thumbnails database 668 and return the information to the silo manager 532. If there is a preview cached, then the method 4800 can go to step 4824. However, if there is no preview cached the method can go to step 4820.

In step 4824, the silo manager 532 returns the cached thumbnail or preview UI to the silo transition controller 504. The silo transition controller 504 conducts a silo transition as described in conjunction with FIGS. 41A and 41B using the preview rather than the icon described in FIG. 41B. If there is no preview cached, the silo manager 532 sends the information to the silo transition controller 504 to present the silo transition using a watermark, in step 4820. Thus, the transition occurs as described in FIGS. 41A and 41B with the icons as described therein. Upon transitioning to the different silo, the silo manager 532 can send a signal to the application 422 to launch the application selected, in step 4828.

If an input source is selected, the silo manager 532 may present an icon from the database 2000 as a watermark in a slide transition shown in FIGS. 41A and 41B. The watermark and information can be provided the transition controller 504 to present the watermark, in step 4832. Upon activating the transition, the silo manager 532 may send information to a driver 402 or 420 or other part of the OS 404 to send a signal to the input source to activate, in step 4836. Thus, the driver 420 may trigger the device or other connection connected to the port to begin executing or operating.

Figure 49:
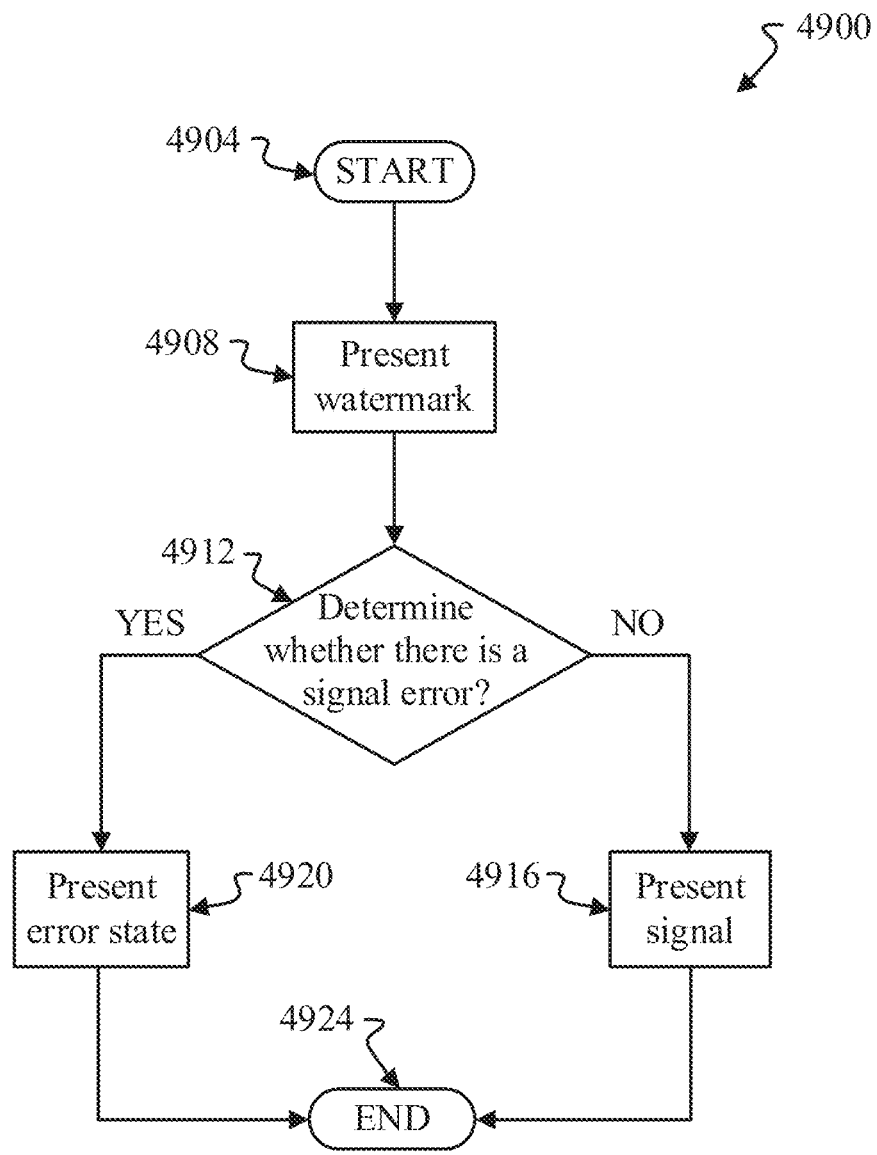
FIG. 49 is a process diagram of an embodiment of a method for managing an error state associated with a silo.

An embodiment of a method 4900 for presenting an application or input source life cycle is shown in FIG. 49. Generally, the method 4900 begins with a start operation 4904 and terminates with an end operation 4924. While a general order for the steps of the method 4900 are shown in FIG. 49, the method 4900 can include more or fewer steps or the order of the steps may be arranged differently than the method 4900 shown in FIG. 49. The method 4900 can be a set of computer-executable instructions executed by a computer system or processor, encoded or stored on a computer readable medium, or embodied as circuits in an Application Specific Integrated Circuit (ASIC) or a Field Programmable Gate Array (FPGA) that executes the method. Hereinafter, the method 4900 shall be explained with reference to the systems, components, modules, data structures, user interfaces, etc. described in conjunction with FIGS. 1-13 and FIGS. 40-48.

After a silo transition, as described in conjunction with FIG. 42 and FIG. 48, the silo manager 532 may send information to the silo transition controller 504 to present a watermark, as shown in FIG. 5B, in step 4908. This watermark may be presented for a predetermined amount of time, for example, three seconds, ten seconds, etc., to reflect that the silo transition has been made. During the time that the icon is displayed, the silo manager 532 can determine if there is an error with the signal being received from the application 416 or from the input source 168, in step 712. A determination of whether there is a signal error can be deduced by sending a request from the silo manager 532 to the OS 404 to determine if a signal is being received from the input source 168 or if the application 416 is currently running. The OS 404 may return a response to the silo manager 532. If there is a signal error, then method 4900 can go to YES to step 4920. If there is no signal error, then method 4900 can go to NO to step 4916.

In step 4916, the Intelligent TV 100 presents the signal, to the user, for the silo. Thus, the input source may send a signal, which is displayed by the Intelligent TV 100, or the application may execute providing content to the user. In step 4920, if there is an error state, an error state icon, as described in conjunction with FIGS. 45A through 45C, is provided to the user. The error signal may include information, such as, there is no signal being received or that the signal being received is scrambled and not able to be presented to the user. This information may be presented to the user to troubleshoot or to inform the user that the silo or content within the silo may not be presented to the user at this time.

Figure 50:
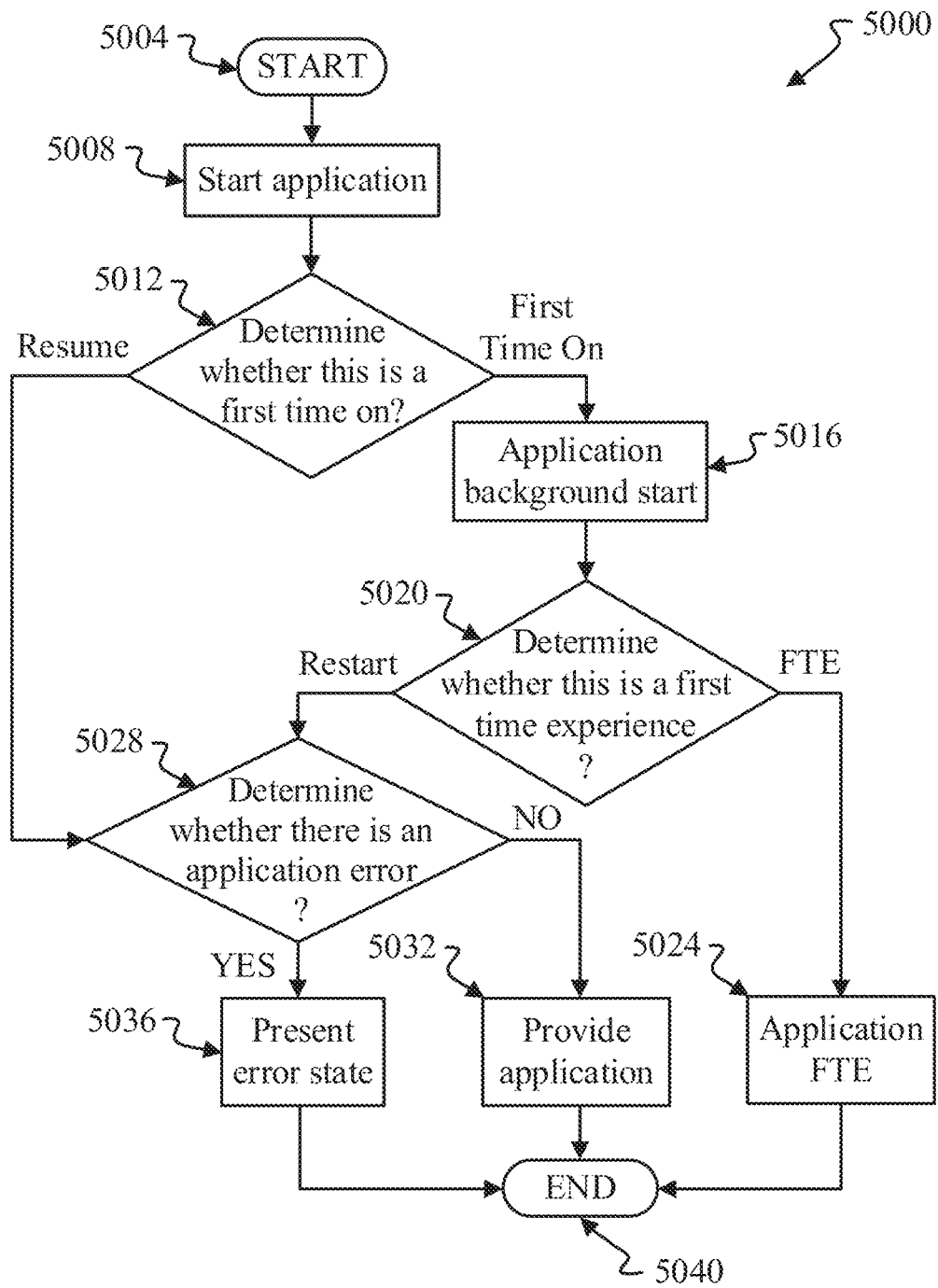
FIG. 50 is a process diagram of an embodiment of a method for managing a content application transition associated with a silo.

An embodiment of a method 5000 for an input activation workload as shown in FIG. 50. Generally, the method 5000 can begin with a start operation 5004 and terminate with an end operation 5040. While a general order for the steps of the method 5000 are shown in FIG. 50, the method 5000 can include more or fewer steps or the order of the steps may be arranged differently than the method 5000 shown in FIG. 50. The method 5000 can be a set of computer-executable instructions executed by a computer system or processor, encoded or stored on a computer readable medium, or embodied as circuits in an Application Specific Integrated Circuit (ASIC) or a Field Programmable Gate Array (FPGA) that executes the method. Hereinafter, the method 5000 shall be explained with reference to the systems, components, modules, data structures, user interfaces, etc. described in conjunction with FIGS. 1-13 and FIGS. 40-49.

An application may be started in step 5008. The driver 420 may receive an input signal from a remote control 720 or other user interface. This signal may be sent to the input event dispatcher 508, which can then send information to the appropriate application 416 to begin executing. The application selected, 452 through 464, may then determine whether this is a first time that the application has been executed, in step 5012. The application can determine whether or not the Intelligent TV 100 was shut down and there is no current state to present to the user. If this is not the first time that the application has been executed, the method 5000 proceeds through the resume arrow to step 5028. However, if this is the first time that the application has been executed, the method 5000 proceeds through the first time on arrow to step 5016.

In step 5016, the application 416 may begin a background start. While in the background start, the silo manager 532 may provide information to silo transition controller 504 to present the icon, as shown in FIG. 43, indicating the application is starting. While the application 416 is starting, the silo manager 532 may then determine whether this first time on workflow is a first time experience for the user. A first time experience may be deduced by information in the state portion 2028 of the database 2000. The silo manager 532 can read the information from the state portion 2028 to determine if a first time experience is required. If there is a first time experience required, then method 5000 proceeds through the FTE arrow to step 5024. However, if a first time experience is not necessary, then method 5000 proceeds through a restart arrow to step 5028.

In step 5024, the silo manager 532 may present information to the silo transition controller 504 to present one or more of the user interfaces 44 A through 44 C. The silo manager 532 may then wait for the user to select the user interface item presented in the FTE user interface to begin the first time experience. Once selected, the input event dispatcher 508 may send a signal to the application 416 to begin configuration. The information received during the configuration may then be stored in the database 2000 or with the application in data storage 312.

Either during the resume or restart, the silo manager 532 may determine whether the application is in an error state, in step 5028. As described in conjunction with FIG. 49, the silo manager 532 can determine, by sending a signal to the operating system 404, whether the application is currently not executing properly. The operating system 404 may send back the indication of whether the application is operating correctly to the silo manger 532. If the application is in an error state, then method 5000 proceeds YES to step 5036. However, if the application is not in an error state, the method 5000 proceeds NO to step 5032.

In step 5036, the silo manager 532 may present information to the silo transition controller 504 to present one or more of the user interfaces in 45 A through 45 C to the user interface for the user. These user interfaces indicate to the user that the application is in an error state and not running properly. In step 5032, after the silo manager 532 has instructed the silo transition controller 504 to complete the silo transition, a signal may be sent to the OS 404 to provide the application 416. Here, the application 416 may begin to execute on the Intelligent TV 100 for the user to receive content.

Figure 51:
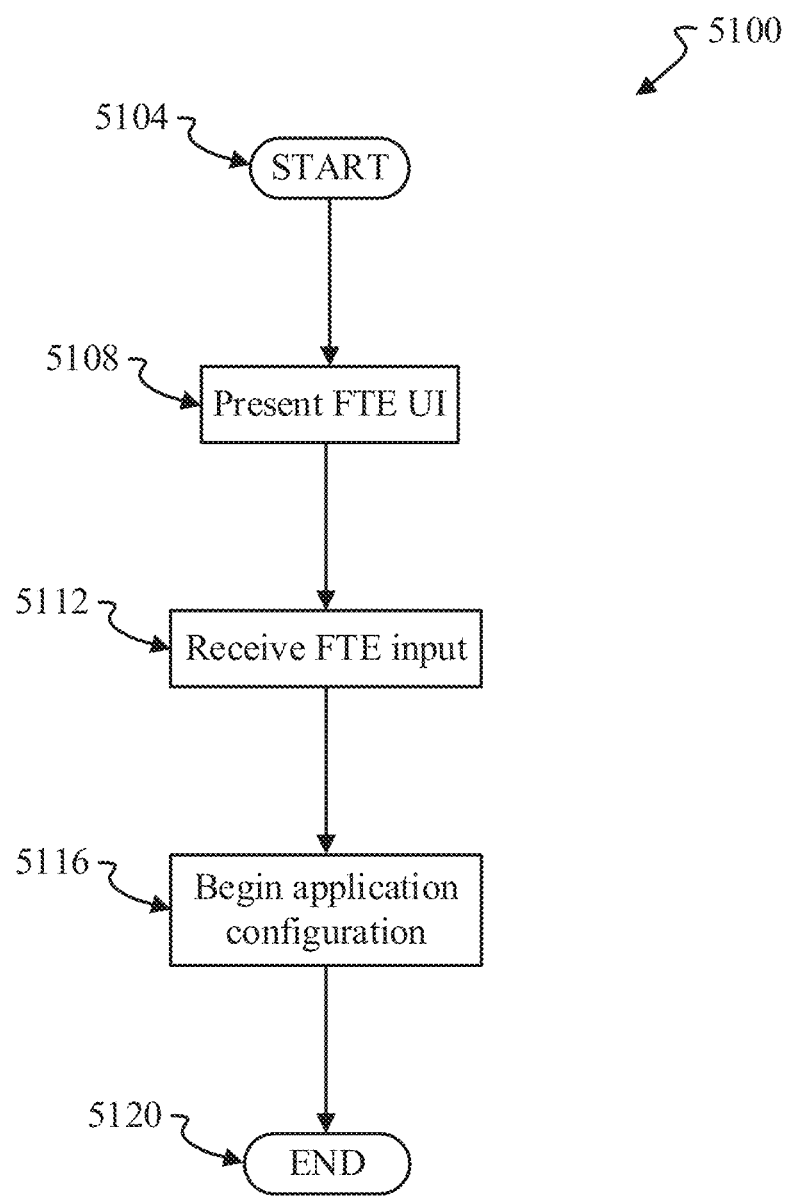
FIG. 51 is a process diagram of an embodiment of a method for managing a first time experience associated with a silo.

An embodiment of the method 5100 for providing a first time experience is shown in FIG. 51. Generally, the method 5100 can begin with a start operation 5104 and terminate with an end operation 5120. While a general order for the steps of the method 5100 are shown in FIG. 51, the method 5100 can include more or fewer steps or the order of the steps may be arranged differently than the method 5100 shown in FIG. 51. The method 5100 can be a set of computer-executable instructions executed by a computer system or processor, encoded or stored on a computer readable medium, or embodied as circuits in an Application Specific Integrated Circuit (ASIC) or a Field Programmable Gate Array (FPGA) that executes the method. Hereinafter, the method 5100 shall be explained with reference to the systems, components, modules, data structures, user interfaces, etc. described in conjunction with FIGS. 1-13 and FIGS. 40-50.

After completing the transition through the first time experience workflow, as described in FIG. 40, the silo transition controller 504 may present a first time experience user interface as shown in FIGS. 44A through 44C, in step 5108. Thus, the user, depending on the silo selected, may be provided one or more user interfaces that allow the user to begin the first time experience.

In some situations, the driver 420 can receive the selection of the user interface item, as an FTE input, in step 5112. The driver 420 may send a signal onto the operating system 404, which then may communicate with the application 416 to begin an application configuration process, in step 5116. The application 416 may then begin running a series of processes associated with the silo, such as scanning for channels, determining sources for videos or other on-demand content, or determining what devices may be connected or associated with the Intelligent TV 100. This first time experience, executed by the application 416, may then create data that is stored in the data structure 4600 for use after the first time experience. This information may include settings 4620 and state information 4628. This information is stored in data storage 312 and used by the Intelligent TV 100 to provide a content rich experience to the user.

Live TV application can support functions, such as channel changing, current channel information presentation, guide and channel discovery. The guide can include a mini EPG guide and full screen EPG, which can include channel number and logo, and program listing.

Figure 66:
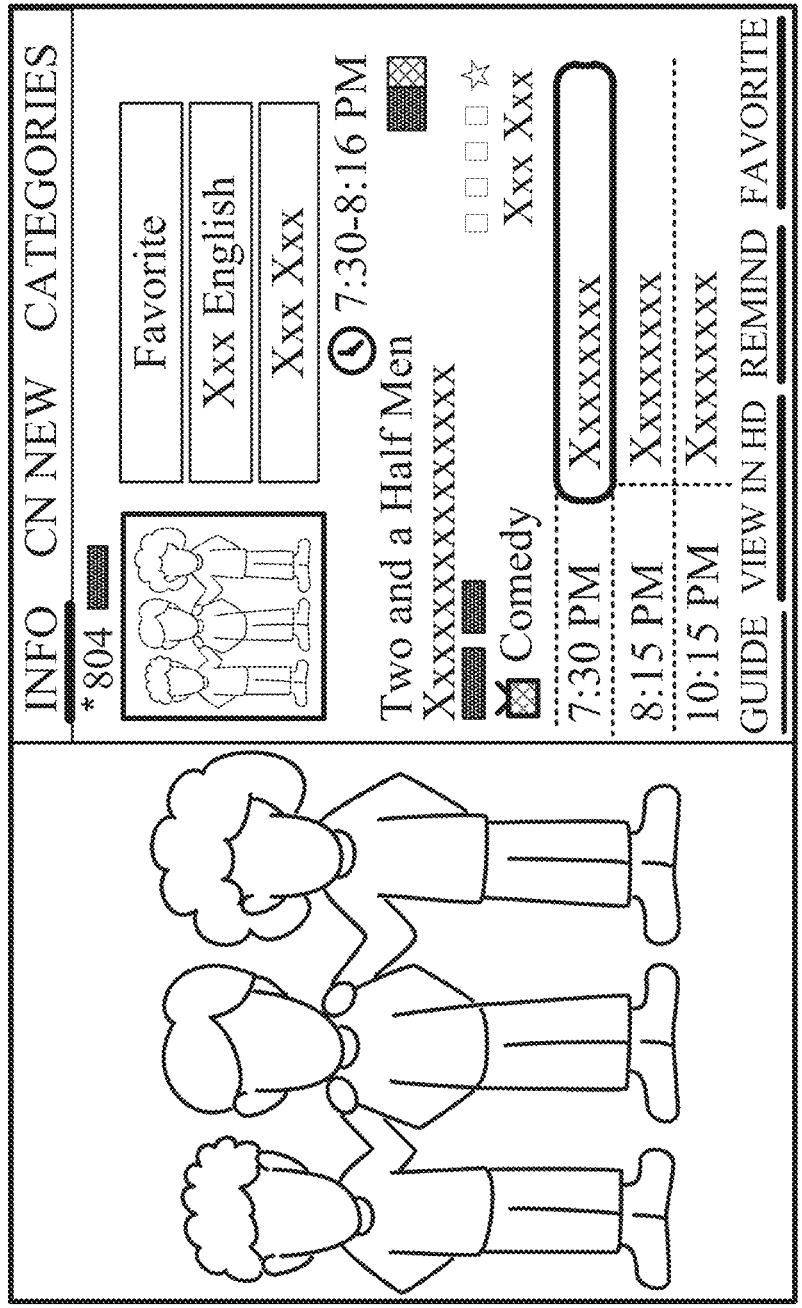
FIG. 66 shows an application panel according to some embodiments of the present disclosure.

In some embodiments, Live TV can provide an application panel, which may provide information about the program. The application panel can include one or more types of information user interfaces, for example, info panel, EPG panel, categories panel, favorite panel, search panel and so on, wherein info panel may comprise info for different kinds of media content, such as info panel for TV series episode, movies and sport event. FIG. 60, FIG. 61 and FIG. 66 show examples of the application panel. In FIG. 60, it shows one type of info panel, the bottom portion of the info panel comprises a hotkey legend, presenting a hotkey color indicator and a function associated with the hotkey. For example, the first hotkey, red hotkey, is associated with view in HD function, the second hotkey, yellow hotkey, is not associated with any function in this panel, the third hotkey, green hotkey, is associated with remind function, while the fourth hotkey, blue hotkey, is associated with favorite function. The view in HD function is only available if the current channel is SD and the same program is currently airing on an HD channel. Pressing the red hotkey will switch to that channel and dismiss the panel. The remind function can be enabled for mini EPG. And this will toggle a reminder on/off for the selected program. Favorite function may add/remove show to/from favorites, or add/remove channel to/from favorites. In FIG. 61, the application panel can comprise mini EPG interface. The mini EPG interface comprises channel number and logo and program listing, and a hotkey legend including one or more hotkey indicators. In this mini EPG interface, the first hokey, red hotkey, is associated with previous function, the second hotkey, yellow hotkey, is associated with next function. The other two hotkeys are associated with other functions.

Figure 62:
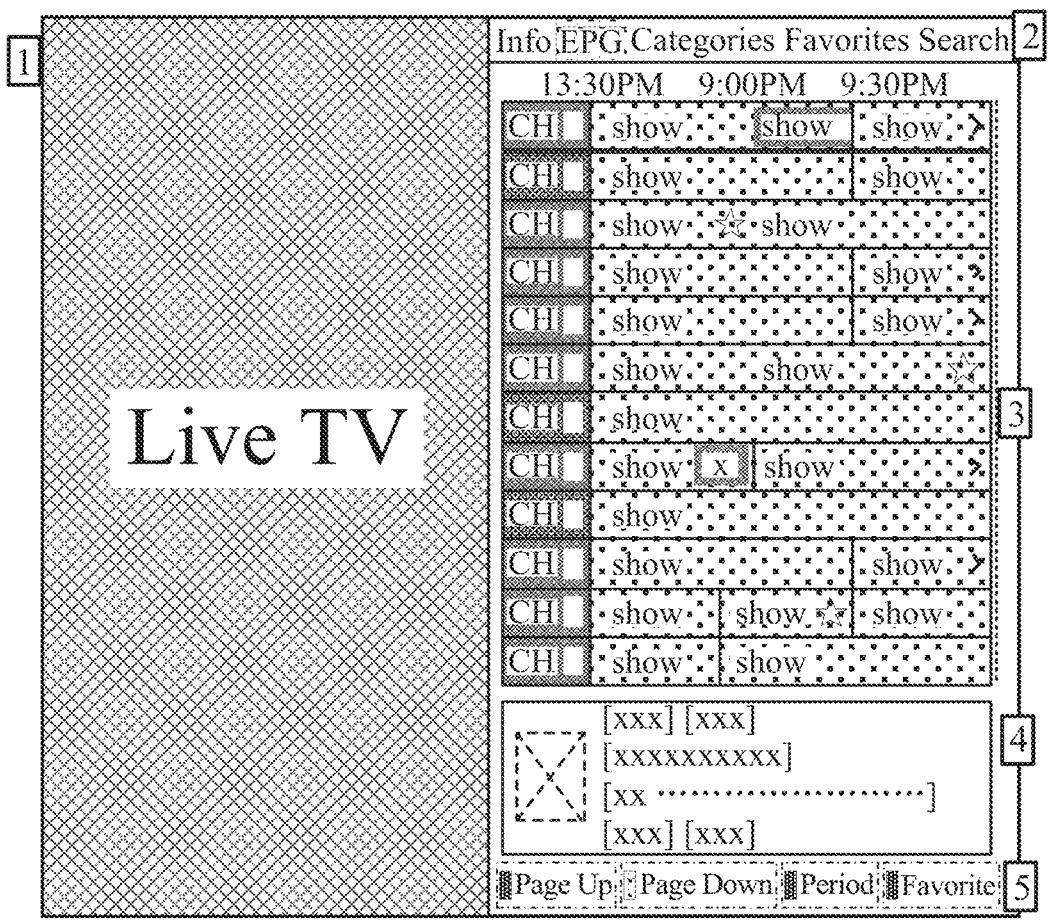
FIG. 62 shows an EPG panel according to some embodiments of the present disclosure.

In some other embodiments, for live TV application, the EPG panel can be presented in the form illustrated in FIG. 62. The EPG panel provides the user with a focused EPG of all the content that is available for the next two hours. The interface as shown includes an active view (1), a panel navigation bar with EPG selected (2), a channel based EPG (3), a program preview (4) and a hot key bar (5). In this page, the red hot key can scroll up one page of content, the yellow hot key can scroll down one page of content, the green hot key can toggle on/off of reminder for the selected program (specific to the highlighted listing), and the blue hot key can provide a modal with two choices, including add [show name] to favorites and add [channel #] to favorite channels, and if the item is already a favorite the message would be "remove from" instead of "add to".

In FIG. 66, the application panel can comprise a hotkey legend, which associate the hotkeys with functions such as guide, view in HD, remind and favorite functions. When the guide menu is selected, the application panel is dismissed and a full screen EPG is launched.

Figure 67:
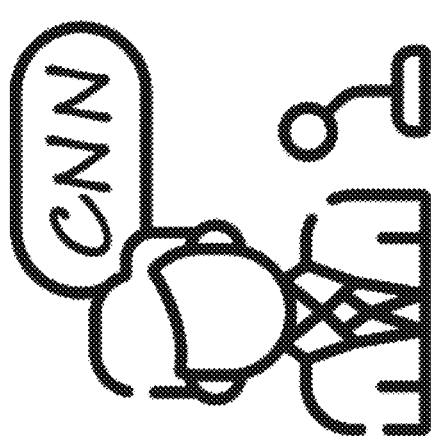
FIG. 67 shows a mini guide according to some embodiments of the present disclosure.

An example of mini guide is shown in FIG. 67. The mini guide interface comprise a hotkey legend, wherein a first hotkey is associated with guide function, the second hotkey is not associated with any function, the third hotkey is associated with remind function, the fourth hotkey is associated with favorite function.

Figure 68:
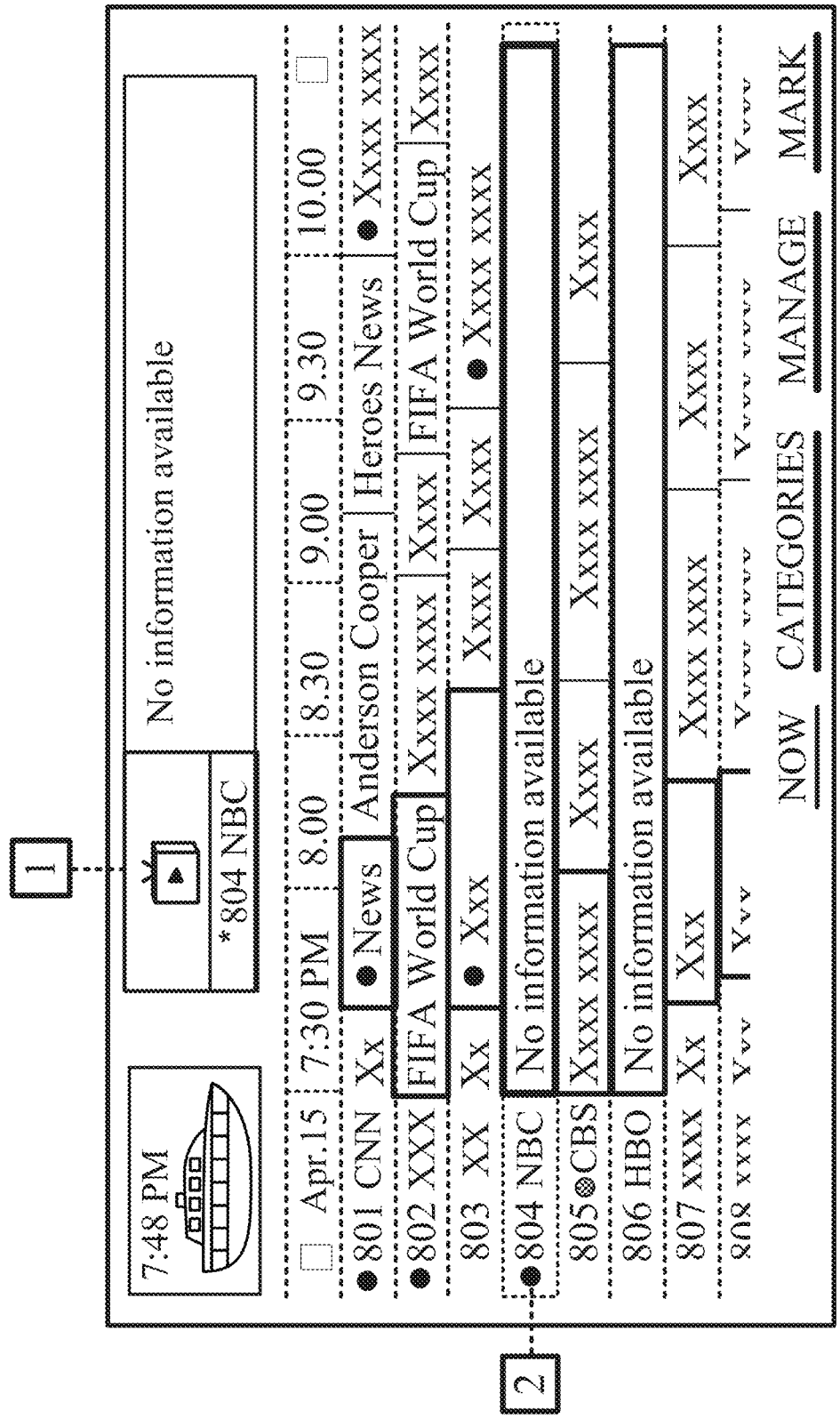
FIG. 68 shows a full screen EPG according to some embodiments of the present disclosure.

In addition to mini EPG, a full screen EPG is provided for the intelligent television system. An example of the full screen EPG is shown in FIG. 68. The full screen EPG can be access via the guide/menu button 772. The EPG interface comprises channel numbers, program listing, program information on the header portion, a view window for viewing a program and a hotkey legend. In the shown interface, the first hotkey is associated with Now function, the second hotkey is associated with categories function, the third function is associated with manage function, the fourth function is associated with mark function.

The exemplary systems and methods of this disclosure have been described in relation to an entertainment system or an Intelligent Television. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a cluster of digital devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components, without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. An intelligent television comprising:
a display;
a memory configured to store instructions and data associated with the display;
one or more input ports configured to connect to one or more external devices;
a remote controller comprising one or more color hotkeys and one or more shortcut keys, the one or more shortcut keys being associated with one or more content applications that provide media content from content sources other than the one or more external devices;
at least one processor in connection with the display, the memory and the one or more input ports and configured to execute instructions stored in the memory to cause the intelligent television to:

receive a designation for a silo, wherein the silo is a logical representation of a content source for the intelligent television;
determine the silo based on the designation;
based on that the silo is associated with one of the one or more external devices:
  present in a first user interface a watermark for identifying the silo;
  activate the one of the one or more external devices;
  determine whether a signal error associated with the silo occurs; and
  based on an occurrence of the signal error associated with the silo, present a second user interface for indicating the signal error, and based on no occurrence of the signal error, present a content associated with the silo;
based on that the silo is a first content application of the one or more content applications:
  determine whether the first content application is in an error state; and
  based on that the first content application is in an error state, present a third user interface indicating the first content application is in the error state, otherwise, provide a content from the first content application; and
in response to a command for information about the content from the first content application via the remote controller, present a fourth user interface comprising at least one of: a first indicator having a first color of a first hotkey of the one or more color hotkeys indicating a first assigned function for the first hotkey, a second indicator having a second color of a second hotkey of the one or more color hotkeys indicating a second assigned function for the second hotkey, a third indicator having a third color of a third hotkey of the one or more color hotkeys indicating a third assigned function for the third hotkey.

2. The intelligent television according to claim 1, wherein the first content application comprises a video application.

3. The intelligent television according to claim 1, wherein the at least one processor is further configured to execute the instructions to cause the intelligent television to:
based on that the silo is a second content application of the one or more content applications, determine whether the second content application is in a first-time experience state; and
based on that the second content application is in the first-time experience state, start a first-time experience process for accessing the second content application, otherwise, provide a content associated with the second content application.

4. The intelligent television according to claim 3, wherein the first-time experience process comprises:
presenting a first-time experience user interface;
receiving a first-time experience input; and
configuring the second content application in response to the first-time experience input.

5. The intelligent television according to claim 1, wherein the first assigned function for the first hotkey is activatable by the first hotkey in the fourth user interface while a fourth assigned function for the first hotkey is activatable by the first hotkey in a first state of the silo associated with the one of the one or more external devices, wherein the fourth assigned function is different from the first assigned function.

6. The intelligent television according to claim 1, wherein the first assigned function for the first hotkey is activatable by the first hotkey in a second state of the intelligent television while a fifth assigned function for the first hotkey is activatable by the first hotkey in a third state of the intelligent television.

7. The intelligent television according to claim 1, wherein the at least one processor is further configured to execute the instructions to cause the intelligent television to:
based on the silo being a live TV application, provide a fifth user interface comprising at least one of: a sixth indicator having the first color of the first hotkey of the one or more color hotkeys indicating a sixth assigned function for the first hotkey, a seventh indicator having the second color of the second hotkey of the one or more color hotkeys indicating a seventh assigned function for the second hotkey, an eighth indicator having the third color of the third hotkey of the one or more color hotkeys indicating an eighth assigned function for the third hotkey.

8. The intelligent television according to claim 1, wherein the fourth user interface comprises a guide user interface.

9. The intelligent television according to claim 1, wherein the first assigned function for the first hotkey comprises adding a selected item to favorite.

10. The intelligent television according to claim 1, wherein the at least one processor is further configured to execute the instructions to cause the intelligent television to:
based on that the silo is a live TV application, and in response to a selection of a guide menu, launch a full screen EPG comprising at least one of: a ninth indicator having the first color of the first hotkey of the one or more color hotkeys indicating a ninth assigned function for the first hotkey, a tenth indicator having the second color of the second hotkey of the one or more color hotkeys indicating a tenth assigned function for the second hotkey.

11. The intelligent television according to claim 1, wherein the at least one processor is further configured to execute the instructions to cause the intelligent television to:
based on that the silo is a live TV application, and in response to a command for changing a channel number on the television:
  render an on-screen channel changer on the display;
  receive a channel number selection according to a user's selection from the on-screen channel changer; and
  present a content associated with a selected channel number corresponding to the channel number selection.

12. The intelligent television according to claim 11, wherein the on-screen channel changer comprises a number entry bar.

13. The intelligent television according to claim 1, wherein the remote controller comprises a global panel button for providing an access to one or more of silos, notifications, a web browser and/or a system setting.

14. The intelligent television according to claim 1, wherein the at least one processor is further configured to execute the instructions to cause the intelligent television to:
based on that the silo is a live TV application, and in response to a command for information about currently played content on the display:
  provide an information user interface comprising one or more program information items associated with the currently played content without interrupting the currently played content on the display.

15. The intelligent television according to claim 14, wherein the at least one processor is further configured to execute the instructions to cause the intelligent television to:

in response to a user's selection for one of the one or more program information items, display an additional information page comprising at least one of: an eleventh indicator having the third color of the third hotkey of the one or more color hotkeys indicating an eleventh assigned function for the third hotkey, or a twelfth indicator having a fourth color of a fourth hotkey of the one or more color hotkeys indicating a twelfth assigned function for the fourth hotkey.

16. The intelligent television according to claim 1, wherein the at least one processor is further configured to execute the instructions to cause the intelligent television to: based on that the silo is a live TV application, and in response to a command for information about currently played content on the display:
provide an information user interface comprising a navigation bar, a detailed information region and an additional information region, wherein the navigation bar is configured for navigating to different user interfaces, the detailed information region is configured for presenting information on the currently played content, and the additional information region is configured for presenting recommended or related items depending on the currently played content.

17. A method for an intelligent television comprising:
receiving a designation for a silo, wherein the silo is a logical representation of a content source for the intelligent television;
determining the silo based on the designation;
based on that the silo is associated with one of one or more external devices:
　presenting in a first user interface a watermark for identifying the silo;
　activating the one of the one or more external devices;
　determining whether a signal error associated with the silo occurs;
　　based on an occurrence of the signal error associated with the silo, presenting a second user interface for indicating the signal error, based on no occurrence of the signal error, present a content associated with the silo;
based on that the silo is a first content application of the one or more content applications:
　determining whether the first content application is in an error state;
　based on that the first content application is in an error state, presenting a third user interface indicating the first content application is in the error state, otherwise, providing a content from the first content application; and
in response to a command for information about the content from the first content application via a remote controller, presenting a fourth user interface comprising at least one of: a first indicator having a first color of a first hotkey of the one or more color hotkeys indicating a first assigned function for the first hotkey, a second indicator having a second color of a second hotkey of the one or more color hotkeys indicating a second assigned function for the second hotkey, a third indicator having a third color of a third hotkey of the one or more color hotkeys indicating a third assigned function for the third hotkey.

18. The method according to claim 17, wherein the first assigned function for the first hotkey is activatable by the first hotkey in the fourth user interface while a fourth assigned function for the first hotkey is activatable by the first hotkey in a first state of the silo associated with the one of the one or more external devices, wherein the fourth assigned function is different from the first assigned function.

19. The method according to claim 17, wherein the fourth user interface comprises a guide user interface.

20. The method according to claim 17, further comprising:
based on that the silo is a live TV application, and in response to a selection of a guide menu, launching a full screen EPG comprising at least one of: a ninth indicator having the first color of the first hotkey of the one or more color hotkeys indicating a ninth assigned function for the first hotkey, a tenth indicator having the second color of the second hotkey of the one or more color hotkeys indicating a tenth assigned function for the second hotkey.

* * * * *